US010688572B2

(12) United States Patent
Fulmer et al.

(10) Patent No.: US 10,688,572 B2
(45) Date of Patent: *Jun. 23, 2020

(54) TABLE SAWS

(71) Applicant: SAWSTOP HOLDING LLC, Tualatin, OR (US)

(72) Inventors: J. David Fulmer, Wailea, HI (US); John P. Nenadic, Camas, WA (US); Paul H. Stasiewicz, Oregon City, OR (US); Hollan A. Tsuda, Corvallis, OR (US); Jeffrey D. Weston, Sherwood, OR (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,959

(22) Filed: Sep. 25, 2018

(65) Prior Publication Data

US 2019/0091780 A1    Mar. 28, 2019

Related U.S. Application Data

(63) Continuation of application No. 14/528,970, filed on Oct. 30, 2014, now Pat. No. 10,092,968.

(60) Provisional application No. 61/898,964, filed on Nov. 1, 2013.

(51) Int. Cl.
*B23D 45/06* (2006.01)
*B23D 59/00* (2006.01)
*B23D 47/02* (2006.01)

(52) U.S. Cl.
CPC .......... *B23D 45/06* (2013.01); *B23D 47/025* (2013.01); *B23D 59/00* (2013.01)

(58) Field of Classification Search
CPC .......... B27B 5/187; B27B 5/201; B27B 9/00; B27B 9/04; B23D 47/00; B23D 59/007; B27G 19/02; B26D 45/06–068
USPC .................................................. 83/471–477.2
See application file for complete search history.

(56) References Cited

U.S. PATENT DOCUMENTS

| 4,173,849 | A | * | 11/1979 | Mar | .................. B23D 57/0076 144/1.1 |
| 4,677,920 | A | | 7/1987 | Eccardt | |
| 4,696,282 | A | * | 9/1987 | Incitti | .................... F24B 1/202 126/25 R |
| 5,174,349 | A | | 12/1992 | Svetlik et al. | |
| 5,224,531 | A | | 7/1993 | Blohm | |

(Continued)

FOREIGN PATENT DOCUMENTS

WO     WO 01/26064 A2     4/2011

OTHER PUBLICATIONS

*The INCA Woodworking Machinery Handbook—With Useful Tips and Jigs for Everyone,* INCA Maschinen, 1984

(Continued)

*Primary Examiner* — Kenneth E Peterson
*Assistant Examiner* — Nhat Chieu Q Do

(57) ABSTRACT

Table saws and features for table saws are disclosed. Some of the disclosed features are particularly relevant to portable table saws such as jobsite and bench-top table saws. Disclosed features include, but are not limited to, extendable rails, mechanisms to lock rails in position, drawers, compartments and components to store table saw accessories, switch boxes, dust collection systems, table saw housings, tables, and handles.

5 Claims, 62 Drawing Sheets

(56) References Cited

U.S. PATENT DOCUMENTS

| | | | |
|---|---|---|---|
| 5,230,269 | A | 7/1993 | Shiotani et al. |
| 5,722,308 | A | 3/1998 | Ceroll et al. |
| 5,857,507 | A | 1/1999 | Puzio et al. |
| 5,979,523 | A | 11/1999 | Puzio et al. |
| 6,131,629 | A | 10/2000 | Puzio et al. |
| 6,293,176 | B1 | 9/2001 | Talesky |
| 6,966,350 | B1 * | 11/2005 | Gist .................... B23D 47/025 144/285 |
| 6,986,370 | B1 | 1/2006 | Schoene et al. |
| 7,036,414 | B2 | 5/2006 | Behne et al. |
| 2006/0201302 | A1 | 9/2006 | Schwaiger et al. |
| 2009/0165624 | A1 | 7/2009 | Brown et al. |
| 2011/0072950 | A1 | 3/2011 | Iannelli, Sr. |
| 2016/0271710 | A9 | 9/2016 | Gass et al. |
| 2017/0008189 | A9 | 1/2017 | Gass et al. |

OTHER PUBLICATIONS

SI16WA-WF Circular Saw with Tilting Blade Spare Parts Catalogue, SCMI Corporation, Norcross, GA, Nov. 1986 and 1991.
Skil Model 3400—Type 1 10 Table Saw Parts List and Technical Bulletin, S-B Power Tool Company, Jun. 1993.
Active Safety System on a Table Saw, Jan Nieberle & Sebastian Hauer, 1997 Workplace Bavaria.
Elmshorn Student Wins for the Seconds Time at Jugend Forscht, Hamburg Morning News, May 5, 1997.
SI320 Circular with Tilting Blade Spare Parts Catalogue, SCM, Dec. 23, 1998.
SI3200/3800 Circular with Tilting Blade Spare Parts Catalogue, SCM, Dec. 23, 1998.
Altendorf publication, Wilhelm Altendorf GmbH & Co. KG, Minden, Germany, 1999.
SI300N Circular with Tilting Blade Spare Parts Catalogue, SCM, Jun. 12, 2000.
Bosch Model 4000 Worksite Table Saw Operating/Safety Instructions, S-B Power Tool Company, Jul. 2000.
SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
U.S. Appl. No. 61/892,231, Gass et al., filed Oct. 17, 2013.
U.S. Appl. No. 61/892,237, Gass et al., filed Oct. 17, 2013.
U.S. Appl. No. 61/892,246, Gass et al., filed Oct. 17, 2013.
U.S. Appl. No. 61/898,964, Gass et al., filed Nov. 1, 2013.
SC 3W Circular Saw Manual, SCM Group S.p. A. Divisione Minimax—Samco, Feb. 2001.
Ryobi 10 Table Saw BT3000 Operator's Manual, Ryobi Technologies, Inc., Mar. 2001.
SI450E Circular with Tilting Blade Spare Parts Catalogue, SCM, Apr. 26, 2001.
Bosch 10 Table Saw Model 0601476139 Parts List and Technical Bulletin, S-B Power Tool Company, Apr. 2001.
Powermatic 10 Tilting Arbor Saw Model 66 Instruction Manual & Parts List, Jet Equipment & Tools, Jun. 2001.
Skil Model 3400 Table Saw Operating/Safety Instructions, S-B Power Tool Co., Sep. 2001.
Grizzly Industrial, Inc. Heavy-Duty 12 Table Saw Model G5959 and G9957 Parts List, 1998 and Oct. 2001.
Ryobi 10 Table Saw BT3100 Operator's Manual, Ryobi Technologies, Inc., Aug. 2002.
Rojek KPF 300A-xxxx-RN-1P3 Table Saw/Shaper Combination Machine specification sheet, Sep. 30, 2002.
Laguna Tools Signature Series by Knapp, Oct. 21, 2002.
Rojek Circular Saw PK 300 Spare part catalogue, Apr. 14, 2003.
Ridgid TS3650 Operators Manual 10 Cast Iron Table Saw, May 2003, Jun. 2003 and Jul. 15, 2003.
Porter-Cable Double Insulated 10 Bench Top Table Saw Instruction Manual, Porter-Cable Corporation, Sep. 15, 2003.
SI300S-S130054 Circular with Tilting Blade Spare Parts Catalogue, SCM, Oct. 30, 2003.
Craftsman® Power and Hand Tools, pp. 142-143, 2003.
The Legendary Shopsmith Mark V ad, Shopsmith, Inc., at least as early as Jan. 14, 2004.
Makita Model 2704 Exploded Drawings and Parts List, Nov. 2005.
Powermatic WMH Tool Group Operating Instructions and Parts Manual 10-inch Cabinet Saw Model 2000, Nov. 2005.
Porter-Cable 10 Portable Table Saw 3812, Porter-Cable Corporation, 2005.
Porter Cable 10 Portable Table Saw Model 3812 Parts List with Guard Exploded View, 2005.
DW745 Type 1 Table Saw Parts List, DeWalt Industrial Tool Co., 2005.
Grizzly Industrial, Inc. Model G0605X/G0606X Extreme Series 12 Table Saw Owner's Manual, Grizzly Industrial, Inc., Oct. 2006.
C10RB Jobsite Table Saw Manual, Hitachi Koki USA Ltd., 2006.
DW745 Heavy-Duty 10 Job Site Table Saw Manual, DeWalt Industrial Tool Co., 2006.
TS 250 Manual, Metabo, 2007.
TS 250 Circular Saw Parts List, Metabo, 2007.
Bosch 4100 Table Saw Parts List, Robert Bosch Tool Corporation, Feb. 14, 2008.
Grizzly Industrial, Inc. Model G0651/G0652 10 Extreme Series Table Saws Owner's Manual, Grizzly Industrial, Inc., Mar. 2008.
Bosch 4100 Table Saw Manual, Robert Bosch Tool Corporation, May 2008.
General Model 50-300/305 MI, 50-300CE/305CE Setup and Operation Manual, General International, Jul. 2009.
Table Saw Face-Off,Hurst-Wajszczuk, Woodcraft Magazine, Oct./Nov. 2009.
Jet Xacta Saw Deluxe Operating Instructions and Parts Manual, Jet/Walter Meier Manufacturing Inc., Dec. 2009.
Delta 10 Left Tilting Unisaw Instruction Manual, Delta Machinery, 2009, 2010.
General Model 502-70 Setup and Operation Manual, General International, Mar. 2010.
General Model 50-200R Setup and Operation Manual, General International, Sep. 2010.
Delta Unisaw Accessories, Delta Power Equipment Corporation, Mar. 1, 2012.
Dewalt Models DWE7490, DWE7491 Instruction Manual, DeWalt Industrial Tool Co., 2013.
Makita Table Saw 2704 Instruction Manual, Makita Corporation of America, date unknown.
Laguna Tools table saw owner's manual, date unknown.
SCM SI 450 Circular saw with tilting blade product brochure, Villa Verucchio, Italy, undated.
SCM Group publication, Rimini, Italy, undated.

\* cited by examiner

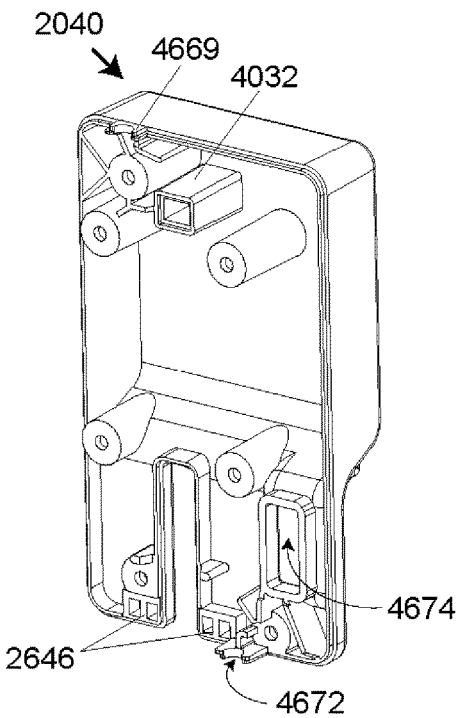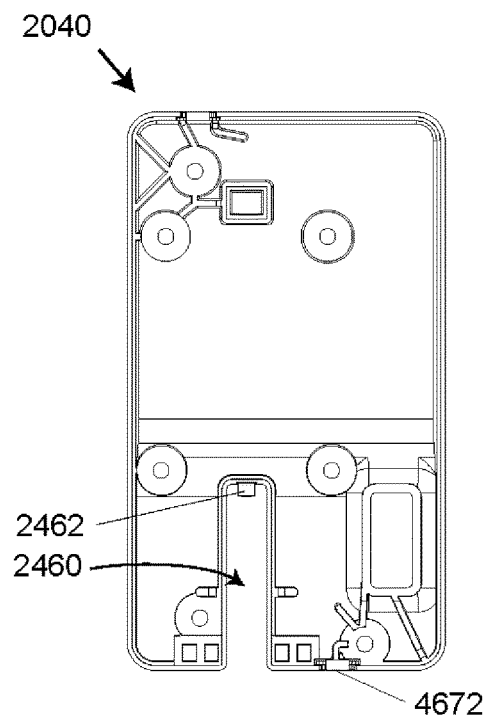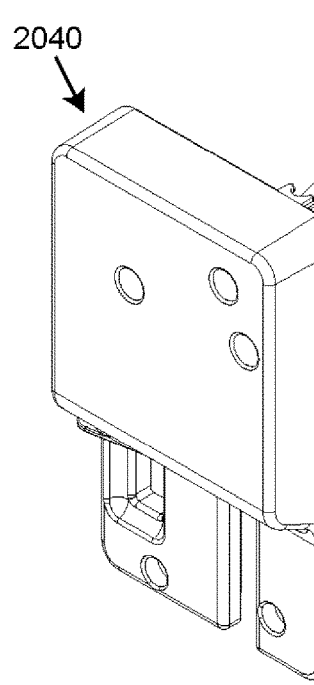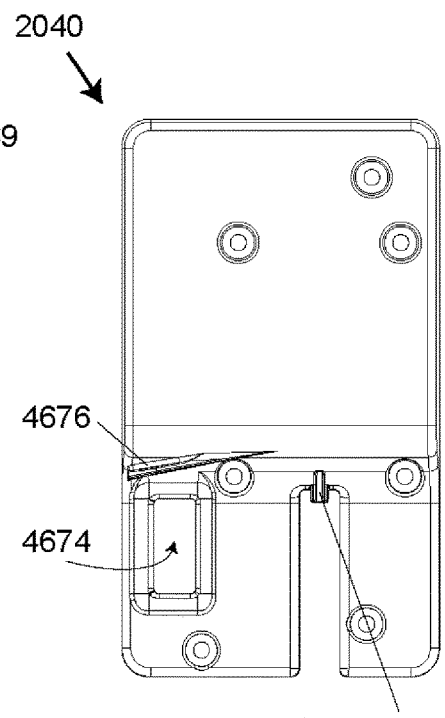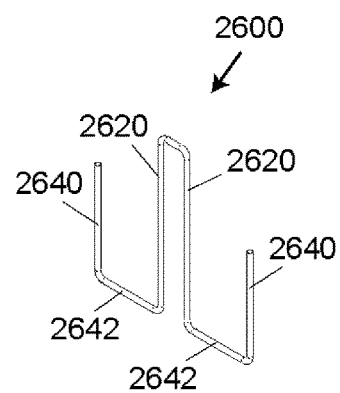
Fig. 96
Fig. 97
Fig. 98
Fig. 99
Fig. 100 ated Patent Application Ser. No. 61/898,964, filed Nov. 1, 2013,
TABLE SAWS

CROSS-REFERENCE TO RELATED APPLICATION

This application is a continuation of U.S. patent application Ser. No. 14/528,970, filed Oct. 30, 2014, which in turn claims the benefit of and priority from U.S. Provisional Patent Application Ser. No. 61/898,964, filed Nov. 1, 2013, which is incorporated herein by reference.

TECHNICAL FIELD

The present specification relates to table saws and features that may be implemented in table saws. Various disclosed features are particularly relevant to portable table saws sometimes called jobsite or bench-top saws.

BACKGROUND

A table saw is a power tool used to cut a work piece, such as a piece of wood, to a desired size or shape. A table saw includes a work surface or table and a circular blade extending up through the table. A person uses a table saw by placing a work piece on the table and feeding it into contact with the spinning blade to cut the work piece to a desired size.

The table saw is one of the most basic machines used in woodworking. For example, table saws are used to make furniture and cabinetry, to install hardwood flooring, to cut material for countertops, to cut plywood panels for roofing and walls, to make pallets and crates, and for many more projects and tasks.

Table saws come in various sizes ranging from large, stationary, industrial table saws, to small, lightweight, portable table saws. Larger table saws are sometimes called cabinet saws, mid-sized table saws are sometimes called contractor saws or hybrid saws, and smaller table saws are sometimes called portable, jobsite, or bench-top table saws. The larger table saws include induction motors and typically weigh well over 100 pounds. The smaller, portable table saws are often small and light enough to be transported in the back of a pick-up truck, and they often have stands with wheels so they can be moved around a jobsite or workspace. The smaller table saws have universal motors and weigh less than 100 pounds. For example, jobsite saws weigh approximately 60 to 80 pounds, and the smallest bench-top saws weigh approximately 30 to 40 pounds.

This document describes table saws and features that may be implemented on table saws. Some of the features described are particularly relevant to portable table saws such as jobsite and bench-top table saws.

BRIEF DESCRIPTION OF THE DRAWINGS

FIG. 17 shows a side view of a locking mechanism with a handle in.

FIG. 60 shows a switchbox with an on/off switch toggled on.

FIG. 96 shows a perspective view of a rear shell of a case used in the switchbox of FIG. 59.

FIG. 97 shows a front elevation view of the rear shell shown in FIG. 96.

FIG. 98 shows a back perspective view of the rear shell shown in FIG. 96.

FIG. 99 shows a back elevation view of the rear shell shown in FIG. 96.

FIG. 100 shows a wire form.

DETAILED DESCRIPTION

Figure 1:
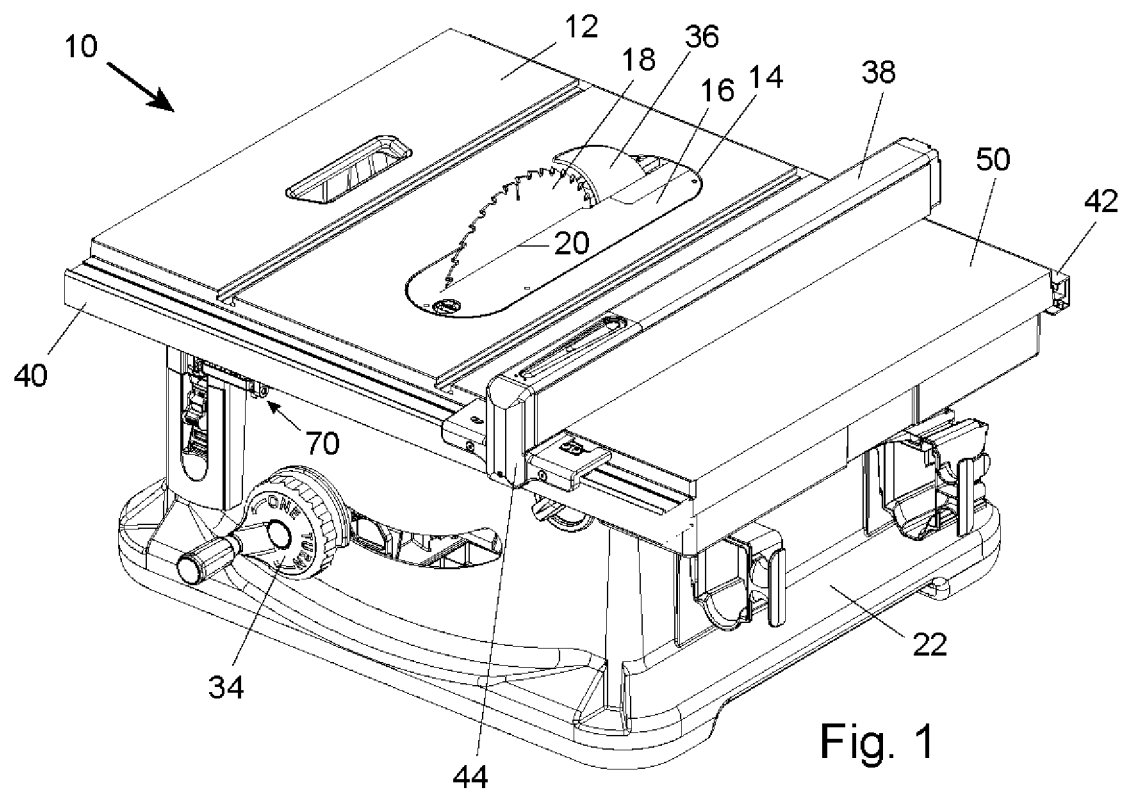
FIG. 1 shows a portable table saw.

FIG. 1 shows a table saw 10. The table saw includes a table 12 with an opening 14 and an insert 16 in the opening. A blade 18 extends up through a slot 20 in the insert. A housing 22 supports the table and a motor is within the housing. The motor is operably connected to the blade to drive or spin the blade. To use the table saw, a user places a work piece on the table and slides it into contact with the spinning blade to make a cut.

Table saws such as saw 10 can be equipped with "active injury mitigation technology." That phrase refers to technology that detects contact or proximity between a person and the spinning blade, and then performs some predetermined action, such as stopping and/or retracting the blade, to mitigate any injury. Exemplary implementations of active injury mitigation technology are described in International Patent Application Publication No. WO 01/26064 A2, which is incorporated herein by reference.

Figure 2:
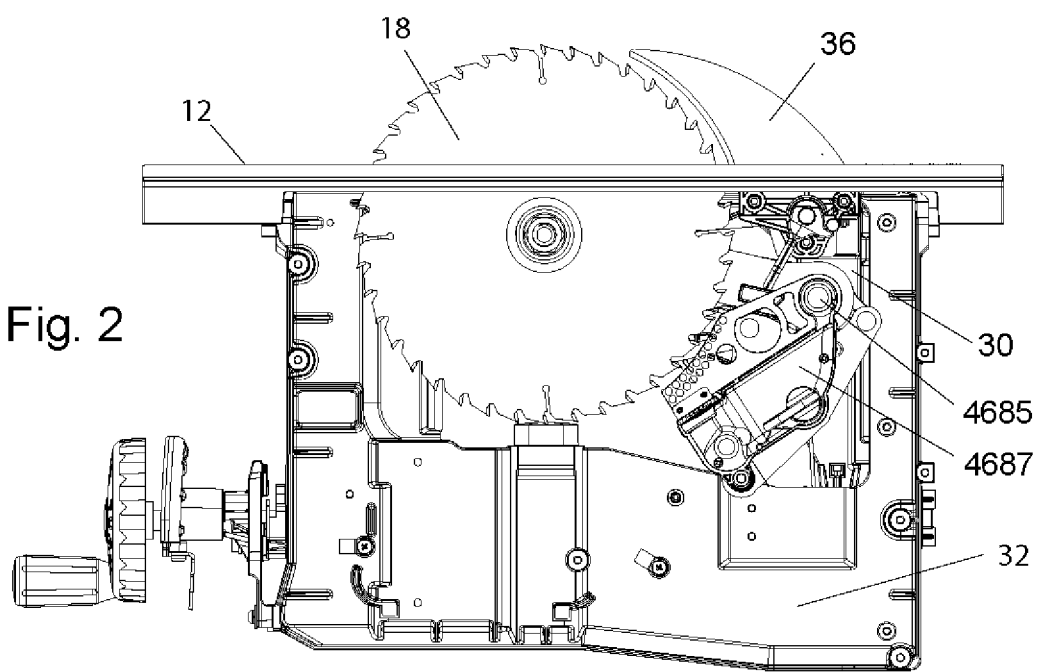
FIG. 2 shows an internal side view of the table saw of FIG. 1.

The blade in a table saw is typically supported in such a way that a user can change the elevation and tilt of the blade relative to the table to cut material of various thicknesses and to make angled cuts. FIG. 2 is an internal side view of table saw 10 with housing 22 removed. FIG. 2 shows blade 18 supported by an elevation carriage 30, which in turn is supported by a trunnion 32 hanging from table 12. The elevation carriage moves up and down relative to the trunnion to change the elevation of the blade relative to the table, and the elevation carriage and trunnion tilt or pivot from side to side to change the angle of the blade relative to the table.

In some table saws, the elevation of the blade is changed by turning a handwheel, such as handwheel 34 in FIG. 1. Typically, the handwheel is connected to a shaft which turns miter gears to raise and lower the elevation carriage, or the handwheel turns a screw that pivots the elevation carriage up and down. Other table saws use a lever or other mechanism to raise and lower the blade. Still other elevation mechanisms are described in U.S. patent application Ser. No. 13/946,315, titled "Blade Elevation Mechanisms and Anti-Backdrive Mechanisms for Table Saws," filed Jul. 19, 2013, which is incorporated herein by reference.

Tilting the blade is accomplished in some table saws by turning a second handwheel, and in other table saws by releasing a clamp and moving the elevation handwheel to the side. Still other tilt mechanisms are described in U.S. patent application Ser. No. 13/946,101, titled "Blade Tilt Mechanisms for Table Saws," filed Jul. 19, 2013, which is incorporated herein by reference.

A blade guard, spreader, and/or riving knife may be positioned adjacent the rear edge of the blade to shield the blade and/or to prevent a work piece from catching the rear of the blade. FIG. 1 shows a riving knife 36 supported by elevation carriage 30. Riving knife 36 raises, lowers and tilts with elevation carriage 30, and therefore, maintains a constant position relative to the blade. Various mechanisms for mounting a blade guard, spreader, and/or riving knife to an elevation carriage in a table saw are described in U.S. Provisional Patent Application Ser. No. 61/892,246, titled "Systems to Mount and Index Riving Knives and Spreaders in Table Saws," filed Oct. 17, 2013, which is incorporated herein by reference.

As seen in FIG. 1, the blade and riving knife or spreader extend through opening 14 in table 12 from below the table to an elevation above the table. Opening 14 is sometimes called a "throat" or "blade opening." Opening 14 is often large enough for a user to perform some types of service or maintenance to the saw through the opening, such as changing the blade. An opening in the table around the blade, however, means the table cannot support a work piece next to the blade. Accordingly, insert 16 (also called a "throat plate") is placed in the opening around the blade to support a work piece adjacent the blade. The insert includes a slot or channel through which the blade extends. The insert is removable so a user can access internal components of the saw through the blade opening (for example, a user can remove the insert to change the blade or to access the mount for the riving knife). Various inserts are described in U.S. Provisional Patent Application Ser. No. 61/892,231, titled "Inserts for Table Saws," filed Oct. 17, 2013, which is incorporated herein by reference.

Often a user of a table saw guides the work piece past the blade with a fence, such as fence 38 in FIG. 1. The fence mounts to the top of the table saw and provides a fixed reference surface relative to the blade. The user can slide the work piece against and along the fence to make a cut. The fence helps keep the work piece moving in a straight path without shifting or rotating, and therefore, helps produce a straight cut. The fence can be positioned at various positions relative to the blade so that a work piece can be cut to different dimensions. The fence typically clamps to a rail running along the front edge of the table saw, such as front rail 40 in FIG. 1, and the fence can be locked or clamped anywhere along the rail. The fence may also rest on or clamp to a rail running along the rear of a table saw, such as rear rail 42 in FIG. 1. Various fences are described in U.S. Provisional Patent Application Ser. No. 61/892,237, titled "Fences for Table Saws," filed Oct. 17, 2013, which is incorporated herein by reference.

The length of the rail along the front of the saw determines how far the fence can be positioned from the blade, and therefore, the largest dimension that can be cut on the saw using the fence. This may be called the cutting capacity or rip capacity of the saw. Some table saws include rails sufficiently long to provide 36 inches of cutting capacity—in other words, the face of the fence nearest the blade is 36 inches away from the blade so a work piece can be cut to 36 inches wide. Other table saws include rails with 52 inches of cutting capacity. Saws with these cutting capacities are typically stationary saws called cabinet saws or contractor saws. Smaller, portable saws, such as jobsite or bench-top saws, typically provide anywhere from 18 inches to about 30 inches of cutting capacity. These smaller, portable saws have shorter rails in order to minimize the size and weight of the saw. The rails may move or telescope out to provide more cutting capacity.

Figure 3:
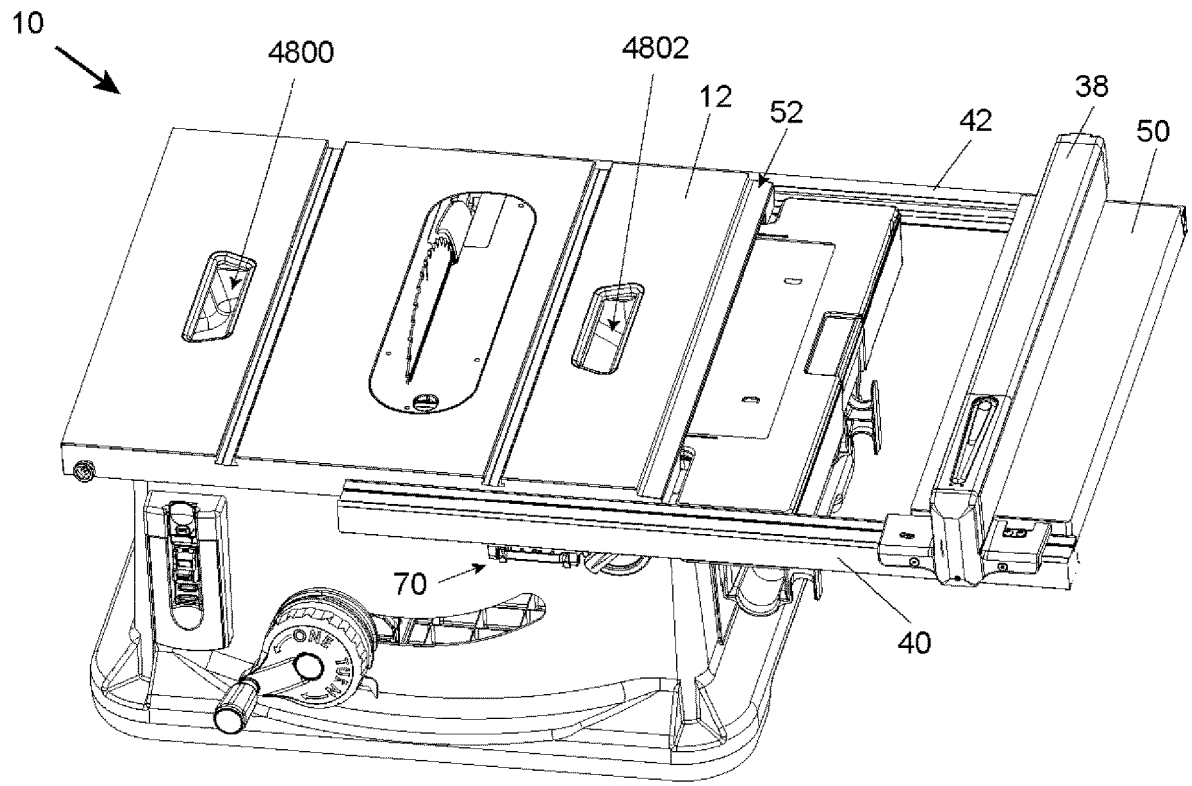
FIG. 3 shows the table saw of FIG. 1 with an extension table extended.

FIG. 3 shows table saw 10 with a front rail 40 and a rear rail 42 extending out to the right side of the saw to increase the cutting capacity of the saw. An extension table 50 extends between the right ends of the front and rear rails and is connected to both rails. The extension table provides an additional support surface for work pieces, especially when the rails are extended. The edge of the extension table nearest the main table can be stepped to overlap a portion 52 of the main table. Such a step makes the extension table wider without reducing the size of the main table and saw housing. Extension table 50 can be connected to the front and rear rails in many ways, for example, by screws which thread into sockets on the front and rear rails, or by screws which thread into clamping plates that clamp against surfaces on the front and rear rails when the screws are tightened. In FIG. 3, fence 38 is positioned over extension table 50.

Front rail 40 and rear rail 42 are attached to table 12 in such a way that they can slide to the right to provide increased cutting capacity. The configuration of the front and rear rails and how the rails attach to the saw can vary. One example of a front rail 40 is shown isolated in FIGS. 4 and 5. The rail is elongate with a channel 60 extending along the top of the rail. The channel helps guide the fence when a user slides the fence along the rail. The channel also includes a front edge 61 against which the fence can clamp. The rail is designed so that it can be extruded out of aluminum to facilitate manufacturing.

Figure 6:
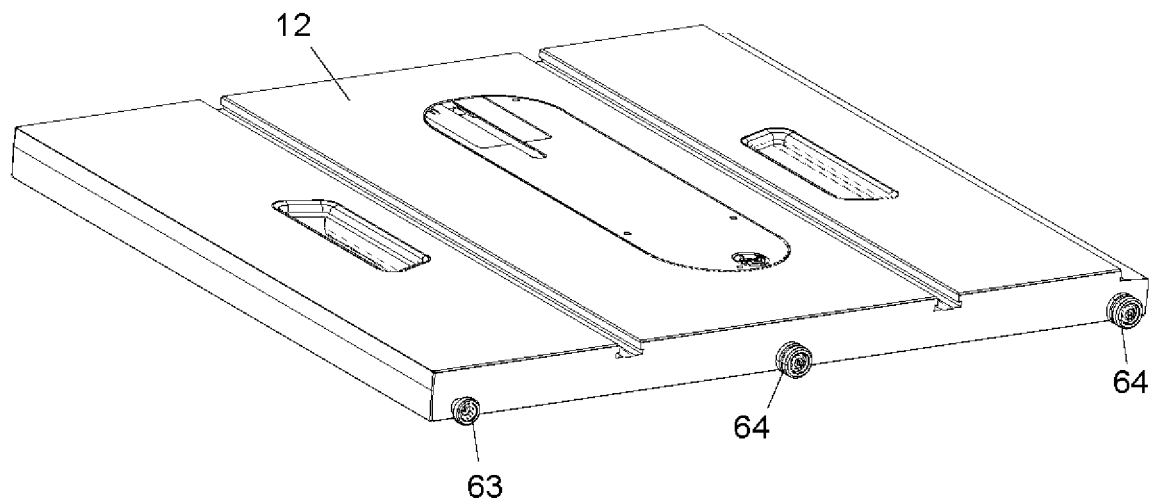
FIG. 6 shows rail supports along the front of a table.
Figures 7A, 7B, 7C, 7D:
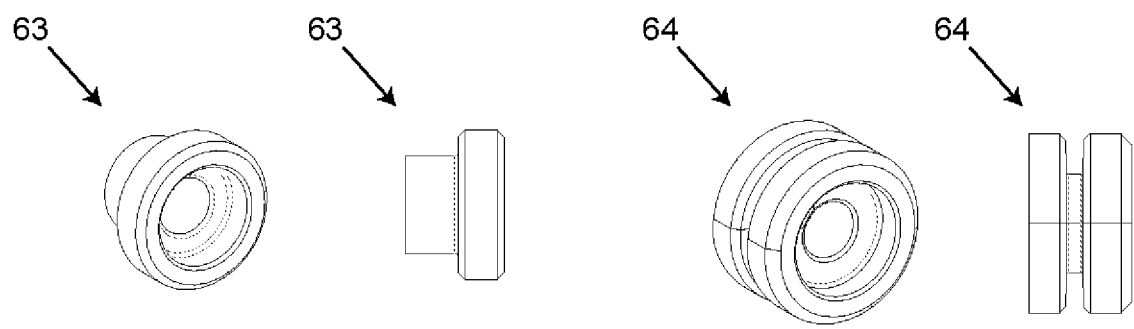
FIG. 7A shows a perspective view of a rail support.
FIG. 7B shows a side view of the rail support of FIG. 7A.
FIG. 7C shows a perspective view of another rail support.
FIG. 7D shows a side view of the rail support of FIG. 7C.

In the depicted embodiment, one rail support 63 and two rail supports 64 are attached to the front edge of table 12, as shown in FIG. 6; rail support 63 is toward the left edge of the table and rail supports 64 are generally in the middle of the table and toward the right edge of the table. The rear side of the rail is shaped to form a generally C-shaped channel 62 to fit over rail supports 63 and 64, and front rail 40 is supported along the front of the table by sliding C-shaped channel 62 over the rail supports. Rail support 63 is shaped as shown in FIGS. 7A and 7B, and the flange of C-shaped channel 62 fits behind the head of the support so that the flange is between the head and the table. Rail supports 64 are shaped as shown in FIGS. 7C and 7D to fit in the C-shaped channel, with a flange of the channel fitting into the slot shown in the rail support rather than fitting between the table and the rail support. The slot is sized to fit the flange on the C-shaped channel closely and to overlap the flange sufficiently so that the rail does not twist when the rail is clamped to the table. The spacing between the head of rail support 63 and the table is sufficient to direct and hold the front rail, but is greater than the slot on rail supports 64 so that the front rail can align and move over rail support 63 as the front rail extends and retracts. A wider spacing provides more tolerance for the front rail to move on and off the rail support. The rail supports can be mounted to the table in many ways, such as by bolts or screws. Alternative rails supports could be configured and mounted to the table so that they maintain their position relative to the table without twisting or rotating around their mounting bolt, which could cause the rail support to be misaligned relative to C-shaped channel 62 if the rail supports were not symmetrical. Alternative rail supports could also be shaped to extend below the bottom of the front edge of the table in order to provide a support surface to prevent or minimize some front rails from flexing or twisting when the fence clamps to the rail. Rail supports could also be configured to adjust the position of the front rail relative to the table by providing some type of eccentric associated with the rail supports. For example, the rail supports could include a mounting hole that is offset from the center of the rail support so that rotating the rail support around the mounting hole creates an eccentric action that adjusts the position of the rail. As another example, the table may include an oversized mounting hole that allows the position of the rail support to be adjusted and then bolted in place.

Figure 8:
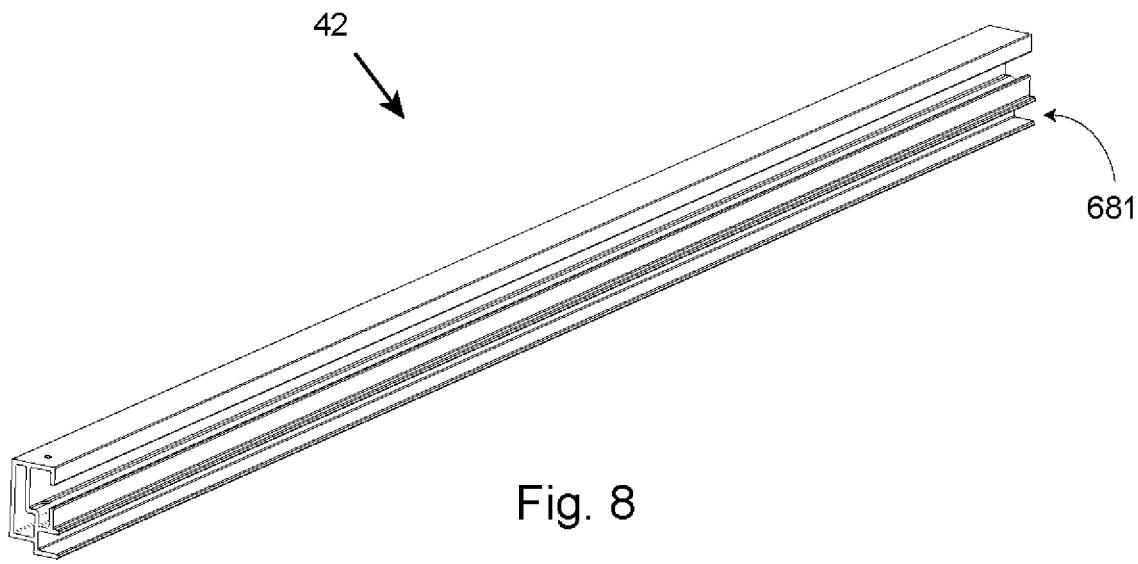
FIG. 8 shows a rear rail.
Figures 8A, 8B:
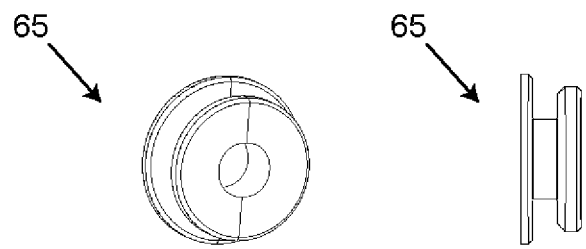
FIG. 8A shows a rail support for a rear rail.
FIG. 8B shows a side view of the rail support of FIG. 8A.

FIG. 8 shows an example of rear rail 42. It is configured similar to the example of front rail 40 shown in FIGS. 4 and 5, except the rear rail has a smaller front-to-back dimension and a smooth upper surface because the fence slides along the top surface of the rear rail without clamping to the rear rail. The side of rear rail 42 closest to the front of the saw includes a C-shaped channel, like C-shaped channel 62 discussed in connection with front rail 42, and that C-shaped channel is used to mount the rear rail to the rear edge of table 12 in the same manner as the front rail is mounted to the front edge of the table. In the depicted embodiment, rear rail 42 is supported by rail supports 65, like the one shown in FIGS. 8A and 8B, and the flange of the C-shaped channel fits into the slot shown in the rail support. The width of the slot can be greater than the slot on rail supports 64 because the rear rail does not need to clamp to the table if the front rail is sufficiently secured. The rear rail supports can also be configured to adjust the position of the rear rail relative to the table, for example, with some type of eccentric action as described for the front rail.

With this configuration, the front and rear rails are free to slide along the rail supports. The front and rear rails will slide together because they are connected by extension table 50, so extending front rail 40 to the right, as shown in FIG. 3, will cause rear rail 42 also to move to the right. In the retracted position shown in FIG. 1, where extension table 50 is flush against the right edge of table 12, the rails are supported by all three rail supports. In the extended position shown in FIG. 3 the rails are supported by the middle and right rail supports; the left rail support is exposed. Spacing the middle and right rails supports apart, and positioning the rail supports so that the rails always ride on at least two supports, insures that the rails are sufficiently supported in the extended position.

Figure 4:
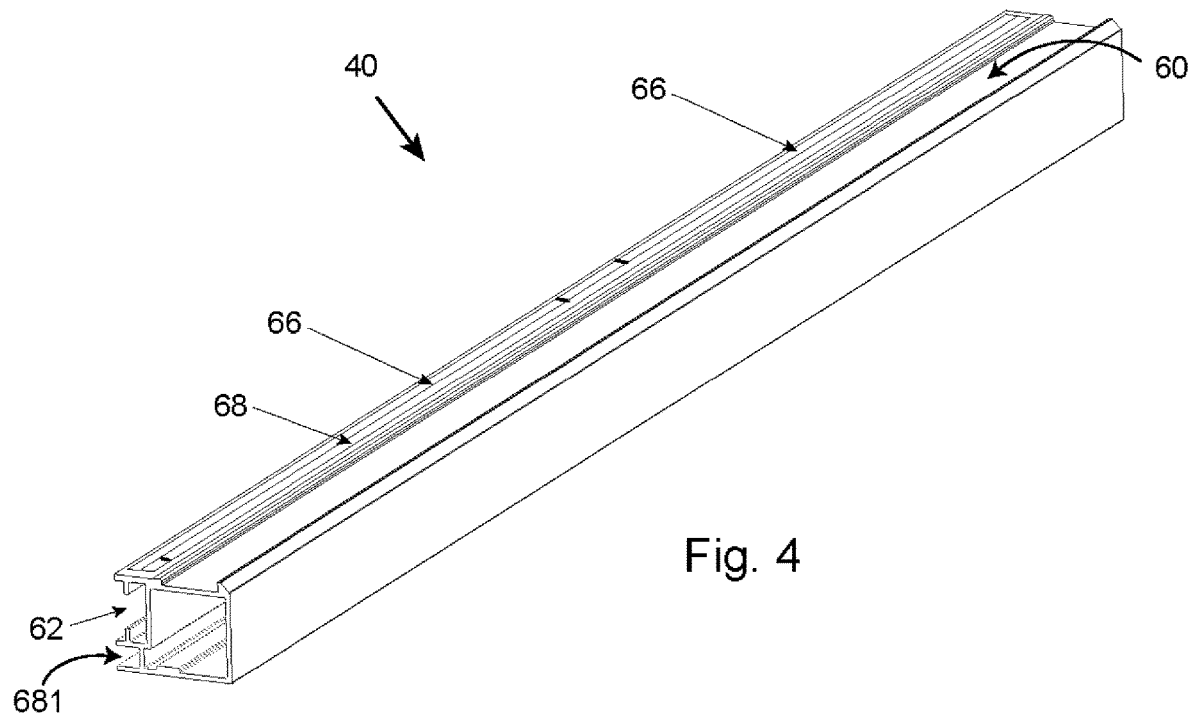
FIG. 4 shows a front rail.

Table saw 10 can be constructed so that the front and rear rails could be locked in place anywhere between the fully retracted position shown in FIG. 1 and the fully extended position shown in FIG. 3. However, in the depicted embodiment, the front and rear rails are configured to occupy either the retracted position or the extended position only; the rails cannot be locked in place when the rails are between the fully retracted and fully extended positions. The front rail on a table saw typically includes a ruler so a user can quickly move the fence to a desired distance from the blade without having to use a separate tape measure to measure the distance from the blade to the fence. However, if the front rail can be positioned anywhere along the front of the table, then the ruler must somehow adjust to indicate the correct position of the fence relative to the blade, and that would add complexity and cost to the saw. Allowing the rails to lock in only two positions simplifies this problem because the position of the rail relative to the blade is known for both the retracted and extended positions. In the depicted embodiment, two rulers 66 and 68 are attached to the top surface of front rail 40, as shown in FIG. 4. Ruler 66 is used when the rail is in its retracted position and ruler 68 is used when the rail is in its extended position. Ruler 66 includes two scales, one to use when the fence is positioned to the right of the blade and the other to use when the fence is to the left of the blade. The rulers have what may be thought of as "zero" indications that correspond and mark the position of the blade when the rail is in its retracted and extended positions, respectively. Top ruler 66 includes two zero indications, one for use with the fence on the right side of the blade and the other for use with the fence on the left side of the blade. With this configuration, the rulers can be adhered or attached directly to the top surface of the front rail and the saw need not include a ruler that somehow adjusts as the front rail moves. A user simply uses the correct ruler depending on whether the extension table is extended or retracted, and whether the fence is to the left or right of the blade.

Figure 9:
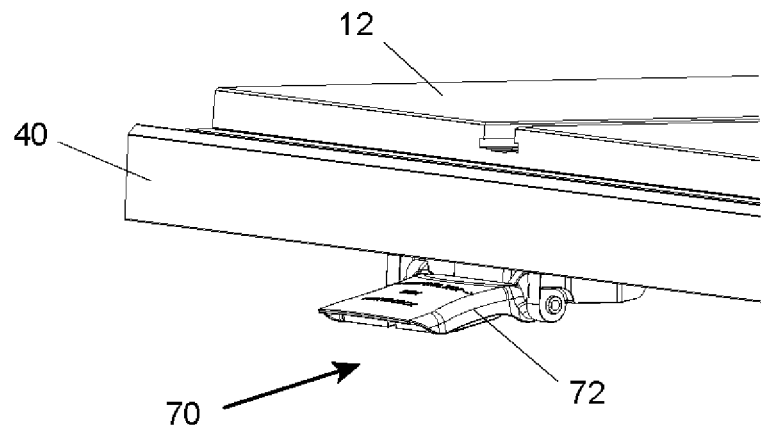
FIG. 9 shows a lock mechanism for a rail, with the mechanism unlocked.
Figure 10:
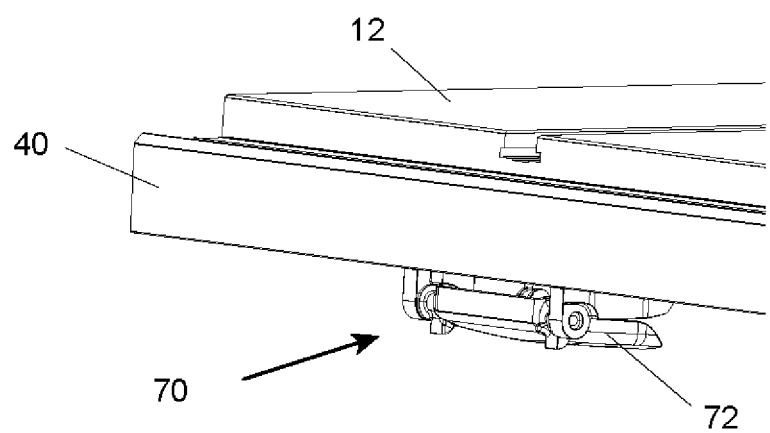
FIG. 10 shows a lock mechanism for a rail, with the mechanism locked.

The front and rear rails are held in place by a locking mechanism 70 that clamps the front rail to the front edge of table 12. A user operates the locking mechanism by grasping a handle 72 positioned under the front rail, and pulling or pivoting the handle forward so that it extends out from the front rail, as shown in FIG. 9. With handle 72 out, both the front and rear rails are free to move, so a user can grasp the handle, the front rail, and/or extension table 50 and slide the rails out to the extended position. The user can then pivot handle 72 back under the front rail, as shown in FIG. 10, to lock the rails in place. Handle 72 is configured to pivot out a noticeable distance from the front of the saw, several inches for example, to indicate to a user when the rails are not locked in place. The handle is also positioned so that it extends out into the region in which a user would stand to use the saw, thereby further indicating when the rails are unlocked. The handle can also be red or some other bright color so that it is easy to see when extended. As shown in FIGS. 9 and 10, handle 72 has a side-to-side width sized so that a user can grasp the handle to slide the rails out, but a narrow top-to-bottom profile so that it tucks up and out of the way under the front rail when the rails are locked in place.

Figure 11:
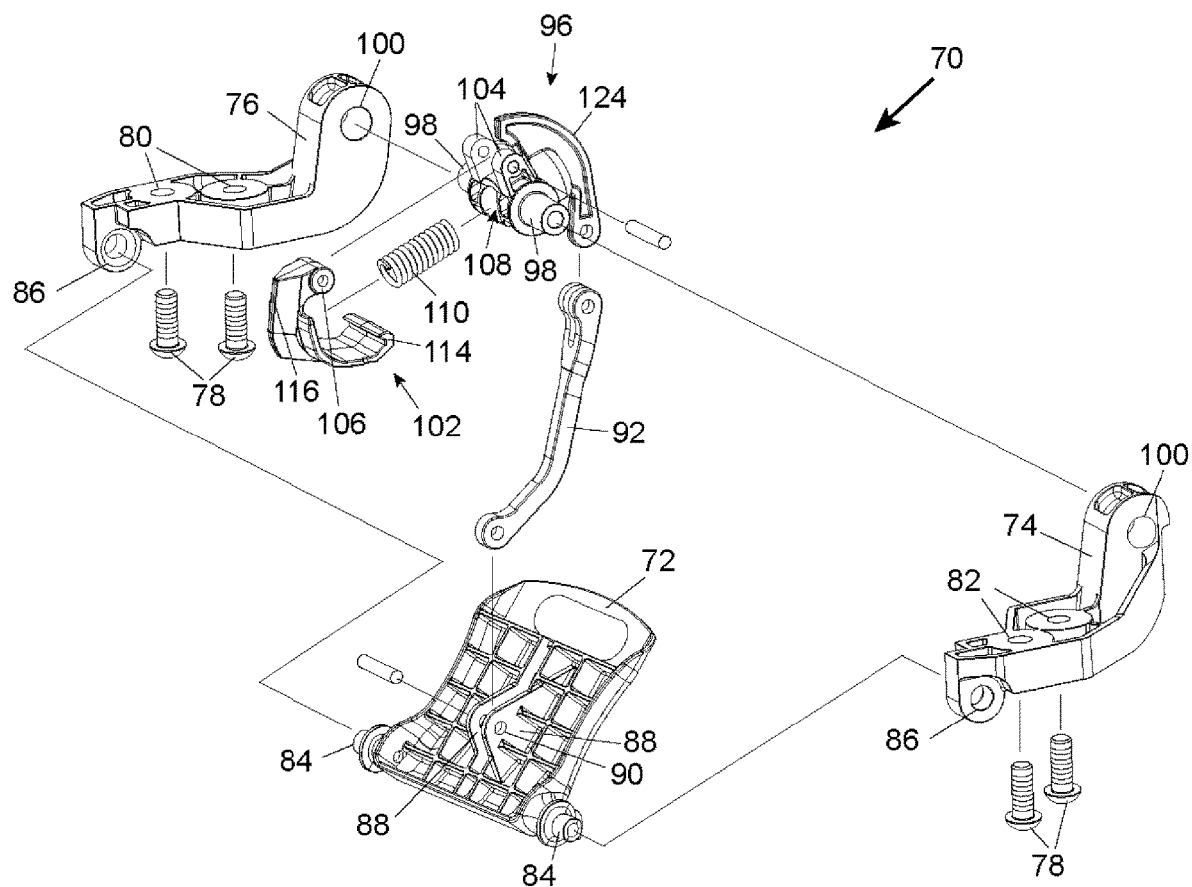
FIG. 11 shows an exploded view of a lock mechanism for a rail.
Figure 12:
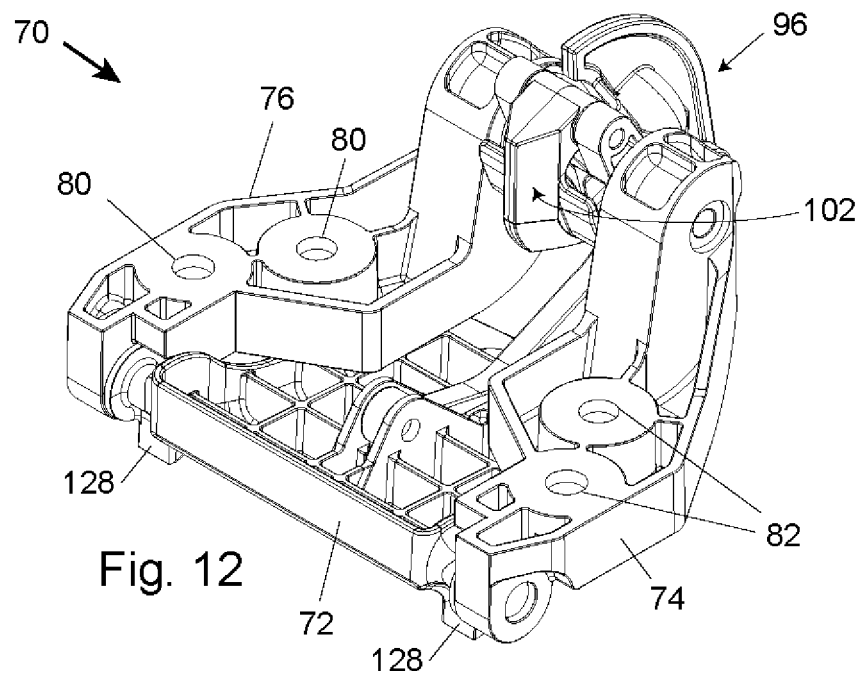
FIG. 12 shows a perspective view of the lock mechanism of FIG. 11.
Figure 13:
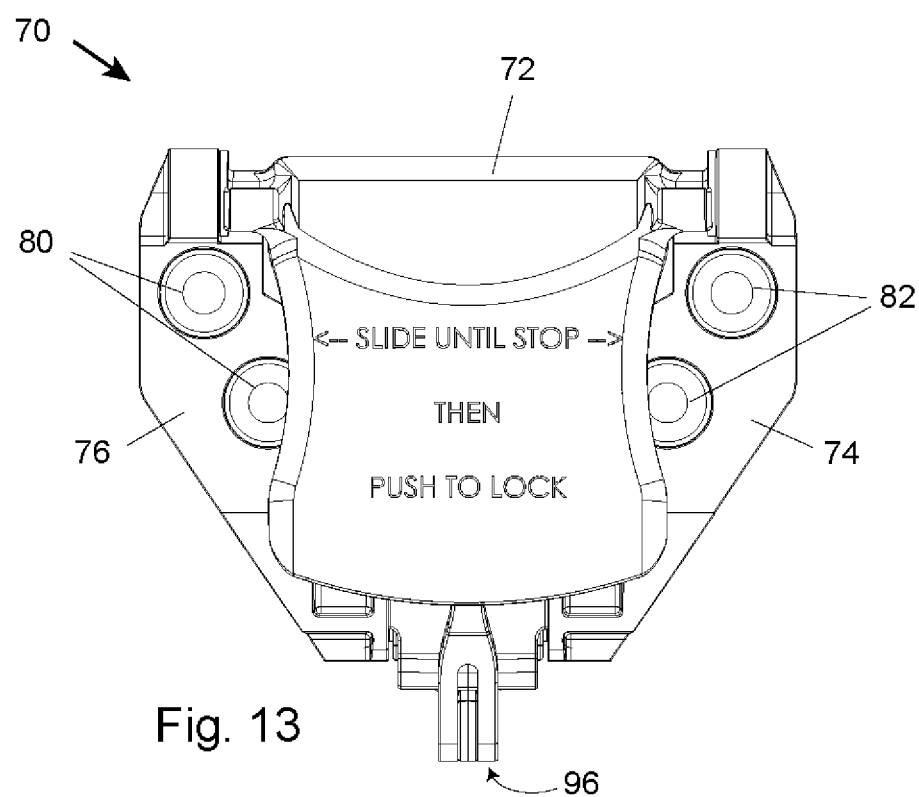
FIG. 13 shows a bottom view of the lock mechanism of FIG. 11.

Locking mechanism 70 is shown in FIGS. 11, 12 and 13, with FIG. 11 being an exploded view of the locking mechanism. The locking mechanism includes a right support 74 and a left support 76. The locking mechanism bolts onto the bottom of front rail 40 with four bolts 78 that pass through two holes 80 in the left support and two holes 82 in the right support, and then thread into corresponding holes on the underside of the front rail, and/or pass through holes in the front rail and thread into nuts. Of course, the side supports may take other forms. For example, each side support may be held in place with only one screw or bolt, and each side support may include locating pins to position the support.

Figure 11A:
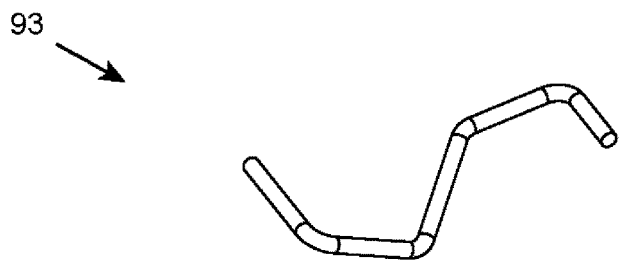
FIG. 11A shows a wire link.
Figure 14:
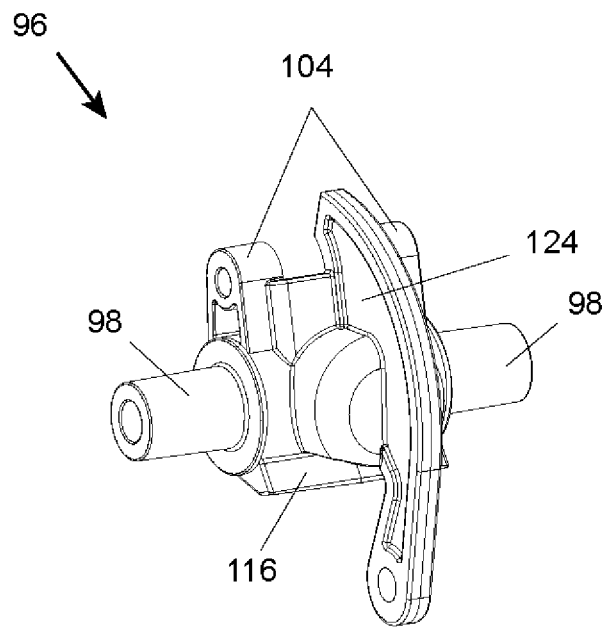
FIG. 14 shows a rotating member.

Handle 72 is captured between and supported by the two side supports 74 and 76. Cylindrical protrusions 84 extend out from each side of the handle and fit into holes 86 in the right and left side supports so that the handle can rotate with respect to the side supports. The back of the handle includes two spaced-apart tabs 88 that extend outward, and each tab has a hole 90 positioned so that the holes are coaxial. In the depicted embodiment, an elongate link 92 fits between the two tabs and a pin passes through holes 90 and through a corresponding hole in the elongate link to pivotally attach one end of the elongate link to the handle. The opposite end of the elongate link is pivotally attached to a rotating member 96, which is supported for rotation by right and left side supports 74 and 76. Rotating member 96 is shown isolated in FIG. 14. Cylindrical protrusions 98 extend out from the sides of rotating member 96 to fit in holes 100 in the side supports. The end of elongate link 92 opposite handle 72 is pivotally joined to rotating member 96 by a pin that extends through corresponding holes in the links. In other embodiments elongate link 92 may be made from a wire formed to connect handle 72 to rotating member 96, such as wire link 93 shown isolated in FIG. 11A.

Figure 15:
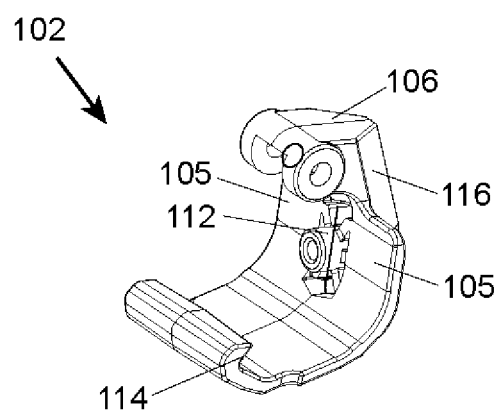
FIG. 15 shows a locking structure.

Rotating member 96 is also connected to a locking structure 102. The locking structure is shown separately in FIG. 15. Rotating member 96 includes two tabs 104, and locking structure 102 includes an arm 106 that fits between the tabs on the rotating member. A pin then passes through holes in the tabs and arm to connect the locking structure and rotating member in such a way that the locking structure can pivot or rotate about the pin. A flange 105 is located on each side of locking structure 102. The flanges are adjacent the right and left side supports 74 and 76 and may contact and move along the side supports when locking structure 102 pivots to guide the rotation of the locking structure.

A cylindrical cavity 108 is positioned in the middle of rotating member 96, running between and perpendicular to cylindrical projections 98, to hold a coil spring 110. Spring 110 is positioned to extend out and contact locking structure 102, and to bias the locking structure away from the rotating member. Locking structure 102 also prevents spring 110 from falling out of cavity 108. A short cylindrical stub 112 projects out from the inner surface of the locking structure 102 and the end of spring 110 extending out from rotating member 96 fits over and around the stub to keep the spring in position.

Locking structure 102 includes a hook 114 configured to fit over a lip 116 on rotating member 96. By hooking over the lip, hook 114 holds locking structure 102 and rotating member 96 together against the push of spring 110, while allowing the locking structure to compress the spring when pivoted toward the rotating member. This configuration of the locking structure and rotating member facilitates clamping the front rail in position, as explained below.

Figure 16:
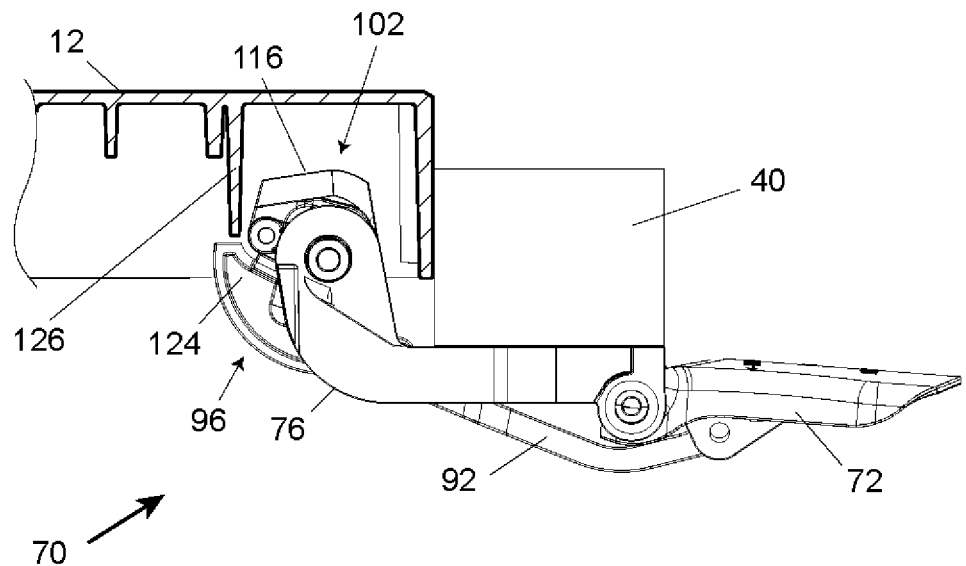
FIG. 16 shows a side view of a locking mechanism with a handle out.
Figure 17:
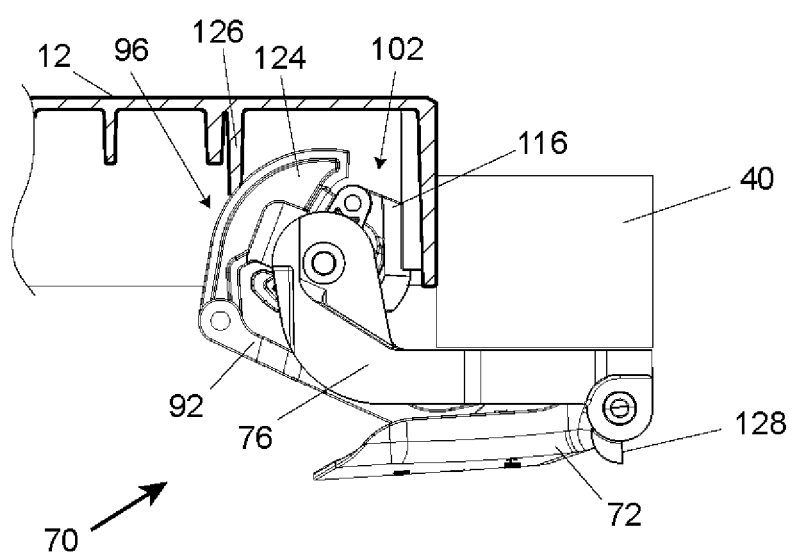

When a user pulls handle 72 out, as shown in FIG. 16, the handle pulls link 92, which in turn causes rotating member 96 to rotate counterclockwise as viewed in FIG. 16. When rotating member 96 rotates counterclockwise, locking structure 102 disengages from table 12 and front rail 40 is free to slide. When a user pivots handle 72 in, as shown in FIG. 17, the handle pushes link 92, which in turn causes rotating member 96 to rotate clockwise as viewed in FIG. 17. When rotating member 96 rotates clockwise, locking structure 102 engages table 12 to lock front rail 40 in place. Locking structure 102 includes a ridge or tab 116 that moves into contact with and presses against the back side of the front edge of table 12, as shown in FIG. 17. When that happens, spring 110 compresses and locking structure 102 pivots slightly back toward rotating member 96. Spring 110 thus provides a force pressing locking structure 102 against the table to lock the front rail in place. Spring 110 can be selected to provide whatever clamping force is desired. In the depicted embodiment, a spring providing approximately 40 pounds of force was selected, although springs in the range of 20 to 50 pounds or more could be selected.

Figure 18:
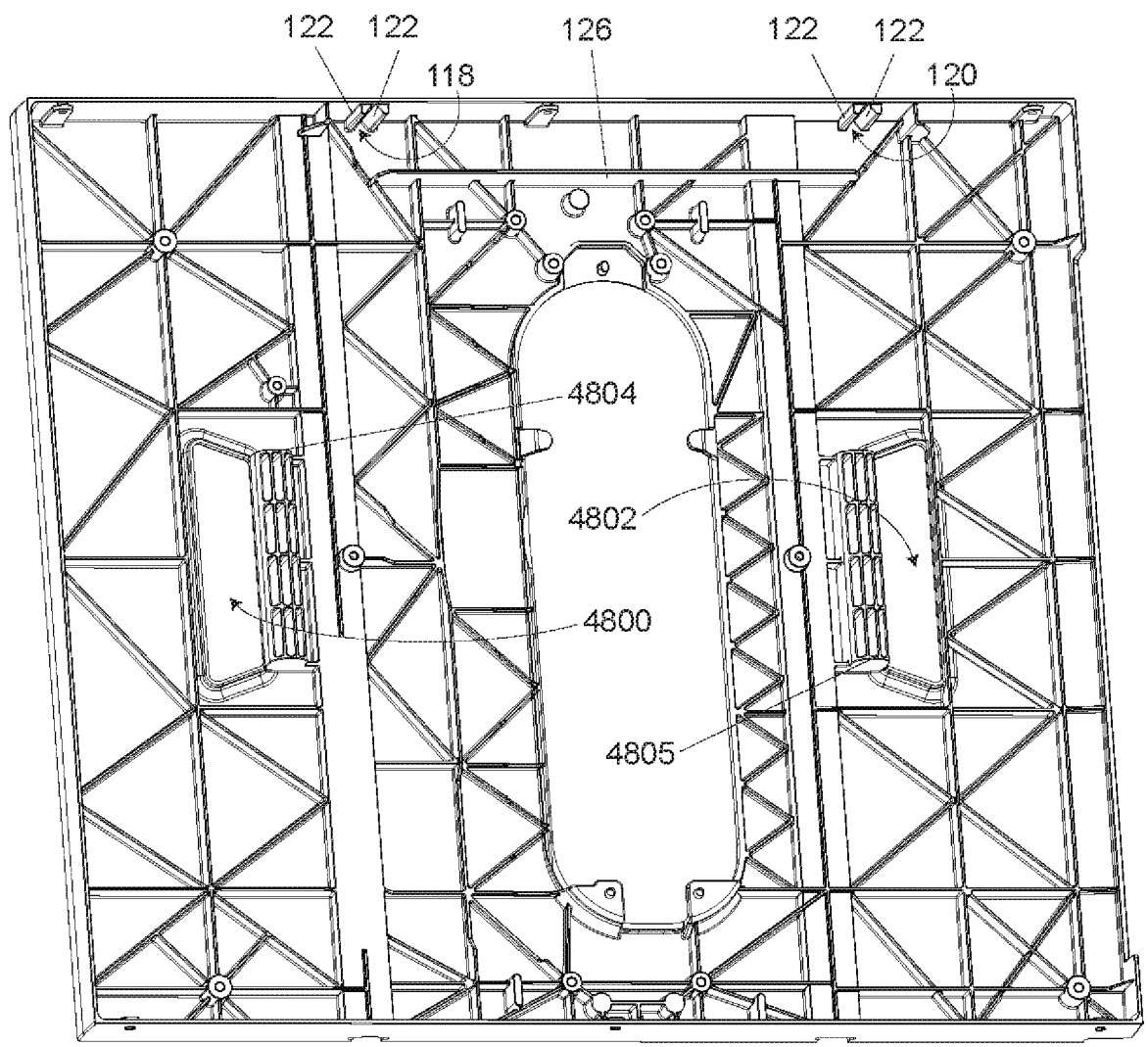
FIG. 18 shows the underside of a table.

The back side of the front edge of table 12 includes two V-shaped grooves or sockets 118 and 120, as shown in FIG. 18. Ridge 116 on locking structure 102 is shaped so that it will fit into the V-shaped sockets. V-shaped sockets 118 and 120 are formed by walls 122 that are, in the depicted embodiment, integral with the table, but could be made from separate components attached to the table. The inner surfaces of walls 122 are angled to form the V-shapes. When locking structure 102 moves into contact with table 112, ridge 116 fits into and centers locking structure 102 within V-shaped socket 118 or 120 because of the corresponding shapes of the sockets and ridge 116. In this manner, the front rail is indexed to either the retracted or extended position. Sockets 118 and 120 and ridge 116 also provide mechanical stops or abutments that prevent front rail 40 from moving to the right or left, as viewed in FIG. 1, when the rail is locked in place. As a result, locking mechanism 70 need not hold the rail from lateral movement and a smaller clamping force is able to hold the rails in place. As stated, a clamping force of approximately 40 pounds is used in the depicted embodiment. Systems which clamp a front rail to a table without mechanical stops to prevent lateral movement must provide enough clamping force to prevent the rail from moving to the side when, for example, the end of the rail is bumped. The clamping force necessary to prevent such lateral movement (lateral relative to the clamping force) is typically much greater than 40 pounds.

Ridge 116 and sockets 118 and 120 also prevent a user from moving the front rail unless handle 72 is fully open. If the handle is not fully open, ridge 116 will bump into the walls of socket 118 or 120 and prevent the rail from sliding.

Rotating member 96 also includes a flange 124 positioned on the side of the rotating member generally opposite locking structure 102, and the underside of table 14 includes a wall 126 running parallel to the front edge of the table and spaced back from the front edge. Flange 124 on rotating member 96 interferes with wall 126 so that a user cannot pivot handle 72 closed unless the front rail is positioned in either the extended or retracted position. When handle 72 is pulled out to its open and unclamped position, flange 124 pivots down, as seen in FIG. 16, and clears wall 126 so the user can slide the rails to the extended or retracted position. Only when the rail is properly positioned so that flange 124 is beyond the end of wall 126 can a user pivot handle 72 closed to lock the rail in place. With this configuration, a user can lock the front rail in either the extended or retracted position only, not in any other position.

As seen in FIGS. 12 and 17, handle 72 includes shoulders 128 positioned next to the handle's pivot axis. Those shoulders act as stops to limit the upward rotation of handle 72. The shoulders abut the right and left side supports 74 and 76 to prevent the handle from pivoting too far upward.

Right and left side supports 74 and 76 can also act as stops to limit how far front rail 40 can move. For example, right side support 74 can bump into a wall or flange on the underside of table 14 to limit how far front rail 40 can extend out. Such stops provide indications to a user when the front rail is moved to its extended or retracted position.

Figure 19:
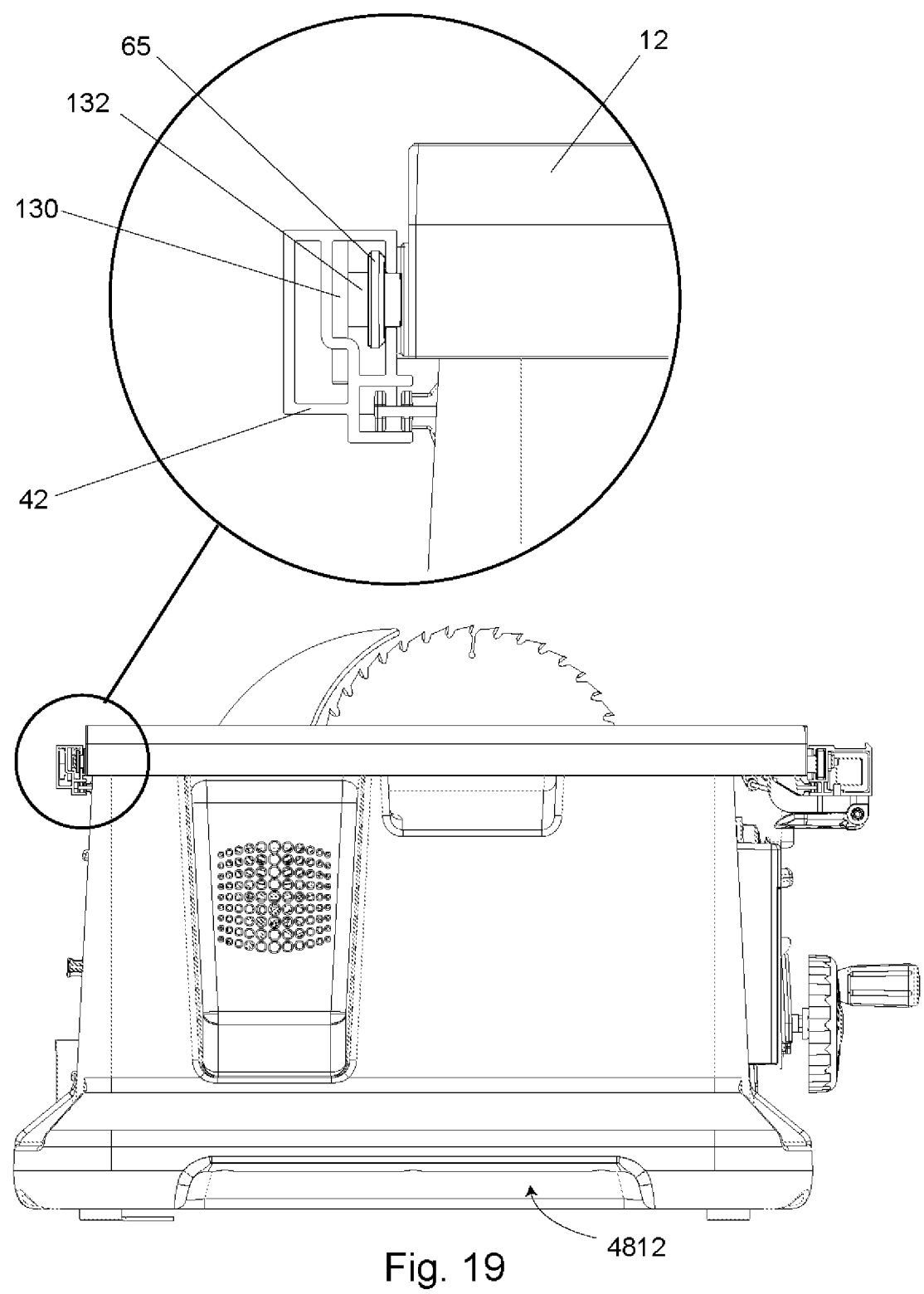
FIG. 19 shows a rear rail attached to a saw.

FIG. 19 shows rear rail 42 attached to table 12. A pin 130 extends through the rear rail and is positioned so that when the rails are fully extended, the pin abuts the middle rail support 65. By so doing, the pin reduces play in the rear rail, and prevents the rear rail from moving further out when, for example, a user pushes a work piece against the fence with the fence clamped to the front rail. Without a mechanical stop such as pin 130, the rear rail might move out slightly (to the right when facing the front of the saw) during use because of manufacturing tolerances, which would adversely affect the ability of the fence to provide a fixed reference to make a cut. Also, mechanically limiting the ability of the rear rail to move further out means the rear rail need not be clamped in position, thereby simplifying the attachment of moveable rails to tables. Middle rear rail support 65 is attached to table 12 with a bolt 132 having a head that extends out sufficiently to abut pin 130. The left-most rail support, furthest from extension table 50, is secured to table 12 with a bolt having a head small enough so that pin 130 clears the bolt and slides past when the rail is fully retracted.

With a locking mechanism as described, a user simply pivots a handle and slides the rails out to increase the cutting capacity of the saw. A single actuator or handle is used to both lock and unlock the rails; the user does not have to separately unlock the rear rail. Also, the user can slide the rails out by grasping the same handle used to lock and unlock the rails. This system provides an intuitive and easy-to-use system to provide additional cutting capacity on smaller table saws such as jobsite and bench-top table saws.

Table saws often come with accessories such as miter gauges, blade guards, and riving knives. Providing storage locations on the saw for such accessories when they are not in use makes the saw more convenient and easy to use. Any such storage locations should be designed to hold the accessories securely so that the accessories do not fall off the saw when the saw is moved. The accessories should also be easily accessible, and they should be stored out of the way so that they do not obstruct or interfere with the use of the saw. This is a particular problem for portable table saws such as jobsite and bench-top table saws. Space is limited on portable table saws, so deciding where and how to store accessories presents a significant design challenge.

Figure 20:
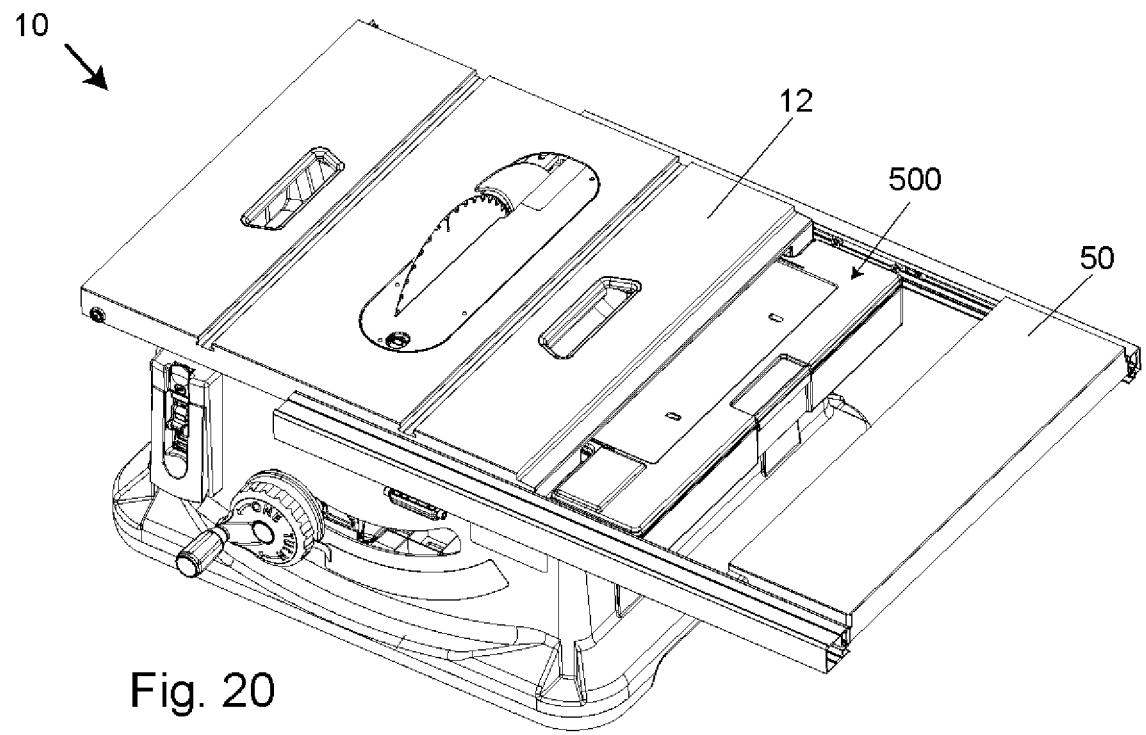
FIG. 20 shows a table saw with a drawer to store saw components and accessories.
Figure 21:
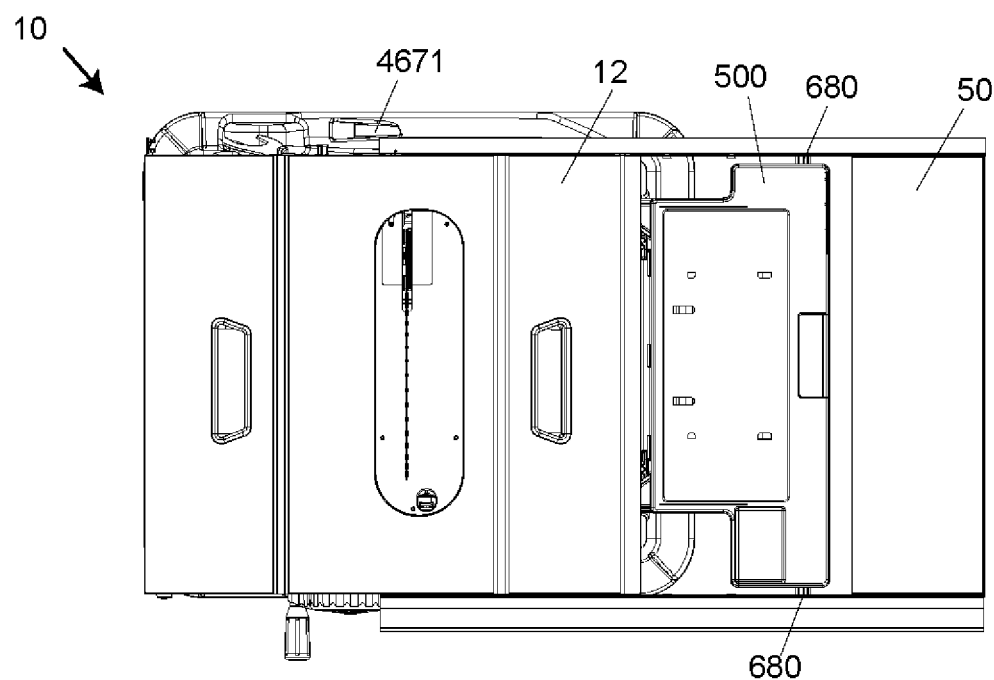
FIG. 21 is a top view of the drawer of FIG. 20.
Figure 22:
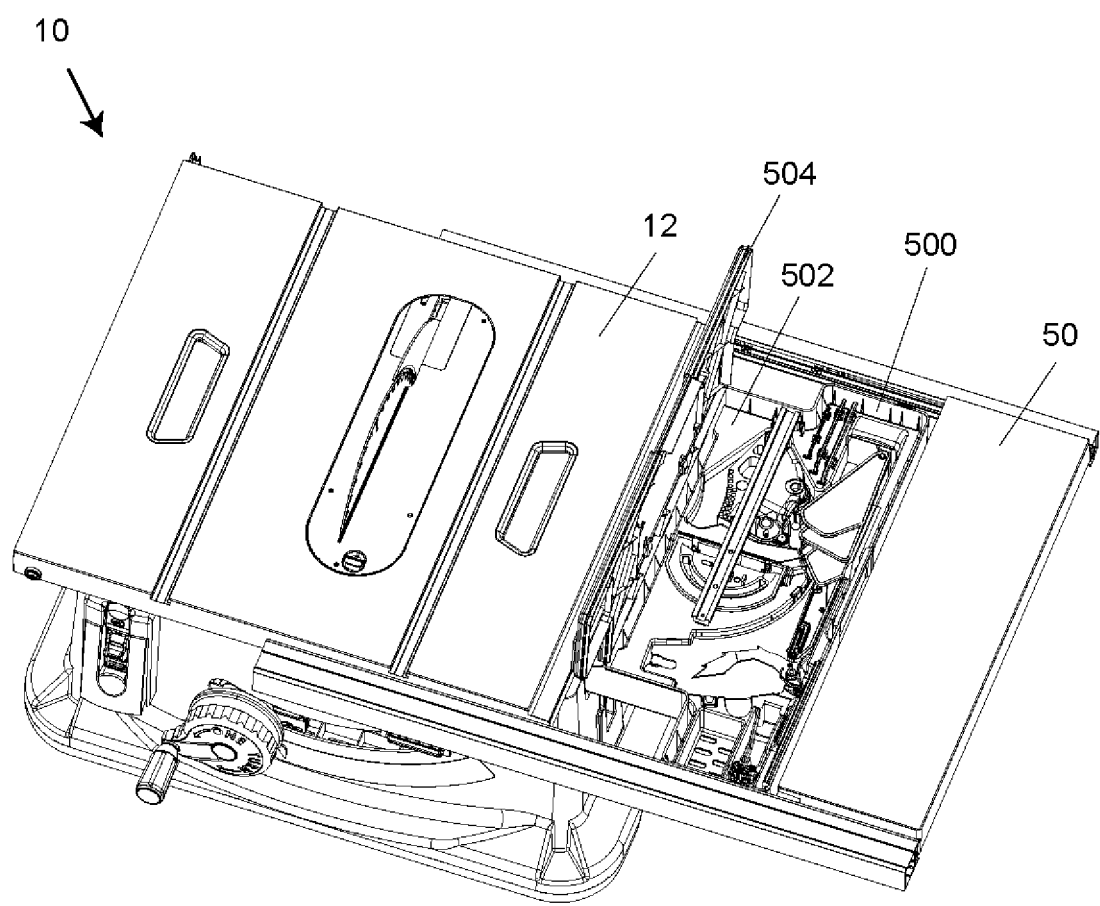
FIG. 22 is a perspective view of the drawer of FIG. 20, with the top of the drawer open.

A unique solution to this challenge is drawer 500 shown in FIG. 20. The drawer is located just underneath the right side of table 12 and is covered by extension table 50 when the extension table is flush against the right edge of table 12. The drawer is accessed by sliding the extension table out, and then sliding the drawer itself out. When not being accessed, the drawer can be slid back so that a portion of the drawer is under table 12, as shown in FIG. 20, and the extension table can be retracted if desired, as shown in FIG. 1. FIG. 21 shows table saw 10 with drawer 500 extended out. FIG. 22 shows the drawer extended out and open, and various saw components and accessories are stored in the drawer. The drawer provides a unique and convenient way to store and access table saw accessories and is applicable to all table saws, but it is particularly applicable to portable table saws. The location of the drawer takes advantage of what might otherwise be empty space under the right side of the table.

Figure 23:
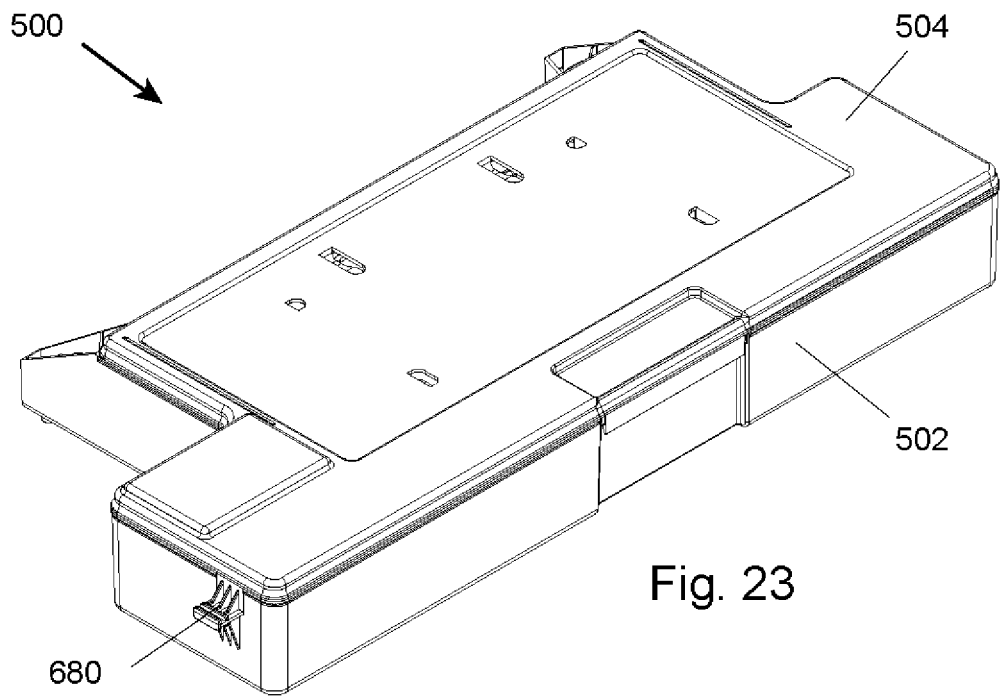
FIG. 23 shows a drawer used to store table saw components and accessories.
Figure 24:
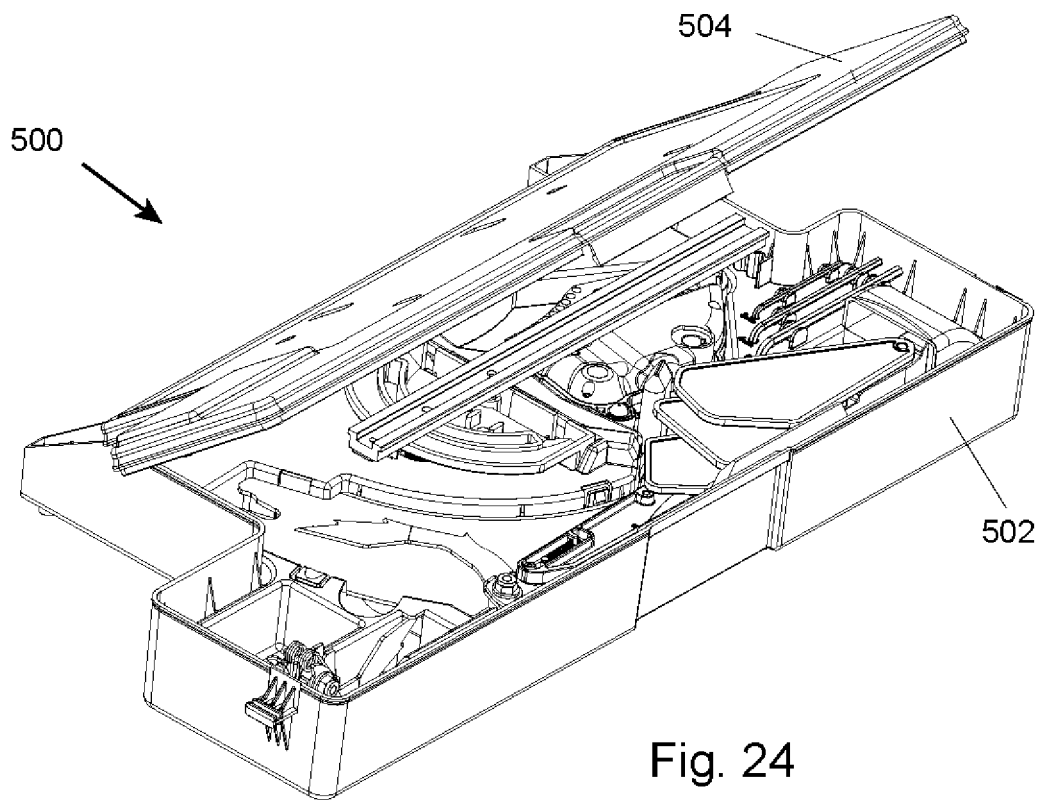
FIG. 24 shows the drawer of FIG. 23 with a lid open.

Drawer 500 includes a drawer tray 502 with a lid 504, as shown in FIGS. 23 and 24. The perimeter of tray 502 is shaped to provide clearance for components within saw 10, and accordingly, has what may be thought of as a shape resulting from two rectangles being joined together, one rectangle being smaller than the other. Of course, the drawer can take different shapes depending on the design of the saw.

Figure 27:
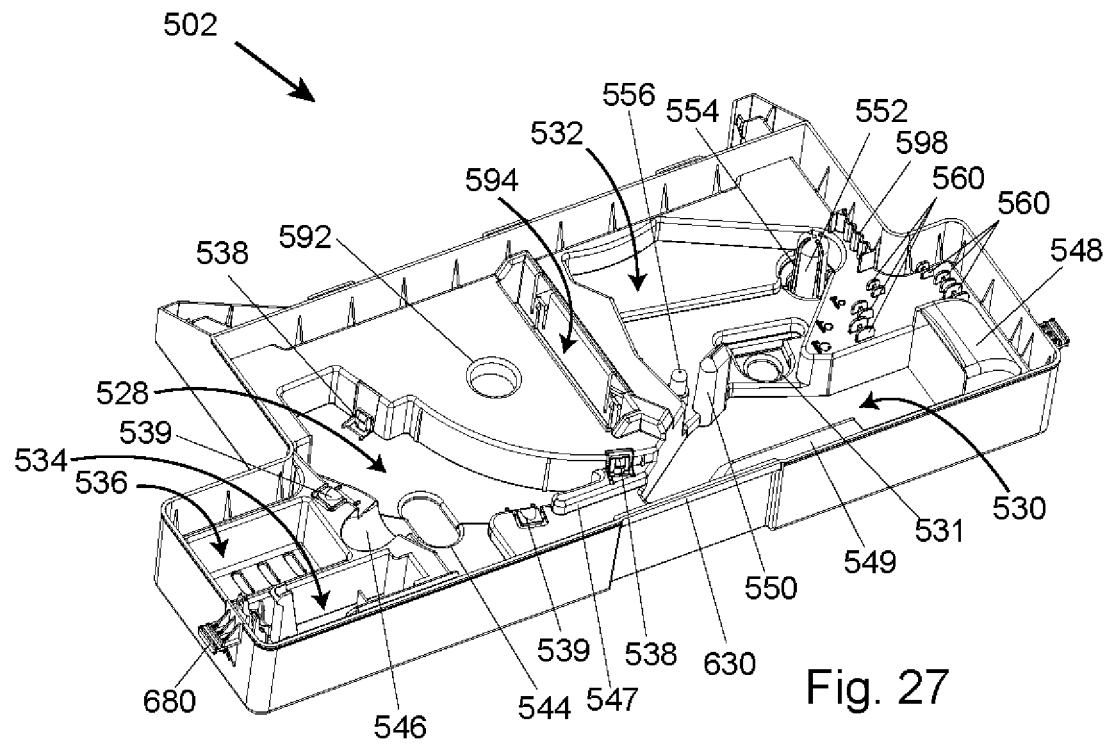
FIG. 27 shows the drawer of FIG. 23 with areas shaped to store specific components and accessories.
Figure 28:
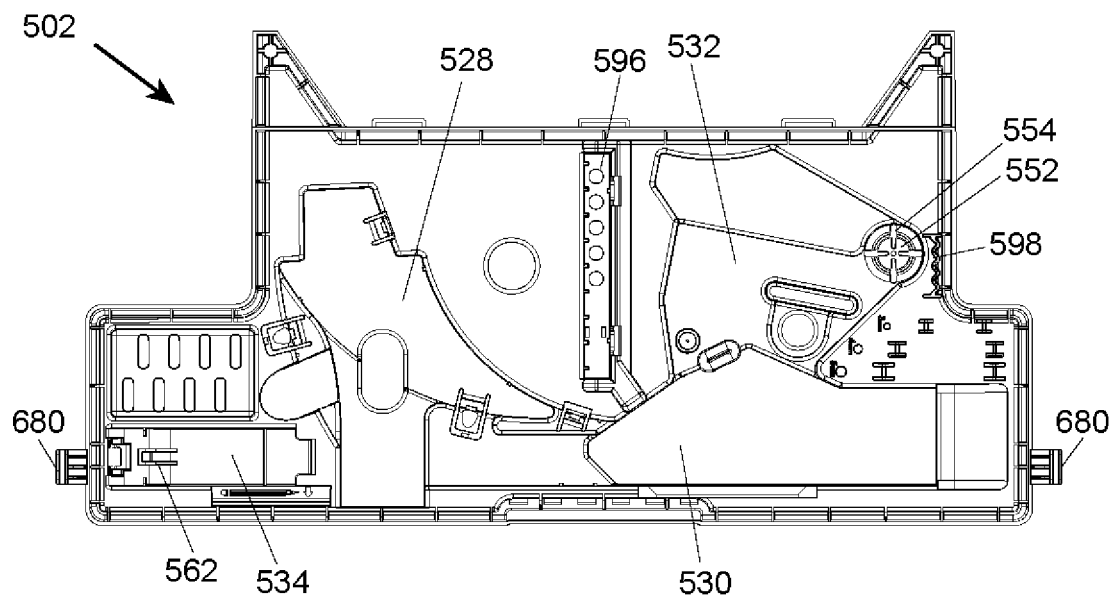
FIG. 28 also shows the drawer of FIG. 23 with areas shaped to store specific components and accessories.

In the depicted embodiment, as shown specifically in FIGS. 25 through 31, drawer 500 includes defined areas to store a blade guard 510, a riving knife 512, a brake cartridge 514 or a dado brake cartridge 515 used in some active injury mitigation systems, a set of anti-kickback pawls 516, a miter gauge 518, three hex wrenches 520, 522 and 524 (of sizes 3 mm, 4 mm and 5 mm, for example), and a pencil 526. Defined areas 528, 530, 532 and 534, labeled in FIGS. 27 and 28, are along the bottom of the drawer tray and are molded roughly like the shape of the components stored in these areas. The bottom of the drawer tray around these areas is raised so that the defined areas are recessed. In addition to these defined areas, there is a rectangular recessed area 536 to store miscellaneous items. The bottom or floor of area 536 includes slots to allow dust to escape.

Area 528 is shaped to accommodate a riving knife. Snap tabs 538 and 539 are positioned along the edge of the area to help hold the riving knife in place. The riving knife deflects the tabs when the riving knife is pushed into the area and the tabs snap back to hold the riving knife in place when the riving knife is fully seated. An oblong finger hole 544 is located on the bottom of the drawer tray along an edge of area 528 to allow a finger to scoop under the riving knife and pull the riving knife out of the drawer. One or more of tabs 538 and 539 can be configured so that they must be deflected manually to release the riving knife.

Area 530 is shaped to accommodate a blade guard and spreader. A finger scoop 546 (labeled in FIG. 27), formed by a recessed area in the raised surface of the drawer tray, is located along the back edge of the spreader of the blade guard and partially extends underneath the spreader to allow a finger to scoop under the spreader to remove the blade guard. In order to help keep the blade guard in place, the tip of the front of the blade guard fits under a small cover 548. A long, narrow hump 547 runs along the bottom of the blade guard near the tip of the spreader also to help keep the blade guard in position. As with the riving knife, there are tabs 538 and 539 are to hold the blade guard in place. Blade guards often include moveable sides, and an upward extension 549 and a stub 550 (labeled in FIG. 27) help keep the sides in place.

Some table saws are equipped with active injury mitigation technology, and area 532 is shaped to accommodate a brake cartridge or a dado brake cartridge used in some types of active injury mitigation systems. A cylindrical extension 552, shaped like a hollow cylinder enclosed with a rounded top, extends up from the bottom of the drawer tray. Four equally spaced slits 554 run up along the side of the cylinder and wrap around to the top, stopping short of meeting each other at the top. At the bottom of cylindrical extension 552 the slits continue back up to the bottom of the drawer tray as the extension extends down a bit past the bottom of the drawer tray. The slits allow the cylinder to compress slightly when a brake cartridge or other object is placed over the extension. This helps hold the object in place as the sides of the cylindrical extension push against the object. Another small cylindrical extension 556 is used together with the cylindrical extension 552 to help keep the brake cartridge in position in the drawer. A hole 531 allows room for a portion of the brake cartridge to extend down past the bottom surface of the drawer, if needed.

Area 532 is designed to store three hex wrenches. Holders 560 secure the wrenches in place.

Area 534 is designed for a set of anti-kickback pawls. A structure 562 holds the anti-kickback pawls in place.

Figure 25:
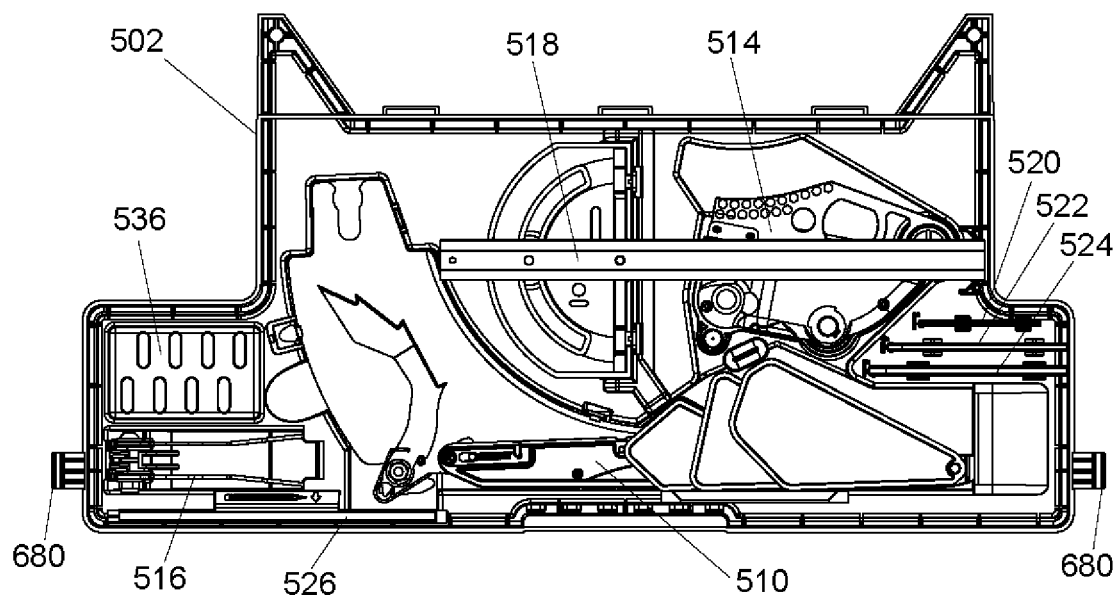
FIG. 25 shows the drawer of FIG. 23 storing various saw components and accessories.
Figure 26:
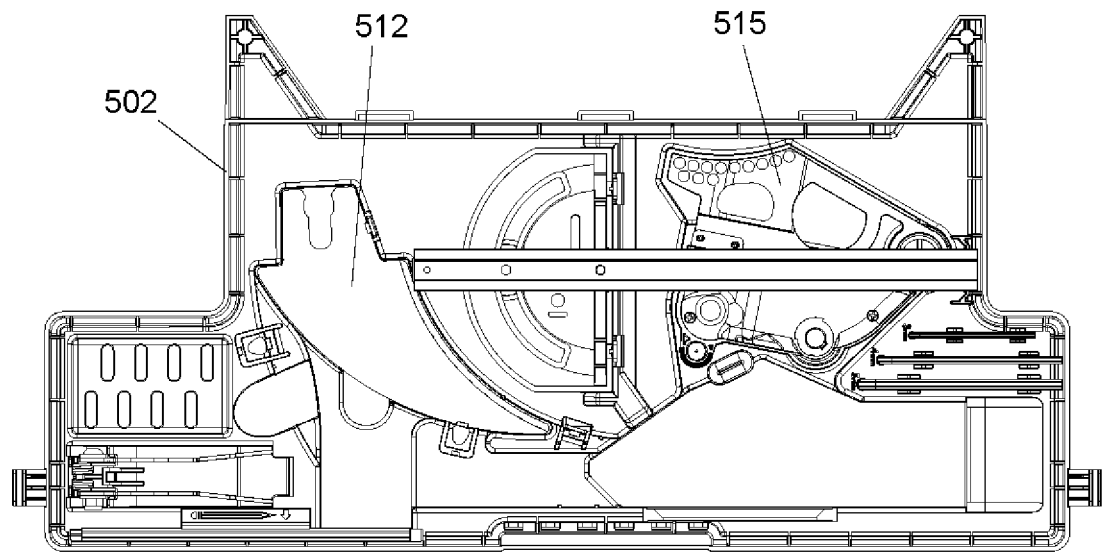
FIG. 26 also shows the drawer of FIG. 23 storing various saw components and accessories.

A miter gauge 518 can also be stored in the drawer by placing the miter gauge over the blade guard and brake cartridge, as seen in FIG. 25. A cylindrical handle on the miter gauge fits through a large round hole 592 in the bottom of the drawer tray and an edge on the miter gauge fits in a rectangular recessed area 594. There are a series of holes 596 on the bottom surface of area 594 to let dust escape. Support structure 598 supports the tip of the miter gauge bar.

Figure 32:
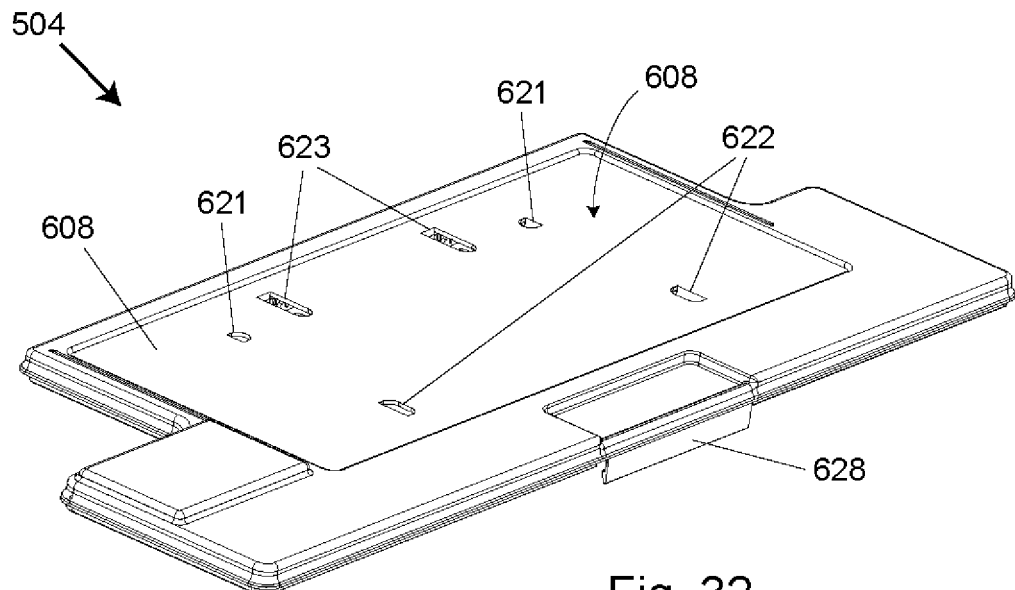
FIG. 32 shows a drawer lid.
Figure 33:
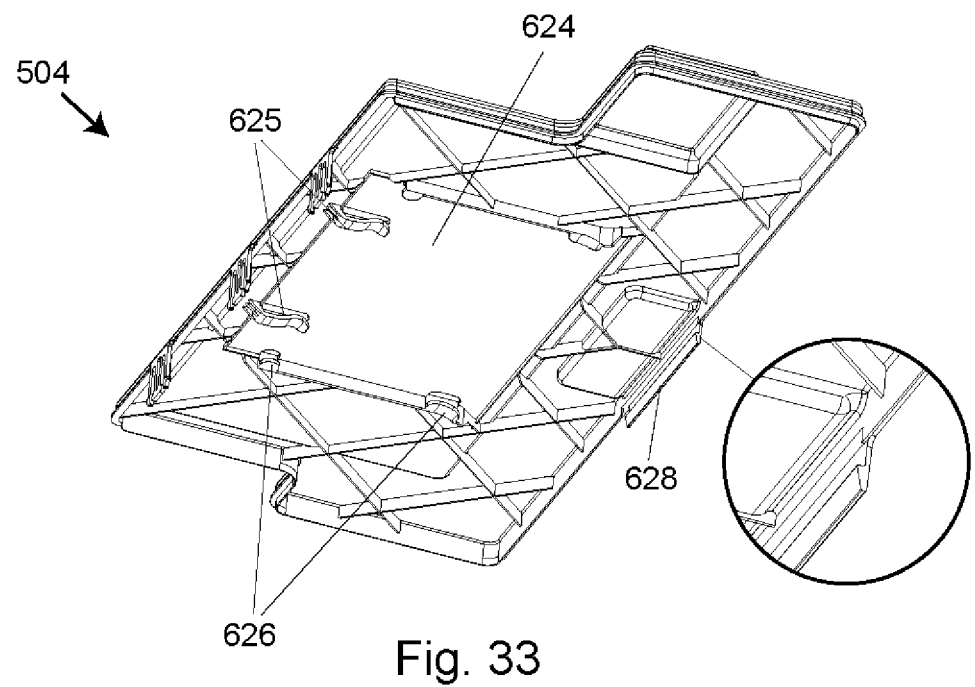
FIG. 33 shows the bottom of the drawer lid shown in FIG. 32.

Lid 504 is shown isolated in FIGS. 32 and 33. On the top surface of the lid there is a large rectangular, slightly recessed area 608 within which a label or sticker can be attached with information about the saw and/or with safety warnings. On the bottom or interior surface of the lid there is an area 624 to store an owner's manual. The owner's manual can be held in place by clips and tabs, such as clips 625 and tabs 626.

Figure 34:
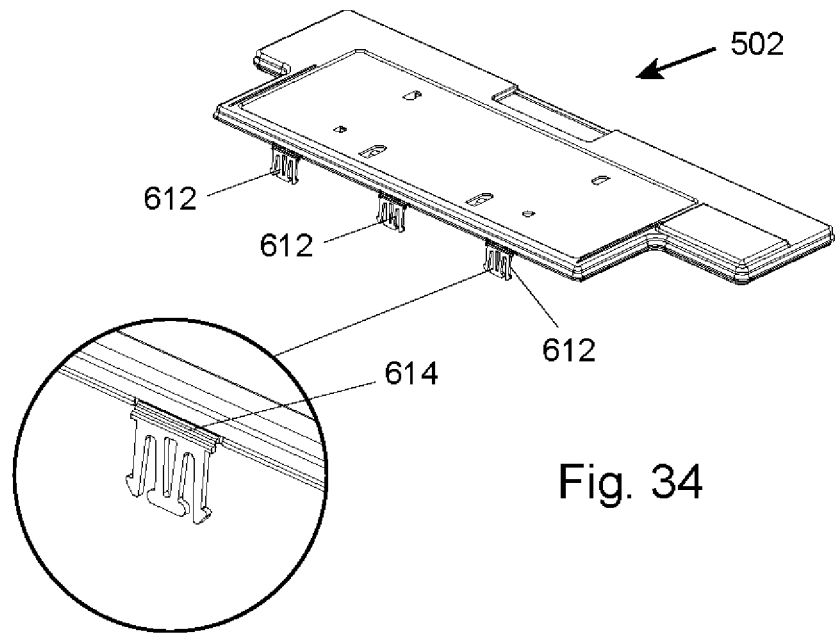
FIG. 34 shows hinges on a drawer lid.
Figure 35:
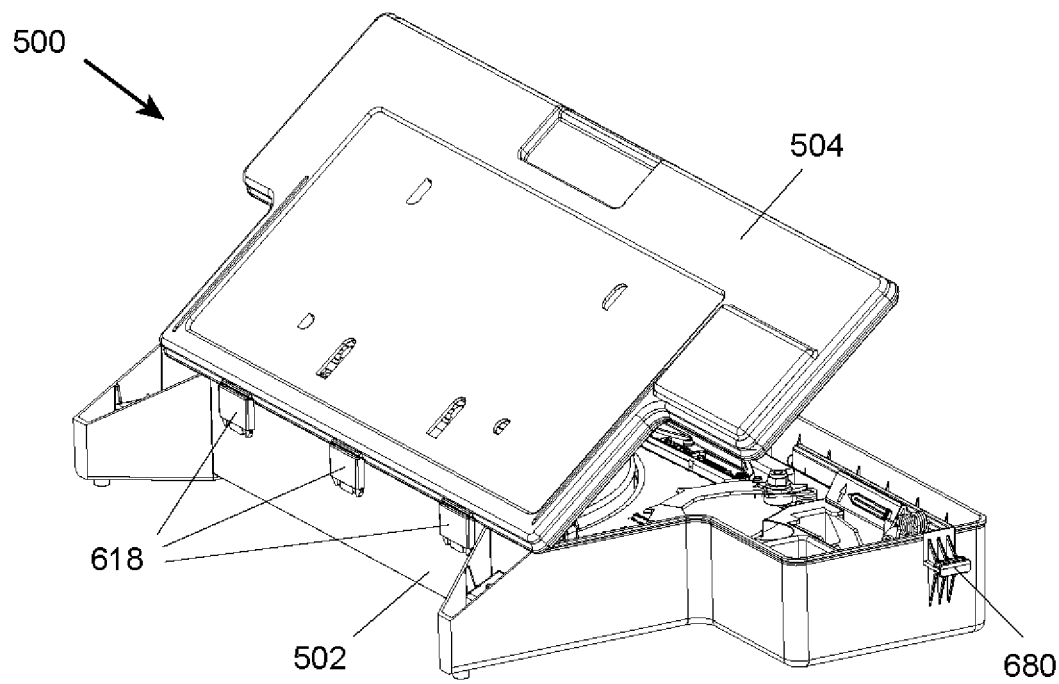
FIG. 35 shows a drawer lid attached to a drawer tray.

In the depicted embodiment, lid 504 is attached to drawer tray 502 by hinges. As seen in FIG. 34, three hinge extensions 612 are spaced along the back edge of lid 504. The extensions are molded as part of the lid and a thin strip of material 614 joins each extension to the lid to create flex points or living hinges so the lid can open while the extensions are held secure. Three hinge sockets 618 are spaced along the back of drawer tray 502, as seen in FIG. 35. The extensions are designed to compress slightly as they are inserted into the sockets, and to snap out and lock in place when the ends of the extensions pass beyond the bottoms of the sockets, as shown in FIG. 35, thereby securing the lid to the drawer tray. The lid can also be removed from the drawer by compressing the extensions and pulling them out of the sockets.

A latch 628 is molded into the side of the lid opposite the hinges, as shown in FIGS. 32 and 33, and is configured to latch over a corresponding lip 630 (shown in FIG. 27) on drawer tray 502. Latch 628 is slightly flexible so when the lid is closed latch 628 moves over and past lip 630, and then flexes back to catch on the lip and hold the lid closed. A user simply flexes latch 628 out to open the lid.

Drawer 500 is mounted in the saw such that the user is able to slide it out to the right far enough for the lid to clear the edge of the table when the lid is opened. Table 12 and/or extension table 50 may be notched or shaped to provide sufficient clearance for the drawer to open and for a user to reach between the edge of the drawer and extension table 50 to open the drawer.

Figure 5:
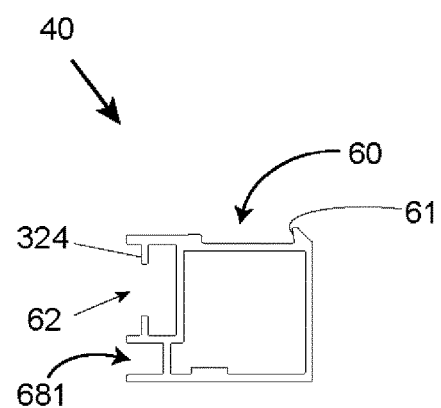
FIG. 5 shows an end view of the front rail of FIG. 4.

Drawer 500 is supported in the saw by two forward supports 680, one on the side of the drawer nearest the front of the saw, the other on the opposite side of the drawer nearest the rear of the saw, and both near the side of the drawer with latch 628. (Supports 680 are labeled in at least FIGS. 27, 28 and 35.) Front rail 40 and rear rail 42 each include a channel 681 extending along the length of the rail, as shown in FIGS. 5 and 8. Forward supports 680 are shaped to fit into those channels to support the drawer, and to slide along the channels when the drawer is extended or retracted.

Figure 29:
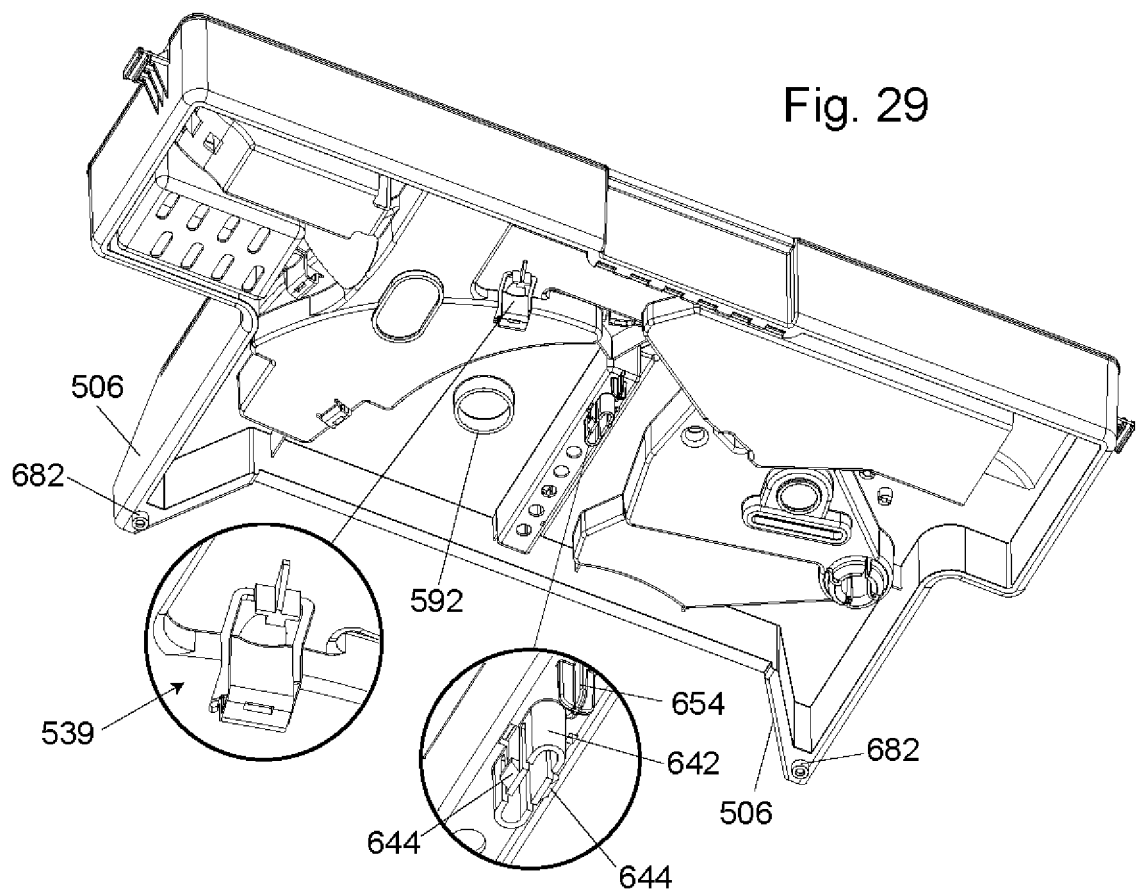
FIG. 29 is a bottom view of the drawer of FIG. 23.
Figure 30:
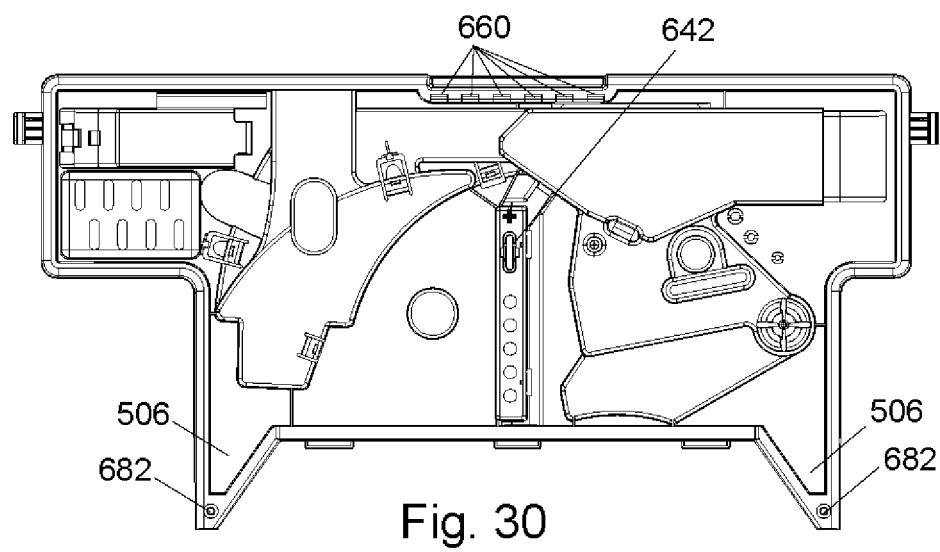
FIG. 30 is another bottom view of the drawer of FIG. 23.
Figure 31:
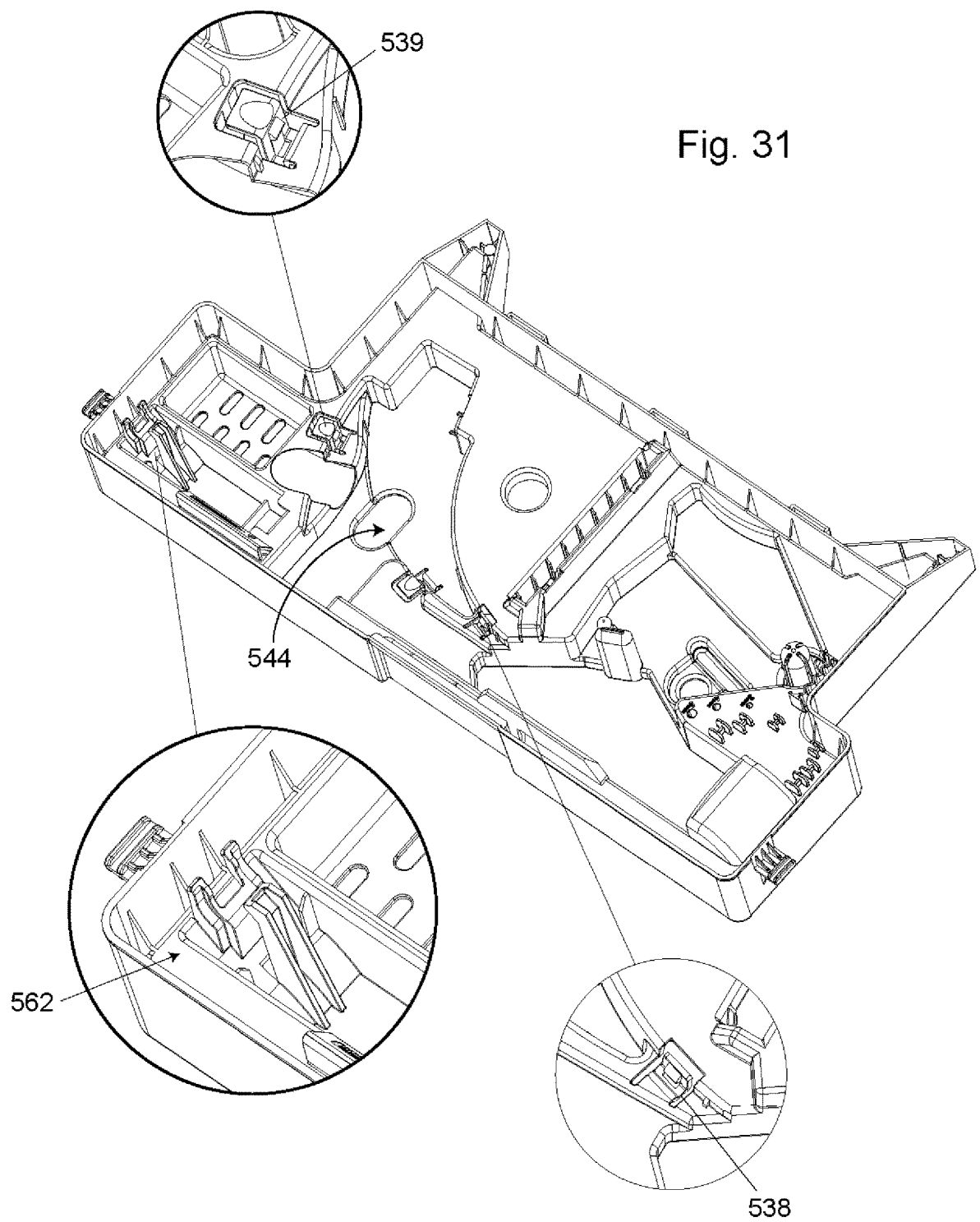
FIG. 31 is another view of the drawer of FIG. 23, with several structures enlarged.

Drawer 500 is further supported in the saw by two rear supports 682, shown in FIGS. 29 and 30. Rear supports 682 are located at the end of two arms 506 that extend out from the side of the drawer adjacent hinges sockets 618, one arm extending out from the side of the drawer nearest the front of the saw, the other on the opposite side of the drawer nearest the rear of the saw. In the depicted embodiment, arms 506 are somewhat triangularly shaped. The arms extend out from the drawer so that the drawer is supported in the saw when the drawer is extended sufficiently for lid 504 to be opened without bumping into table 12. In other words, arms 506 support the saw in a way to provide clearance for lid 504 to be opened.

Figure 36:
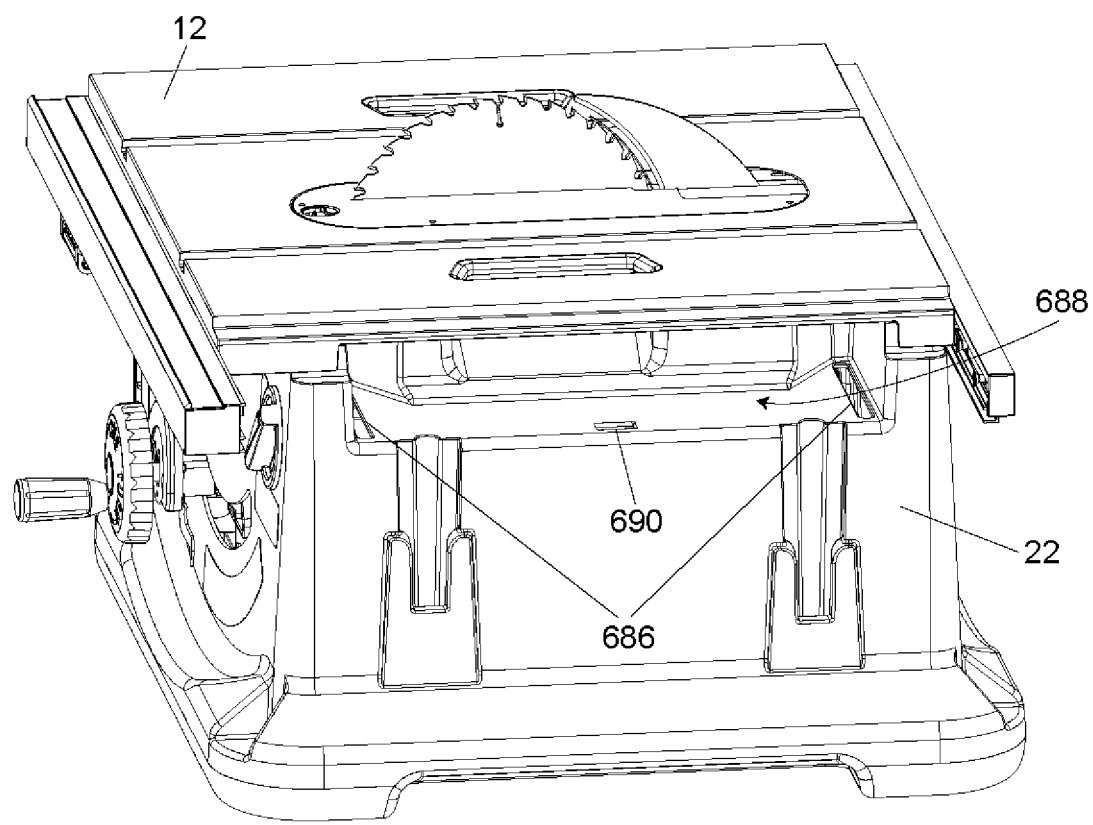
FIG. 36 is a side view of a table saw showing slots for a drawer.

Saw housing 22 includes two slots or channels 686, shown in FIG. 36, one toward the front of the saw and the other toward the rear of the saw. Slots 686 are formed in a recess 688 which is part of housing 22. In the depicted embodiment, recess 688 is formed when housing 22 is molded, and the recess includes a bottom and sides. The top of the recess is covered by table 12. Recess 688 shields drawer 500 from the internal mechanism of the saw, blocks a user from extending a hand into the saw through the area where the drawer is located, prevents other items from dropping into the saw through the area where the drawer is located, and tends to block at least some sawdust from traveling from the interior of the saw into the drawer.

Each of rear supports 682 fits into one of slots 686 and the bottom of the drawer rests on the bottom of recess 688. By fitting into slots 686, rear supports 682 guide the motion of drawer 500 as it is extended and retracted. Additionally, the length of slots 686 is sized to define stops for the drawer travel. A user can extend and retract drawer 500 until rear supports 682 contact the ends of slots 686. Each of the rear supports 682 includes a screw hole, and a screw with a washer extends from below the bottom of recess 688 up into each screw hole in rear supports 682. The washers are below the bottom of recess 688 and they overlap with the edges of slots 686 to hold the rear supports in the slots and to hold the drawer in the saw.

Figure 37:
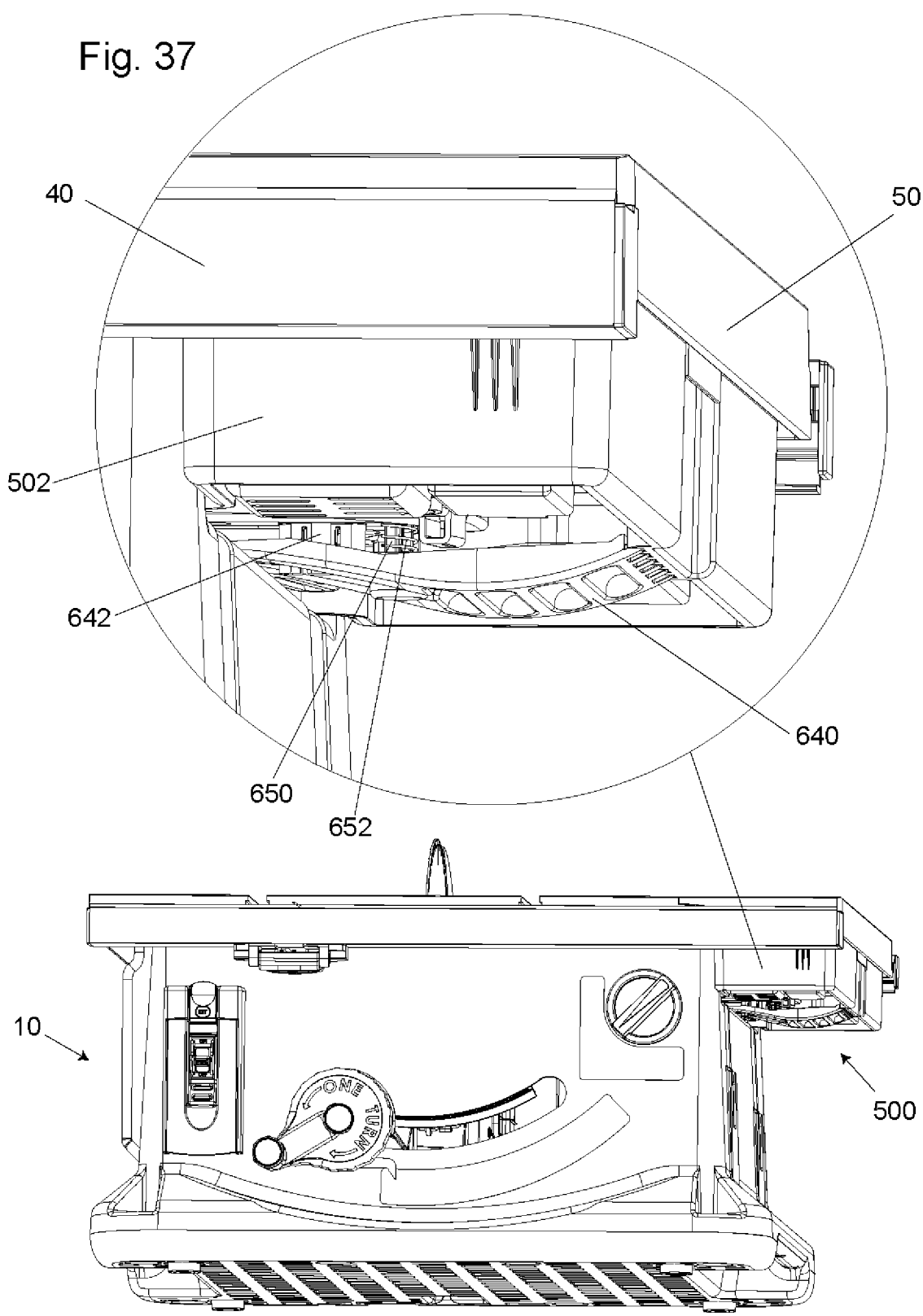
FIG. 37 shows a table saw with a drawer and drawer latch.
Figure 38:
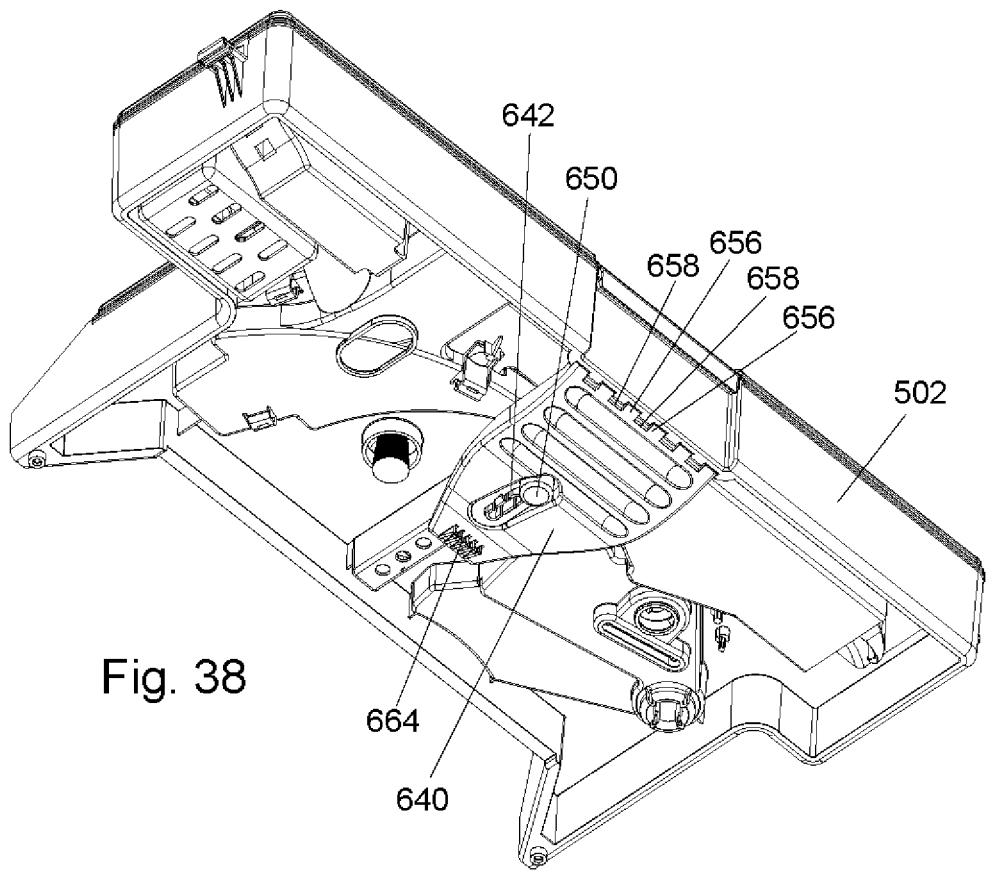
FIG. 38 shows a drawer with a latch.

Recess 688 includes a notch 690 used to hold the drawer in its retracted position. The notch interacts with a latch 640 on the bottom of the drawer to hold the drawer in place. FIG. 37 shows table saw 10 with drawer 500 retracted and latch 640 engaged in notch 690. Latch 640 is also shown in FIG. 38 on the bottom of drawer 500, and latch 640 is shown isolated in FIG. 39.

Figure 39:
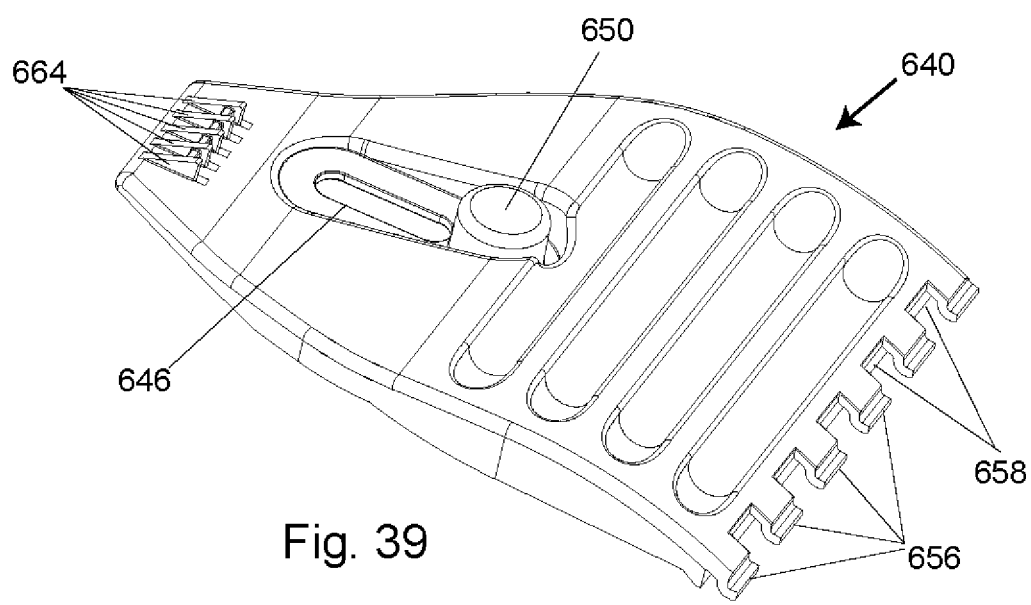
FIG. 39 shows a latch.

Latch 640 attaches to the bottom of the drawer tray by an extension 642 that comes down from the bottom of the drawer tray, as shown in FIGS. 29 and 37. Extension 642 is shaped like a hollow rectangle with rounded ends, and has two catches 644 that extend down along the side of the extension. Extension 642 fits through a corresponding slot 646 in the latch, and catches 644 flex inward so that they fit through slot 646. Once the ends of catches 644 have passed through slot 646, the catches flex outward again so that they overlap the latch from underneath to hold the latch between the underside of the tray 502 and the catches 644. A cylindrical cavity 650 is located next to slot 646 and a coil spring 652 fits into the cavity between the latch 640 and the bottom of the drawer tray 502. A stub 654 extends down from the bottom of the drawer to help keep the spring in position. The edge of latch 640 closest to extension table 50 has a number of projections 656 and recesses 658 that mesh with corresponding projections and recesses in drawer tray 502 to create somewhat of a hinge and to help hold the latch in position. The end of each projection is curved, as shown in FIG. 39, to overlap the edge of its corresponding recess when the latch is installed in the saw. At the other end of the latch there are a series of triangular extensions 664 that fit into slot 690 in recess 688 to keep the drawer from sliding outward.

In the depicted embodiment latch 640 has a somewhat curved bottom surface, shaped to fit a hand. The bottom surface may also include grooves or texturing to provide a nice feel and contact surface.

To release the drawer so it can be extended out, a user pushes up against the bottom surface of latch 640 to compress spring 650 and to release extensions 664 from notch 690. When the drawer is pushed back in, triangular extensions 664 contact the bottom of recess 688 and compress spring 650 until the extensions fall into notch 690. Spring 650 biases extensions 664 down and into notch 690 to keep the drawer in place until released by a user.

As an alternative to latch 640 and notch 690, housing 22 can be formed with a tab having a raised surface that engages a notch on the bottom of the drawer. The raised surface can be sloped or shaped so that a user can pull the drawer out, without having to squeeze or depress a latch, and the action of pulling the drawer out causes the tab to flex and the raised surface to move out of the notch in the bottom of the drawer. When the drawer is retracted, the drawer deflects the tab until the raised surface is under the notch, at which point the tab flexes up and the raised surface engages the notch to hold the drawer in place. Of course, such a system could be designed so that the tab is on the drawer instead of the housing, and the notch in the housing instead of the drawer. A system such as this allows a user to extend and retract the drawer simply by pulling and pushing the drawer; it does not require a user to manipulate a latch. However, the drawer is less secure than with a more positive latch such as latch 640.

Drawer 500 shown in FIGS. 20 through 31 is an example of a drawer designed to accommodate specific components and accessories. Other drawers could be designed to accommodate other components and accessories.

Figure 40:
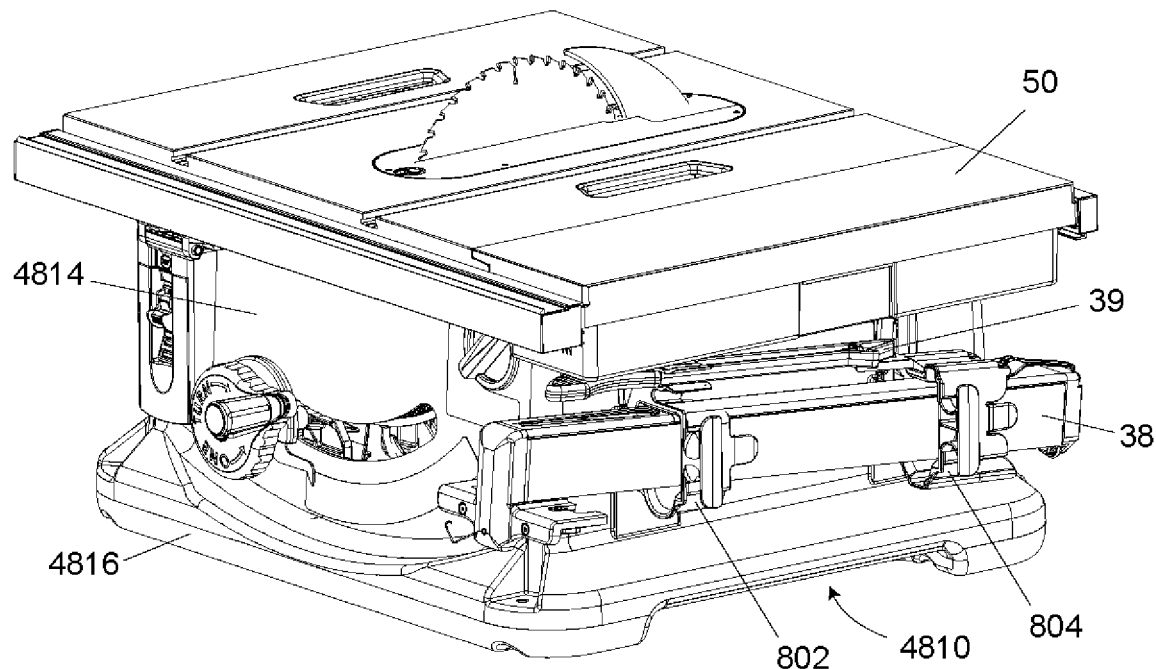
FIG. 40 is a side, perspective view of a table saw with storage for a fence, push stick and cord.
Figure 41:
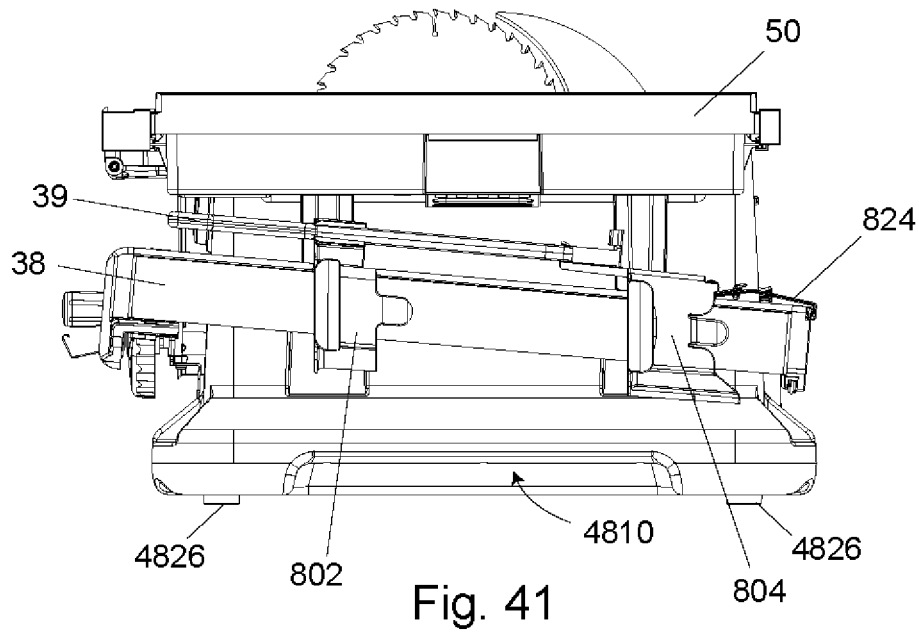
FIG. 41 is a side, plan view of a table saw with storage for a fence, push stick and cord.

Table saw 10 also includes on-board storage for fence 38, a pushstick 39, and a power cord, as shown in FIGS. 40 and 41. A front bracket 802 and a rear bracket 804 are mounted on the right side of the saw under extension table 50. The brackets are spaced apart with bracket 802 toward the front of the saw and positioned about midway up the side of the housing and bracket 804 toward the rear and positioned a little lower than the front bracket.

Figure 42:
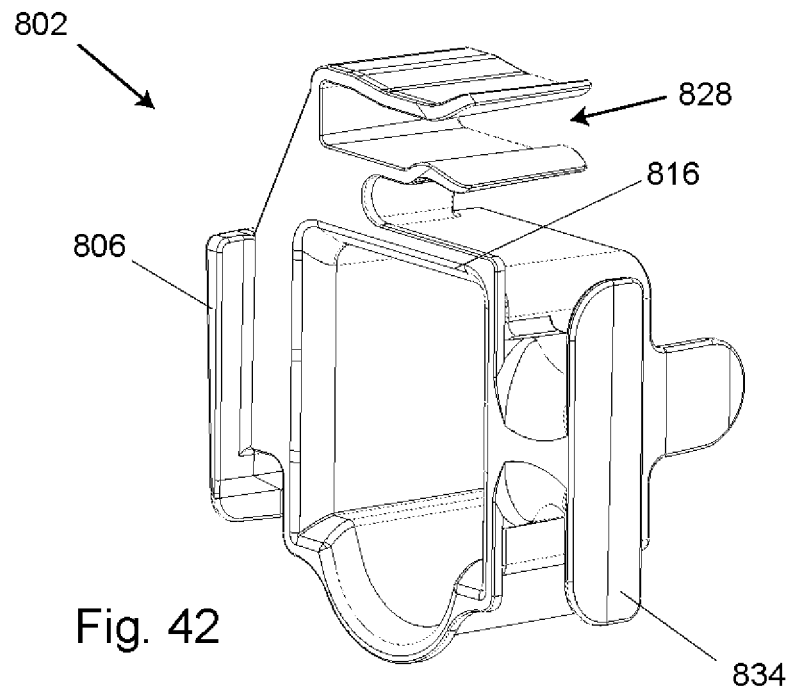
FIG. 42 is a perspective view of a front bracket.
Figure 43:
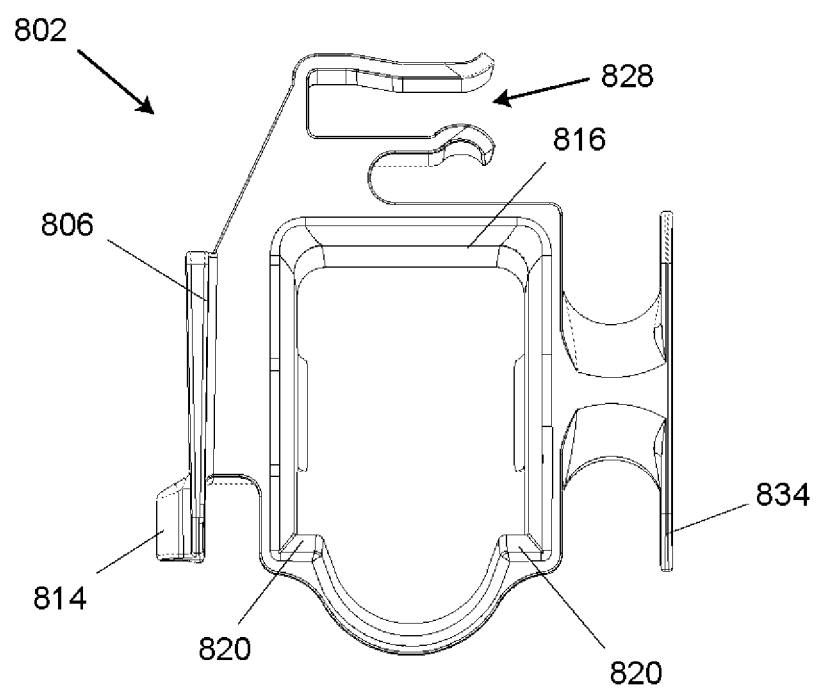
FIG. 43 is a front view of the front bracket of FIG. 42.
Figure 44:
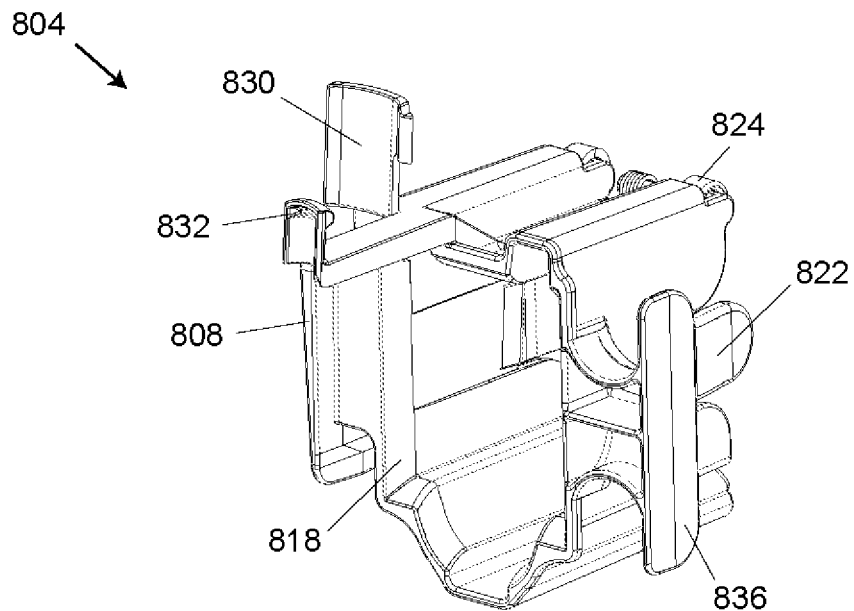
FIG. 44 is a perspective view of a rear bracket.
Figure 45:
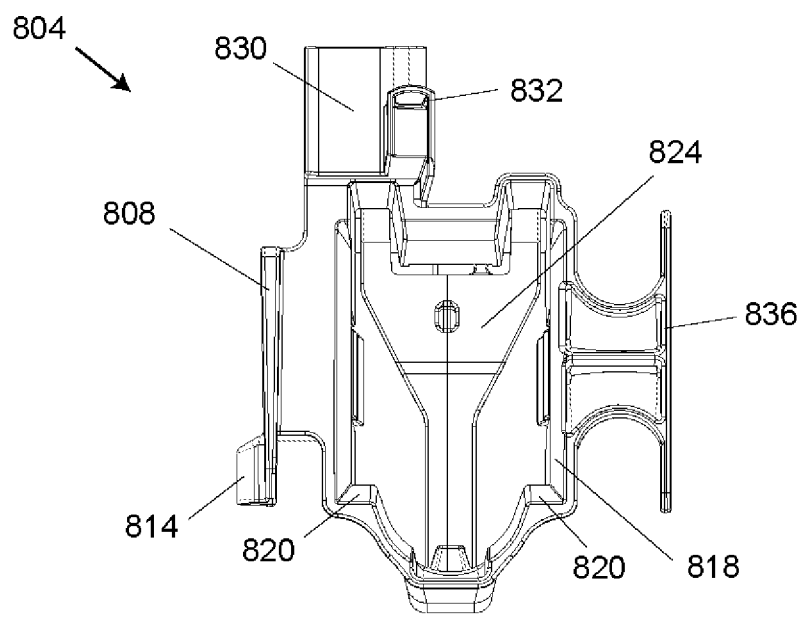
FIG. 45 is a front view of the rear bracket of FIG. 44.
Figure 46:
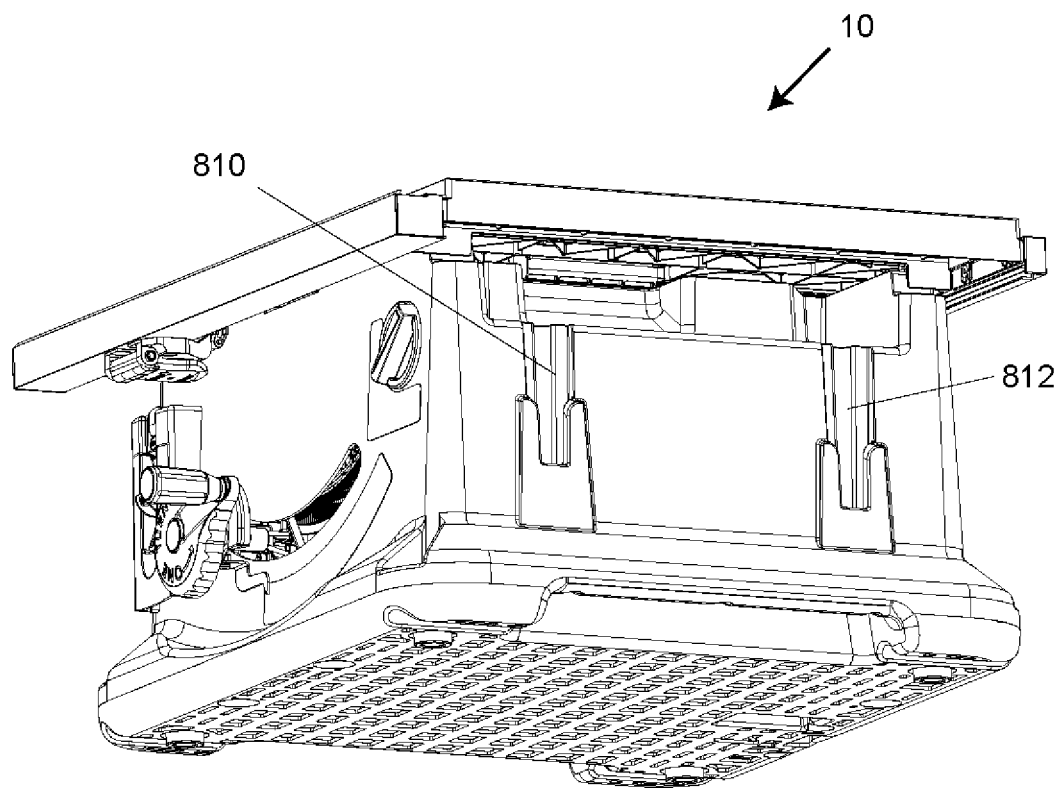
FIG. 46 is a view of a saw housing configured to accommodate the front and rear brackets of FIGS. 42 and 44.

Front bracket 802 is shown isolated in FIGS. 42 and 43, and rear bracket 804 is shown isolated in FIGS. 44 and 45. Front bracket 802 has a flange 806 and rear bracket 804 has a flange 808 that are configured to fit into channels 810 and 812, respectively, molded into the side of table saw housing 22. FIG. 46 shows table saw housing 22 with channels 810 and 812. Brackets 802 and 804 are attached to the table saw by flanges 806 and 808 sliding down to the bottom of channels 810 and 812, respectively. The bottom of each of flange 806 and 808 can include a screw boss, such as screw bosses 814 shown in FIGS. 43 and 45, so that the brackets can be screwed in place.

Front bracket 802 is shaped to define a loop 816, and rear bracket 804 includes a similar loop 818. The loops are configured so that the fence can be inserted through them. More specifically, fence 38 is inserted through loop 816 in the front bracket and then through loop 818 in the rear bracket to store the fence when not in use, as shown in FIGS. 40 and 41. The rear bracket is positioned lower than the front bracket so that the fence slopes downward and gravity helps keep the fence in the brackets. Loops 816 and 818 are shaped like vertically oriented rectangles, except that the center portions of the bottom surfaces extend down to provide clearance for screws or other irregularities that might extend out from the bottom of the fence. The bottom surfaces define shelves 820 along the bottom corners to support the fence. The inside perimeter of loops 816 and 818 can taper from front to back to provide a larger opening at the front to receive the fence, and a smaller opening at the rear to hold the fence in place. Rear bracket 804 can also include fingers 822 at the rear of the bracket to further grip the sides of the fence. The fingers can be configured to flex outward when the fence is inserted so that the fingers apply some spring force against the side of the fence. The fingers can also be coated or covered with rubber or some other material to increase the friction between the fingers and the fence to help hold the fence in the bracket. Front bracket 802 can also be configured with similar fingers to help hold the fence in place.

Figure 47:
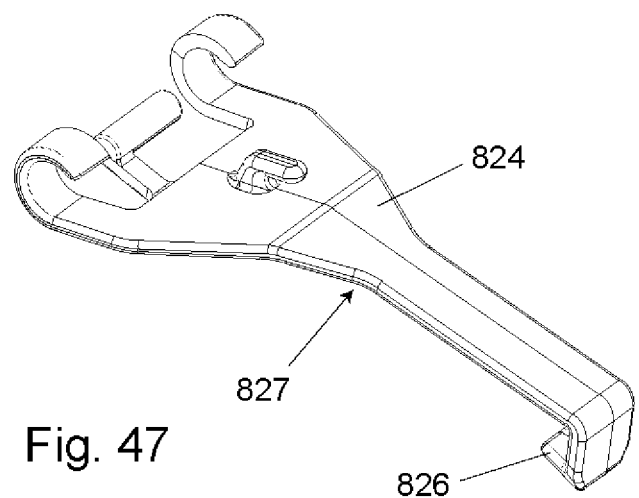
FIG. 47 shows a catch used in a fence storage system.
Figure 48:
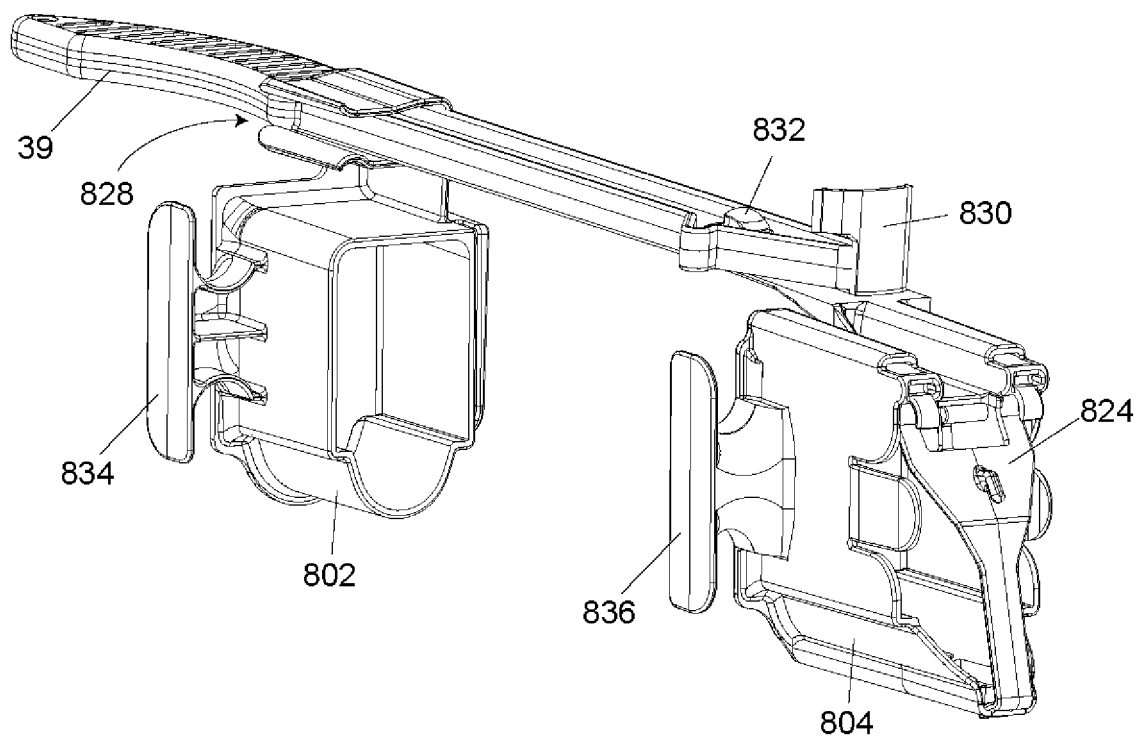
FIG. 48 shows a pushstick in a mount.

In the depicted embodiment, rear bracket 804 includes a catch or latch 824 along the upper, rear edge of the bracket. The catch is hinged to the top of the rear bracket, and a spring biases the catch down behind loop 818. When a user inserts a fence into the brackets, the end of the fence contacts and pivots catch 824 up as the end of the fence slides by. A hook 826 is formed in the end of the catch, as shown in FIG. 47, and a socket is formed in the end of the fence. As a user slides the fence through rear bracket 804, hook 826 will catch the socket at the end of the fence to stop the motion of the fence through the bracket and to help hold the end of the fence in place. Additionally, catch 824 is shaped with a bend or hump 827 to provide some resiliency and cushion when a fence is inserted into the bracket with some force. The catch will flex somewhat to absorb some of that force.

Front and rear brackets 802 and 804 also include a mounting system or structure to hold a pushstick. Specifically, a socket 828 is configured along the top of front bracket 802. The socket has top and bottom flanges that can flex slightly, and the flanges include inwardly extending lips at their ends. A user simply pushes the pushstick into the socket to flex the flanges outward until the pushstick moves past the lips, at which time the flanges spring back to hold the pushstick in place. A user simply pulls the pushstick to flex the flanges and remove the pushstick from the socket.

Rear bracket 804 includes a stop 830 and a tab or hook 832 to help hold the pushstick in position. Stop 830 can be configured to limit both the rearward and upward movement of the pushstick, and it can also be configured to bias the pushstick in one direction or another to further hold the pushstick and to keep the pushstick from rattling when stored. Hook 832 is configured to extend through a hole in the pushstick and overlap a surface of the pushstick, thereby preventing the pushstick from moving up and/or holding the pushstick down.

Front and rear brackets 802 and 804 also include generally T-shaped extensions 834 and 836, respectively, around which a power cord can be wound. The extensions are on the side of brackets 802 and 804 opposite mounting flanges 806 and 808.

In the depicted embodiment, brackets 802 and 804 are molded plastic parts, and all of the loops, shelves, sockets, flanges and tabs that provide mounts for the fence, pushstick and power cord, except catch 824, are molded as part of the brackets and are integral with the brackets. Of course, brackets 802 and 804 can have various configurations and alternatively can be made from other materials and from assemblies of separate parts.

Figure 49:
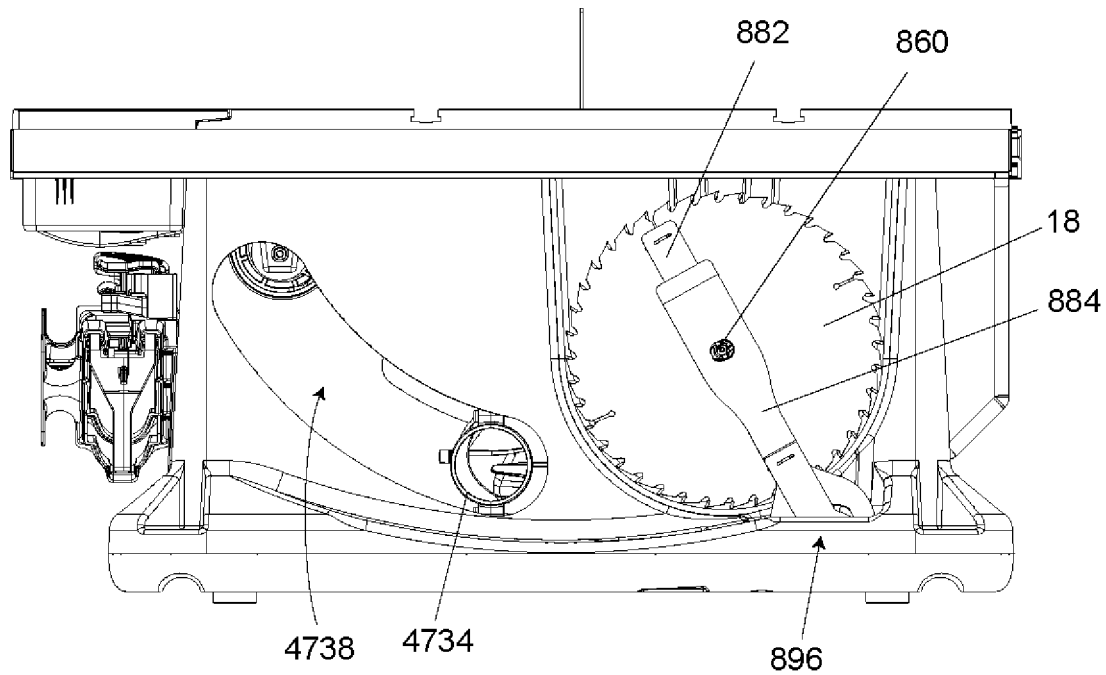
FIG. 49 shows the back of a table saw with on-board storage for an extra blade and blade wrenches.
Figure 50:
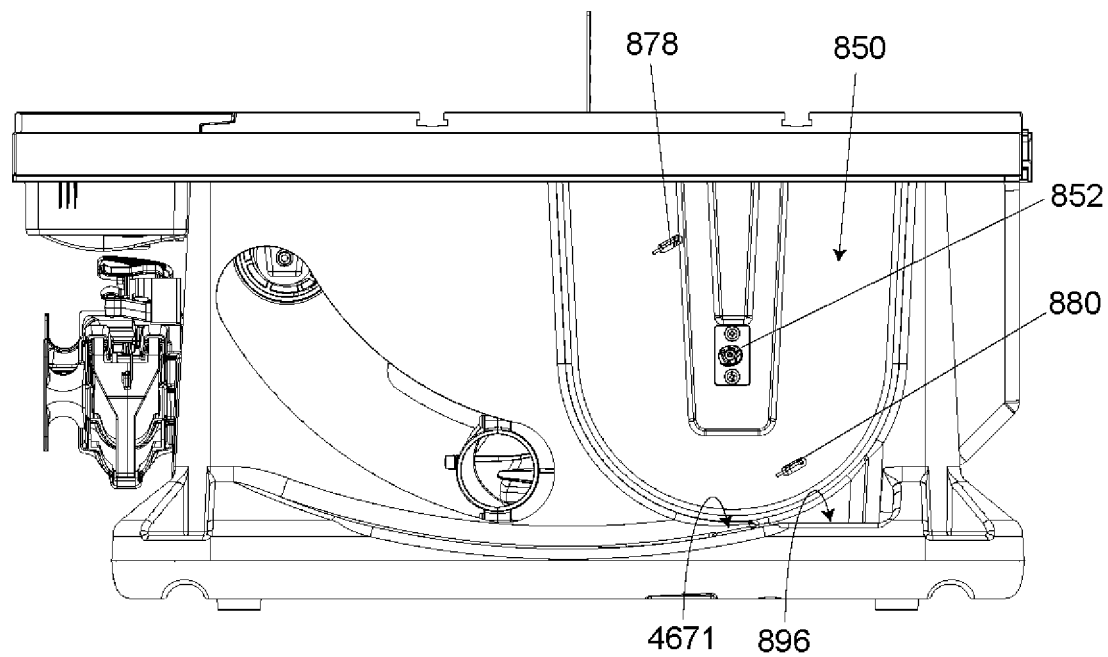
FIG. 50 also shows the back of a table saw with on-board storage for an extra blade and blade wrenches.
Figure 51:
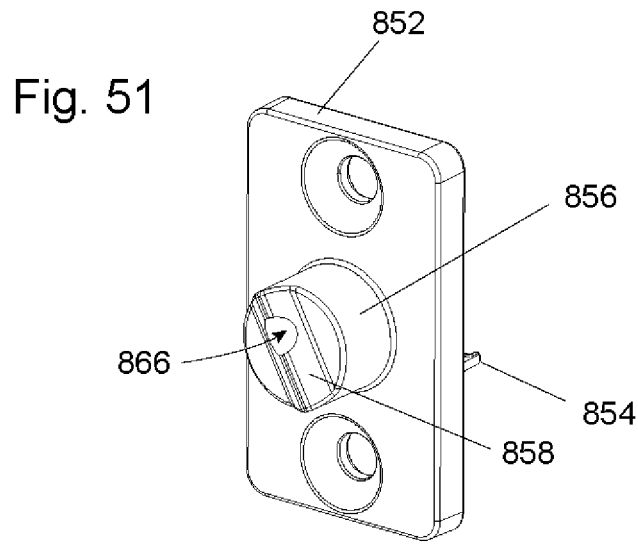
FIG. 51 shows a bracket used in the on-board storage of FIGS. 49 and 50.
Figure 52:
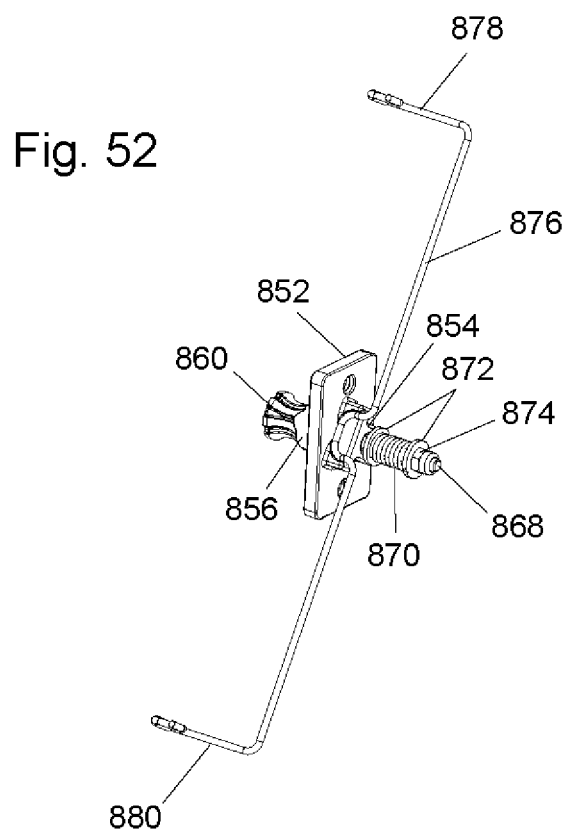
FIG. 52 shows the bracket of FIG. 51 with other components.

Table saw 10 includes on-board storage for an extra blade 18 and blade wrenches 882 and 884, as shown in FIGS. 49 and 50. The back wall of housing 22 includes a slightly recessed area 850 shaped to receive a circular blade with a 10-inch diameter, and a bracket 852 is bolted or screwed onto the housing roughly in the middle of recessed area 850. Bracket 852 is shown in FIGS. 51 and 52, and it includes both a rear projection 854 that extends through a hole in housing 22, and a cylindrical front projection 856 that extends out away from the saw. The distal end of front projection 856 includes a ridge 858.

Figure 53:
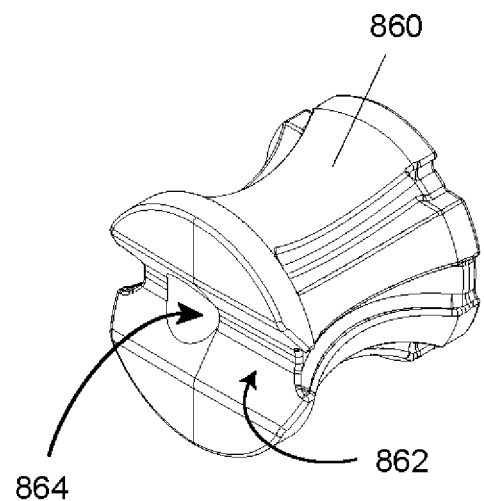
FIG. 53 shows a locking knob.
Figure 54:
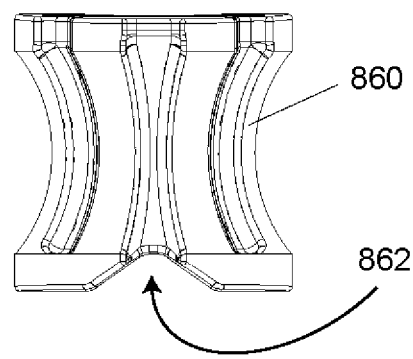
FIG. 54 also shows the locking knob of FIG. 53.

A locking knob 860, shown isolated in FIGS. 53 and 54, is attached to the distal end of front projection 856, over ridge 858, as shown in FIGS. 49 and 52. The surface of locking knob 860 which is against the distal end of front projection 856 includes a channel or groove 862 shaped to fit over ridge 858. An off-center hole 864 extends through the length of locking knob 860, and a corresponding off-center hole 866 extends through front projection 856 and rear projection 854 in bracket 852. A bolt 868 extends through holes 864 and 866 and out the back of bracket 852 to hold locking knob 860 to front projection 856. Bolt 868 extends out the back of bracket 852 sufficiently far for a coil spring 870 to fit over the bolt between washers 872, and a nut 874 threads onto the bolt to hold the assembly together, as shown in FIG. 52. The length of bolt 868 allows locking knob 860 to be pulled out, away from bracket 852, compressing spring 870, so that channel 862 in the locking knob clears ridge 858 on front projection 856 and the locking knob can be turned around an axis parallel to the length of bolt 868. When turned, the locking knob will remain stable and away from front projection 856 because channel 862 will no longer align with ridge 858 and the bottom surface of the locking knob will rest on ridge 858. Spring 870 biases locking knob 860 toward bracket 852 so that the locking knob is stable when it is turned, and also so that the spring will pull channel 862 over ridge 858 when the locking knob is turned back.

Figure 55:
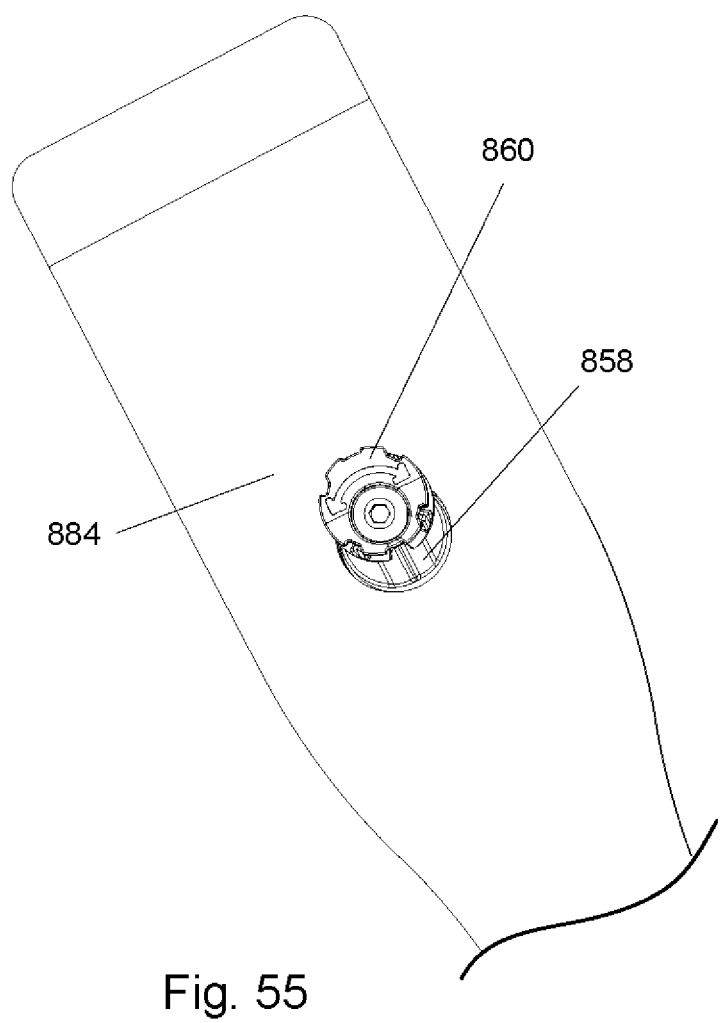
FIG. 55 shows the locking knob of FIG. 53 offset to hold a blade wrench.

Locking knob 860 and front projection 856 are sized so that when channel 862 is over ridge 858, the locking knob and front projection align to present a stub having a predetermined maximum diameter. The diameter is selected so that the stub will fit through the arbor hole of a 10" saw blade, which is typically ⅝ths of an inch in diameter, so for those blades the diameter of the stub will be slightly less than that. Blade wrenches can also include a mounting hole of the same size as the arbor hole. A user can then place the blade and blade wrenches over and past the locking knob and onto front projection 856. As stated, holes 864 and 866 in the locking knob and front projection are off-center, so the locking knob will extend beyond the perimeter of the front projection when the locking knob is turned, as shown in FIG. 55, and overlap the blade and blade wrenches to hold them in place. The locking knob, ridge 858, and channel 862 can all be positioned so that the locking knob overlaps different portions of the blade and blade wrenches as needed. For example, centering the overlap on the blade wrenches over a line extending along the length of the wrenches in the side-to-side center of the wrenches, as shown in FIG. 55, minimizes the chance of the blade wrenches twisting and slipping off front projection 856.

An arrangement as described provides an effective and easy-to-use mechanism to store an extra blade and blade wrenches on a saw. As stated, a user places the blade and blade wrenches onto front projection 856, and the user then turns locking knob 860 to provide a surface that overlaps the blade and blade wrenches so they cannot slide off of front projection 856. To remove the blade and blade wrenches, a user simply rotates locking knob back so that channel 862 and ridge 858 align, which causes the locking knob to align with the front projection, and a user slides the blade and blade wrenches off.

A spring 876 having two elongate arms 878 and 880 is attached to the back side of bracket 852, as shown in FIG. 52. Rear projection 856 is configured to hold spring 876 in place. The distal ends of arms 878 and 880 extend through slots in housing 22, as shown in FIG. 50. The arms function to bias the blade and blade wrenches out when stored on front projection 856 to maintain pressure against locking knob 860 and to minimize rattling of the blade and blade wrenches.

Figure 56:
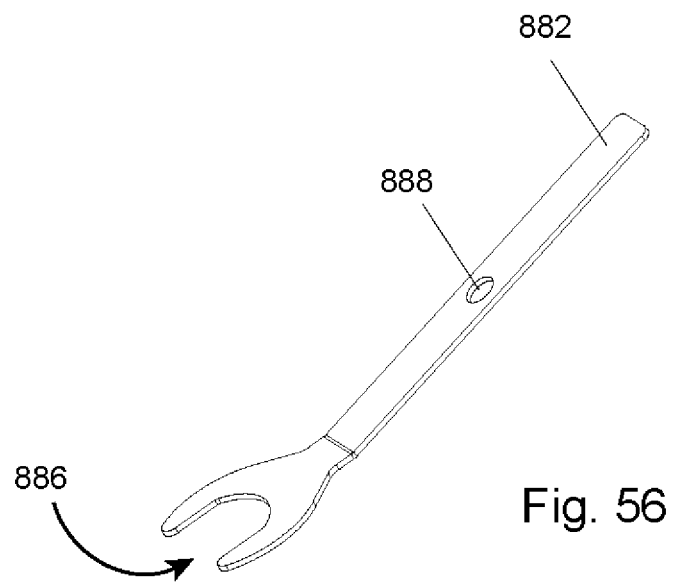
FIG. 56 shows a blade wrench.
Figure 57:
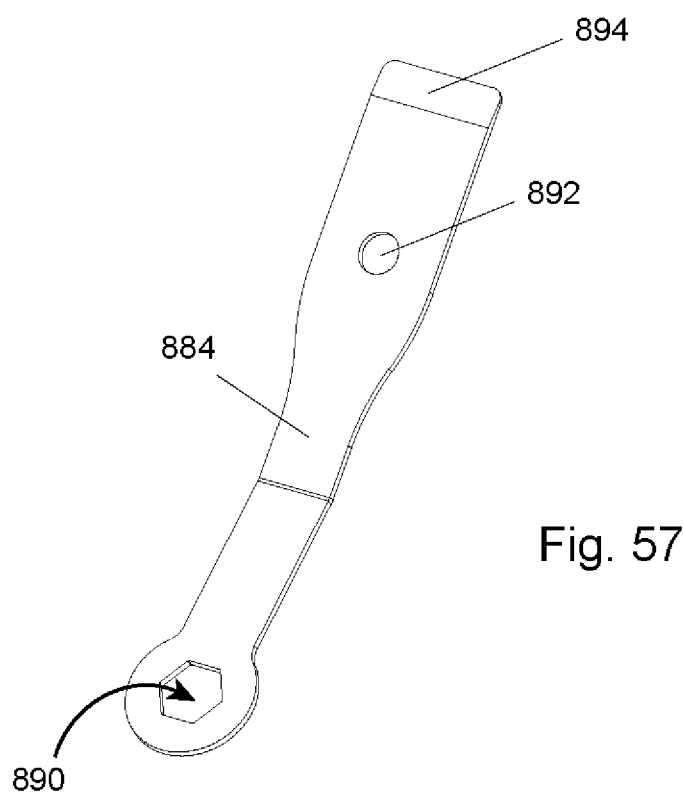
FIG. 57 shows another blade wrench.

FIGS. 56 and 57 show two blade wrenches, 882 and 884, respectively. Wrench 882 includes an opening 886 configured to fit around an arbor shaft, and a hole 888 sized to fit over locking knob 860 and front projection 856. Wrench 884 includes a socket 890 at one end configured to fit around an arbor nut, and a hole 892 sized to fit over locking knob 860 and front projection 856. Wrench 884 also includes a tapered end 894 which can be used to help remove brake cartridges used in table saws with active injury mitigation systems. Those brake cartridges stop the blade in the case of an accident and they must be removed after use. Occasionally, the act of stopping the blade causes the brake cartridge to press tightly against its mount, and in that situation, wrench 884 can be used to lever or pry the brake cartridge off its mount.

Housing 22 of table saw 10 includes a socket 896 to hold the ends of the blade wrenches when they are stored on the saw, as shown in FIG. 49.

Figure 58:
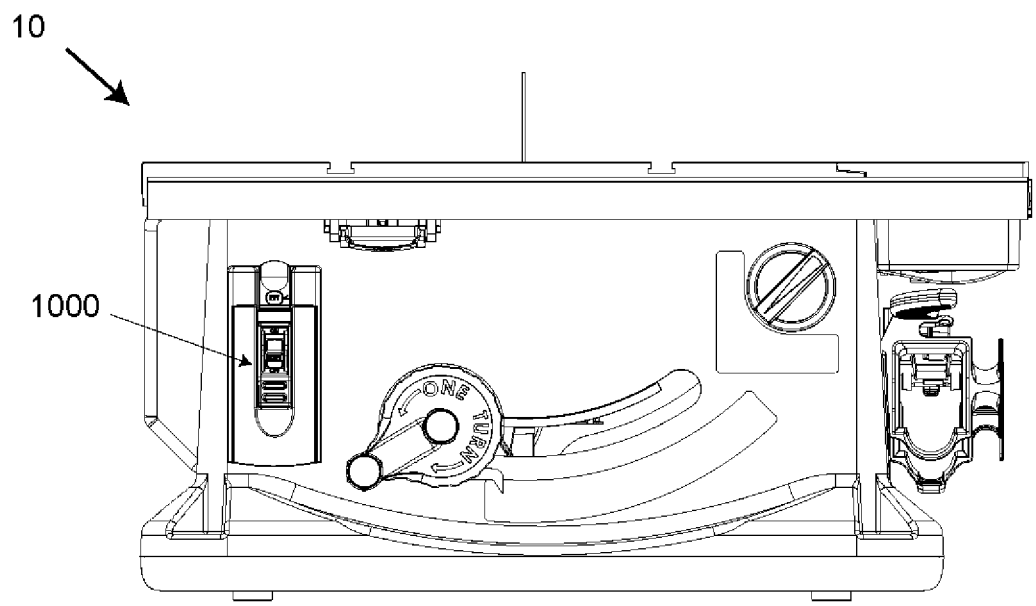
FIG. 58 shows a table saw with a switchbox.

Table saws are typically started and stopped by a user flipping or triggering some type of switch on the saw. Such switches should be designed and positioned so they are easy and intuitive to use, but also so they are protected and so they can be repaired or replaced easily, if necessary. A switchbox having these characteristics is shown at 1000 in FIG. 58. The switchbox is mounted to the front of saw 10, and the switchbox includes switches used to turn the saw on and off and to perform other functions, as explained below. The switchbox is shown isolated in FIGS. 59 through 68, and FIG. 69 shows an exploded view of the switchbox.

Switchbox 1000 includes a paddle 1020 used to start and stop the motor on the saw by moving between an "on" or extended position and an "off" or retracted position. Paddle 1020, shown isolated in FIGS. 70 through 76, is large enough to be easily accessed by a user. For example, it is large enough for a user to turn the saw off by bumping the paddle with the user's leg. The paddle is shaped generally like a rectangle with an opening 1040 in the middle, and with walls along the top and sides that extend inward to the rear. The side walls, labeled 1140, tapper off near the bottom until they join the front surface at the very bottom of the paddle. A horizontal flange 1160 extends across the back of the paddle, near the bottom, and projects out to the rear. The top and side walls, and horizontal flange 1160, block access to the back or inside of the paddle and minimize possible pinch points between the paddle and the rest of the switchbox.

Two extensions 1060 extend upward from the top of the paddle, one on the left side and one on the right. Extensions 1060 are open in the middle and have cylindrical pins near the top that are of two sections, a larger diameter section 1080 near the outside followed by a smaller diameter section 1100 moving inward. The paddle pivots forward and backward about the cylindrical pins as the user pulls and pushes the bottom of the paddle in and out to start and stop the motor.

Figure 80:
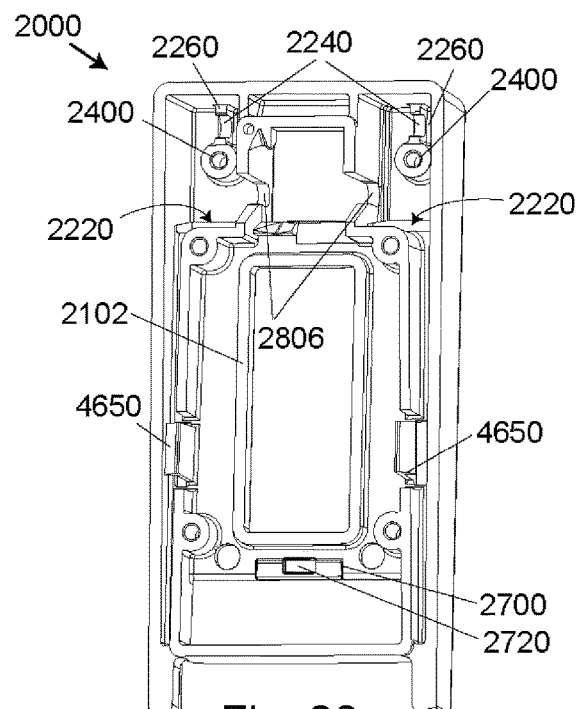
FIG. 80 shows a back perspective view of the front cover of FIG. 77.
Figure 81:
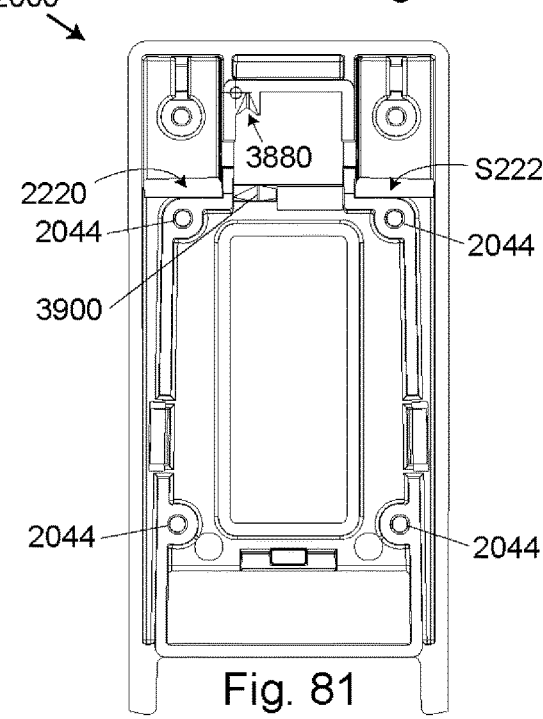
FIG. 81 shows a back elevation view of the front cover of FIG. 77.

Paddle 1020 is mounted to a front cover 2000. The front cover is shown isolated in FIGS. 77 through 81, and is roughly shaped like a rectangular box with an outline slightly larger than the paddle. The smaller diameter sections 1100 of the cylindrical pins on paddle 1020 fit against curved surfaces 2240 at the back of front cover 2000, and the larger diameter sections 1080 of each cylindrical pin fits adjacent a wall 2260 on the back of the front cover to position the paddle side-to-side relative to the front cover. Curved surfaces 2240 are along the top of the back of the front cover and are labeled in FIG. 80. In order for the cylindrical pins to be positioned against curved surfaces 2240, extensions 1060 on the paddle must be inserted up and through openings 2220 in the front cover. By so doing, the body of the paddle remains accessible in front of the front cover, while extensions 1060 and the pivot axis are behind the front cover.

Figure 82:
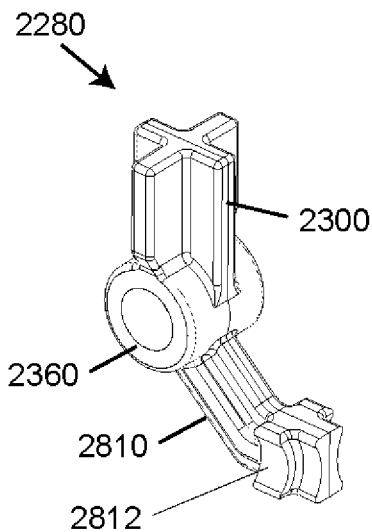
FIG. 82 shows a perspective view of a retaining structure.
Figure 83:
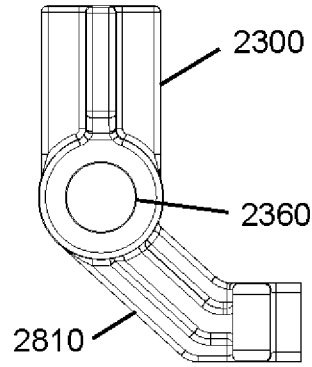
FIG. 83 shows an elevation view of a retaining structure.
Figure 84:
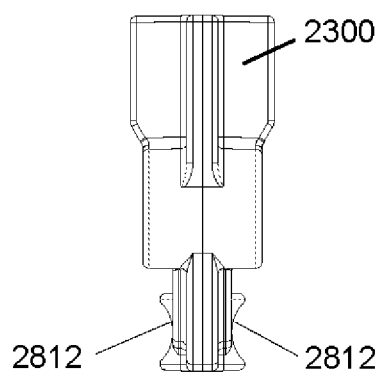
FIG. 84 shows a side view of a retaining structure.
Figure 85:
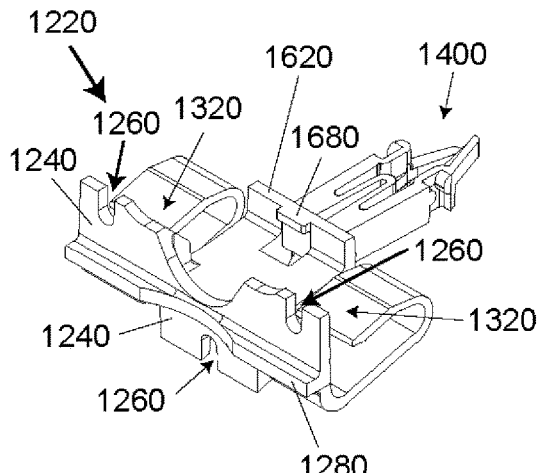
FIG. 85 shows a paddle activation link used in the switchbox of FIG. 59.
Figure 86:
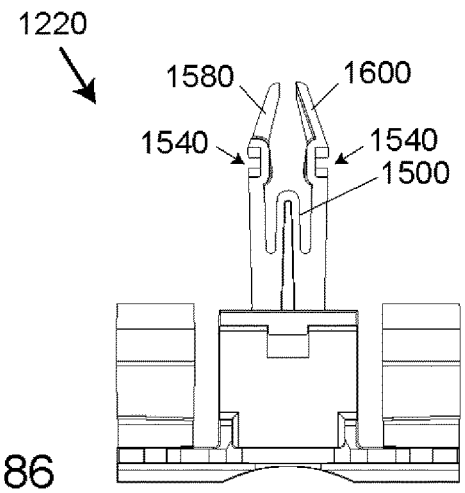
FIG. 86 shows a top view of the paddle activation link of FIG. 85.

A retaining structure 2280, shown isolated in FIGS. 82 through 84, holds each of the cylindrical pins against curved surfaces 2240. One retaining structure holds one of the cylindrical pins against its corresponding curved surface, and another, separate retaining structure holds the other cylindrical pin against its corresponding curved surface. The retaining structure is designed with what may be thought of as "mirrored" sides so that it can be turned to hold the cylindrical pins against the curved surface on the right or left. Retaining structure 2280 has an end portion 2300 that presses against the cylindrical pins to hold them in place. A hole 2360 passes through each retaining structure and screws 2380 hold the retaining structures to the back of the front cover by screwing into holes 2400 in the front cover. In this manner, paddle 1020 is pivotally mounted to front cover 2000.

Figure 77:
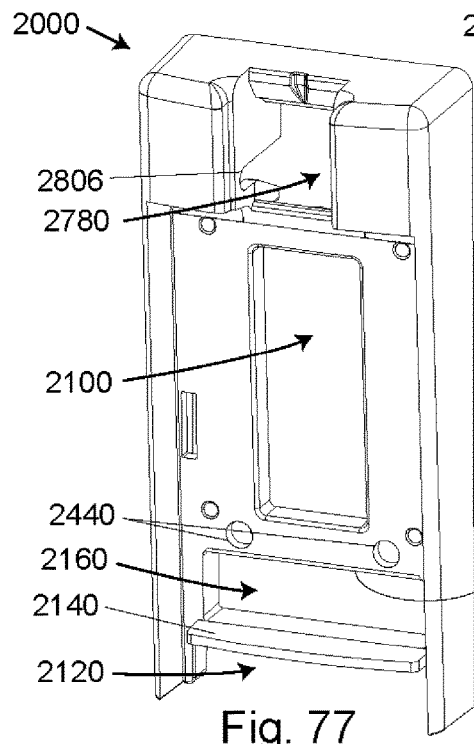
FIG. 77 shows a front cover used in the switchbox of FIG. 59.
Figure 78:
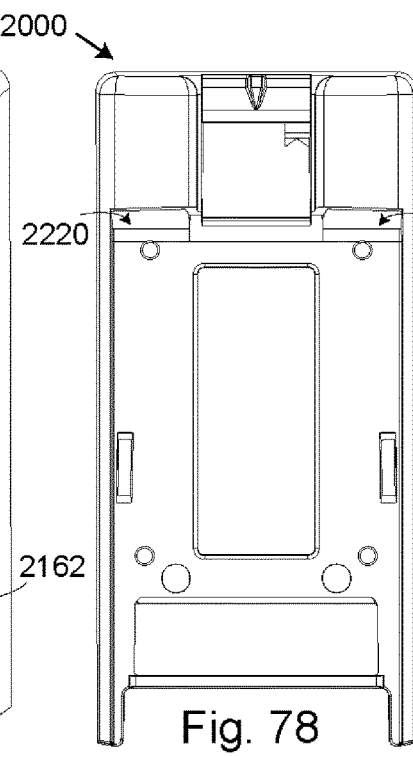
FIG. 78 shows a front elevation view of the front cover of FIG. 77.
Figure 79:
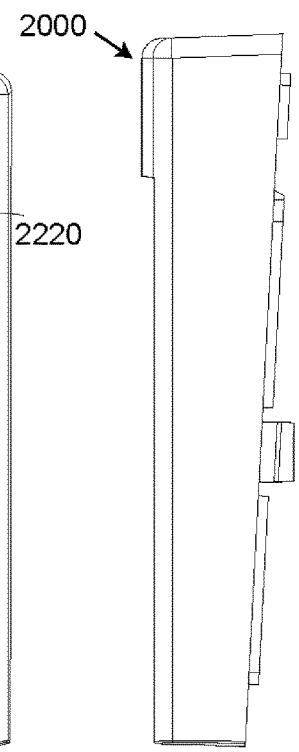
FIG. 79 shows a right-side view of the front cover of FIG. 77.

The bottom of front cover 2000 is open, as shown at 2120 in FIG. 77, to allow horizontal flange 1160 on the paddle to overlap a bottom wall 2140 of the front cover. This configuration blocks ingress to the back or inside of the paddle when the paddle is mounted to the switchbox, and minimizes possible pinch points, while allowing paddle 1020 to overhang the bottom of front cover 2000 so a user can grip the bottom of the paddle and pull it out.

Figure 69:
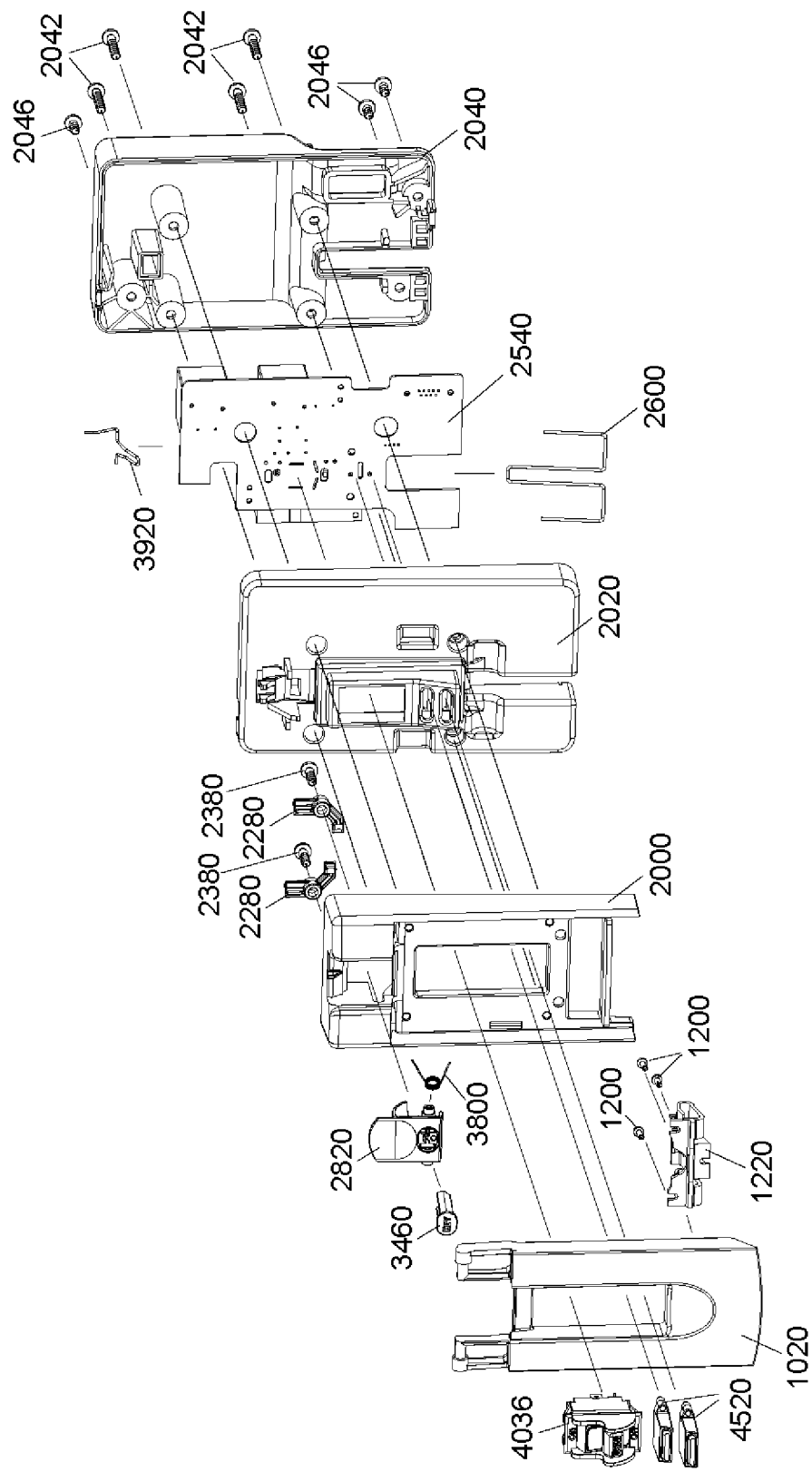
FIG. 69 shows an exploded view of the switchbox of FIG. 59.
Figure 70:
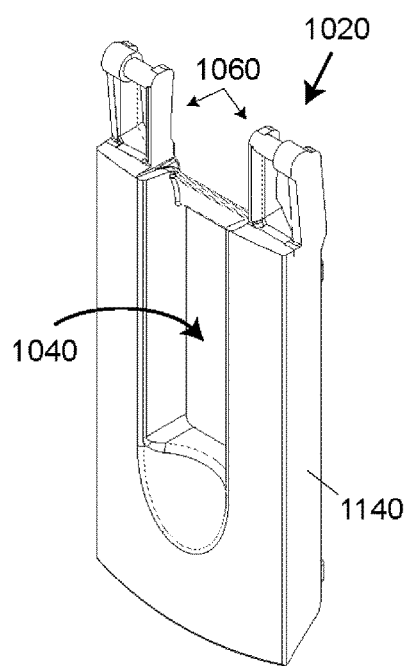
FIG. 70 shows a perspective view of a paddle used in the switchbox of FIG. 59.
Figure 71:
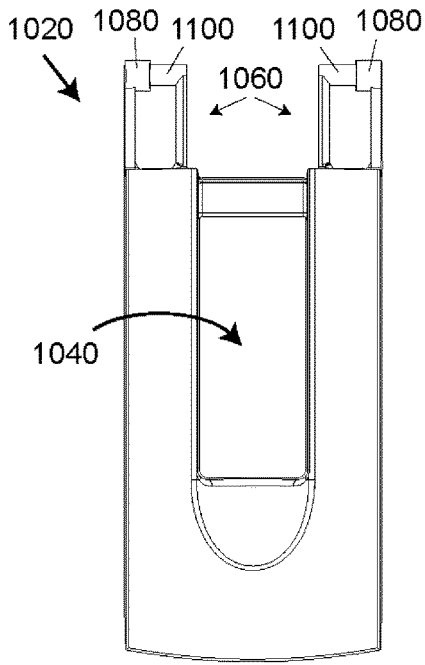
FIG. 71 shows a front view of the paddle of FIG. 70.
Figure 72:
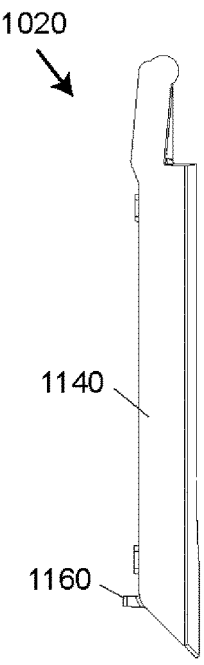
FIG. 72 shows a left side view of the paddle of FIG. 70.
Figure 73:
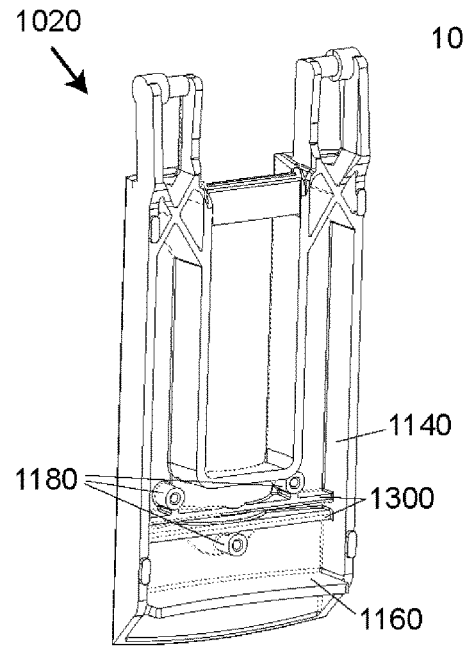
FIG. 73 shows a perspective back view of the paddle of FIG. 70.
Figure 74:
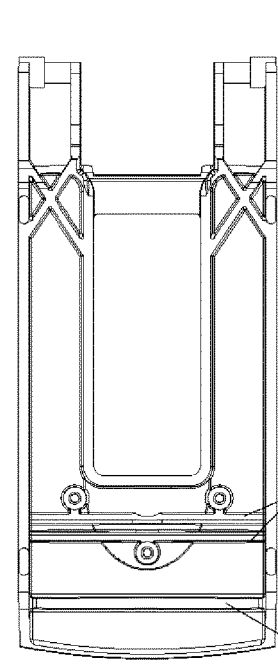
FIG. 74 shows a back elevation view of the paddle of FIG. 70.
Figure 75:
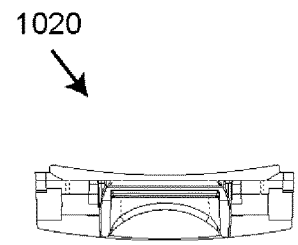
FIG. 75 shows a top view of the paddle of FIG. 70.
Figure 76:
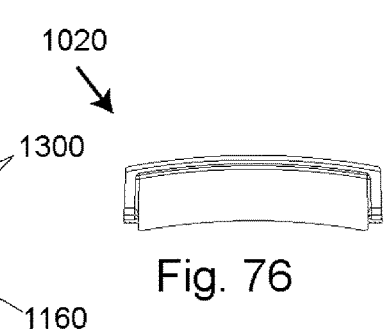
FIG. 76 shows a bottom view of the paddle of FIG. 70.

Near the bottom of the paddle, above flange 1160, are three bosses 1180 extending out from the back surface of the paddle to receive the threaded ends of screws 1200, shown in FIG. 69. The screws are used to attach a paddle activation link 1220 to the bottom of the back side of the paddle. Paddle activation link 1220 is shown isolated in FIGS. 85 through 91, and it has a vertical wall 1240 with U-shaped cutouts 1260 configured to fit around screws 1200. A ridge 1280 extends horizontally across and out from the paddle activation link between the top and bottom U-shaped cutouts 1260. Ridge 1280 fits between two similar horizontal ridges 1300 that extend out from the back surface of the paddle to help secure the paddle activation link in position. The paddle activation link extends out roughly perpendicular to the back of the paddle.

Figure 87:
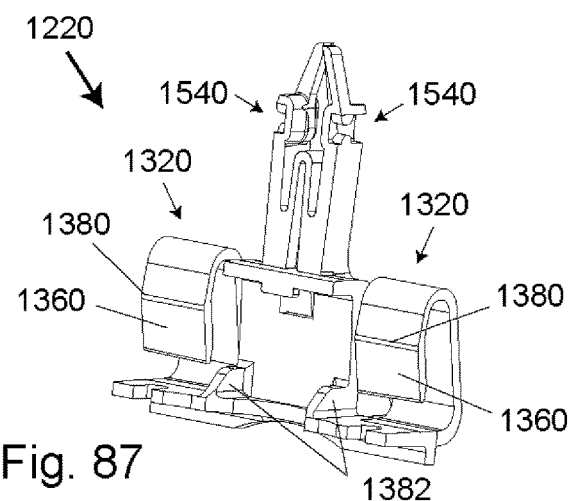
FIG. 87 shows a perspective top view of the paddle activation link of FIG. 85.
Figure 88:
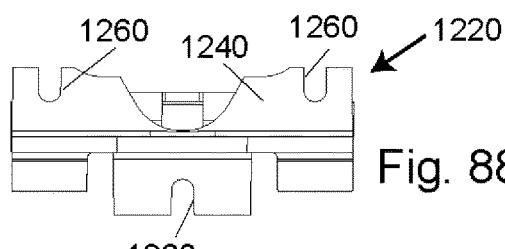
FIG. 88 shows a paddle-end view of the paddle activation link of FIG. 85.
Figure 89:
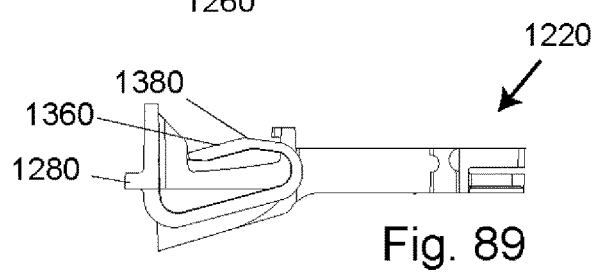
FIG. 89 shows a side view of the paddle activation link of FIG. 85.
Figure 90:
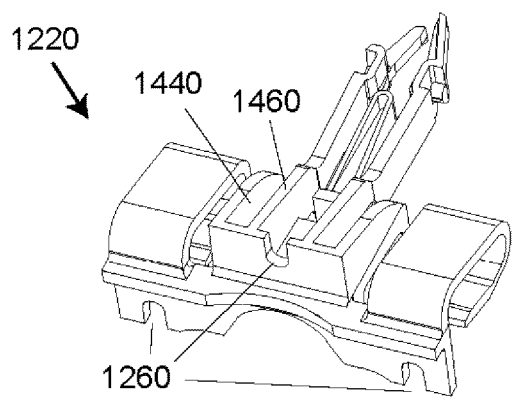
FIG. 90 shows a perspective bottom view of the paddle activation link of FIG. 85.
Figure 91:
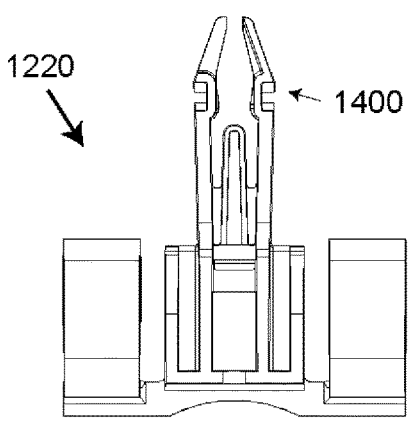
FIG. 91 shows a bottom elevation view of the paddle activation link of FIG. 85.
Figure 92:
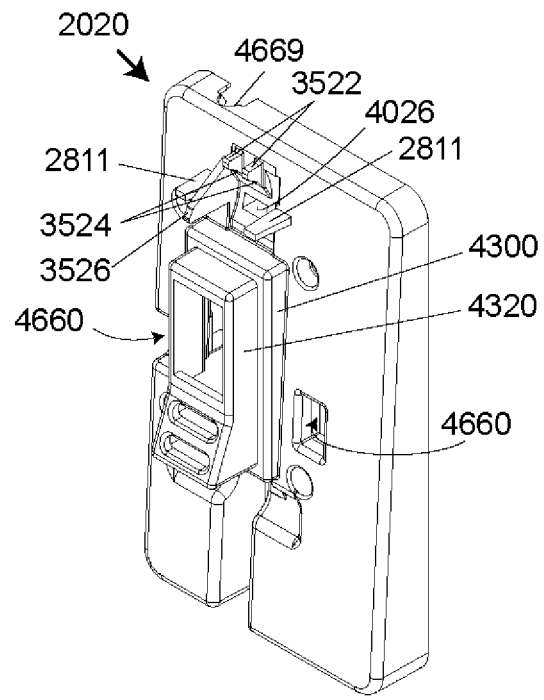
FIG. 92 shows a perspective view of a front shell of a case used in the switchbox of FIG. 59.
Figure 93:
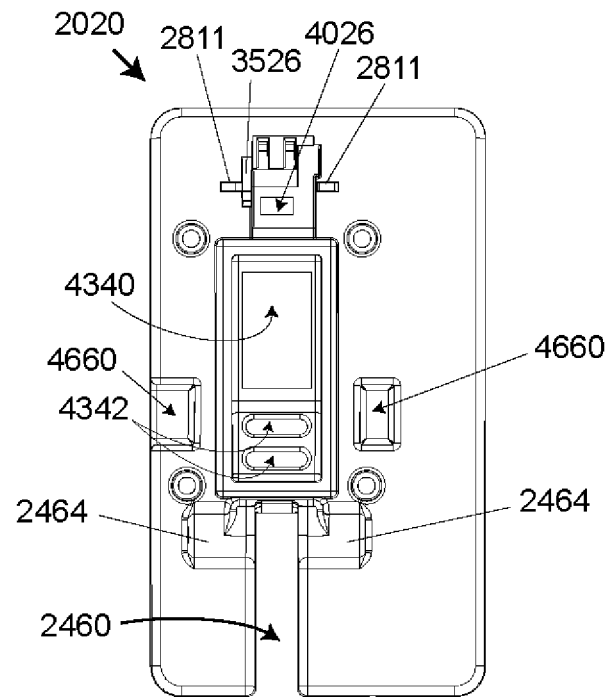
FIG. 93 shows a front elevation view of the front shell shown in FIG. 92.
Figure 94:
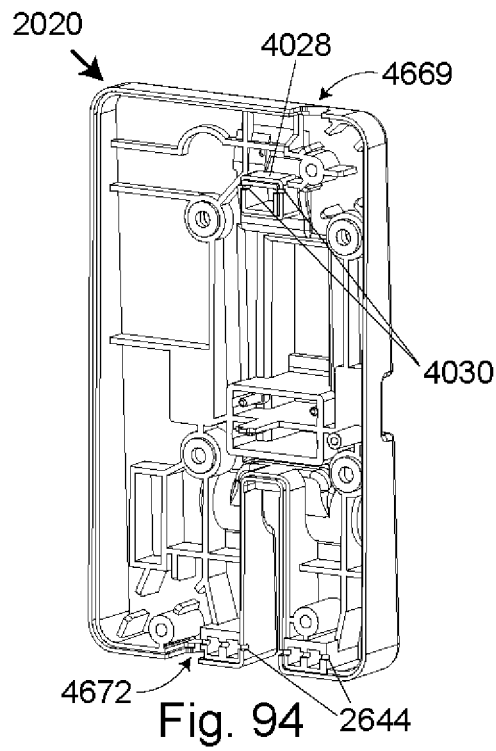
FIG. 94 shows a back perspective view of the front shell shown in FIG. 92.
Figure 95:
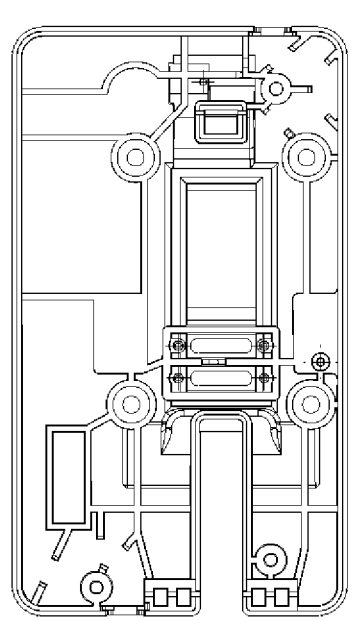
FIG. 95 shows a back elevation view of the front shell shown in FIG. 92.

Front cover 2000 includes a lower aperture or opening 2160, and the paddle activation link extends through that opening when the switchbox is assembled. The paddle activation link includes two spring arms 1320 that contact the upper edge 2162 of aperture 2160 and cause the paddle to snap open and closed. As seen in FIGS. 87 and 89, spring arms 1320 are shaped somewhat like hooks with a ridge or hump 1380 extending across the upper surface of each spring arm, and a portion 1360 extending somewhat downwardly. The paddle activation link is positioned, and spring arms 1320 are sized, so that hump 1380 is slightly higher than the upper edge 2162 of aperture 2160. When paddle 1020 is pushed in, upper edge 2162 is in front of humps 1380 and contacts portion 1360 on the spring arms. When in that position, the spring arms may be slightly compressed so that the resiliency or spring force of the spring arms keeps the paddle in position. When paddle 1020 is pulled out, humps 1380 contact upper edge 2160, compressing the spring arms as the hump moves past upper edge 2162. When humps 1380 have moved in front of upper edge 2162, the spring arms expand, although still slightly compressed, and the humps move in front of and higher than upper edge 2162 so that the spring arms act as something like an "over-center" to maintain the paddle in its extended position. A user can pivot paddle 1020 out until a wall 1620 on the paddle activation link contacts stops 2700 on the lower back wall of the front cover. A tab 1680 on wall 1620 meshes with a socket 2720 on the back wall of the front cover to help keep the paddle in position when pulled out. When the paddle is pushed back in, stops 1382 on the inside of wall 1240 on the paddle activation link contact the front cover 2000.

With this configuration, spring arms 1320 and humps 1380 provide a bias against moving the paddle in or out, so the spring arms tend to keep the paddle stable in either its extended or retracted position. Additionally, when the paddle is moved from its extended or "on" position to its retracted or "off" position, downwardly extending portions 1360 on the spring arms tend to push the paddle to the retracted position as soon as humps 1380 move behind upper edge 2162 until stops 1382 on the inside of wall 1240 on the paddle activation link contact the front cover 2000. Because spring arms 1320 bias the paddle to either the extended or retracted position, the paddle feels like it snaps open and closed, and the contact between stops 1382 and the front cover, as well as the contact between wall 1620 and stops 2700, makes a "snap" sound. Additionally, the compression of spring arms 1320 provides a firm and solid feel to the movement of the paddle.

The paddle activation link is attached to paddle 1020 after paddle extensions 1060 are inserted up and through openings 2220 in the front cover because of what would otherwise be interference between the bottom of the front cover and the paddle activation link. Accordingly, front cover 2000 includes holes 2440 to provide access to screws that hold the paddle activation link to the paddle.

Paddle activation link 1220 includes a link arm 1400 extending between and beyond spring arms 1320. The link arm connects to a wire form used to toggle switches on a circuit board, as will be explained. Link arm 1400 includes a left branch 1580 and a right branch 1600 joined by a support section 1500 so that the right and left branches can flex toward each other but are held and/or biased apart by support section 1500. The ends of left branch 1580 and right branch 1600 include sockets 1540 to receive the wire form used to toggle the switches, as will be explained.

Paddle activation link 1220 may be molded and made of plastic. It may include ribs, such as ribs 1440 and 1460, to add strength and rigidity.

Figure 59:
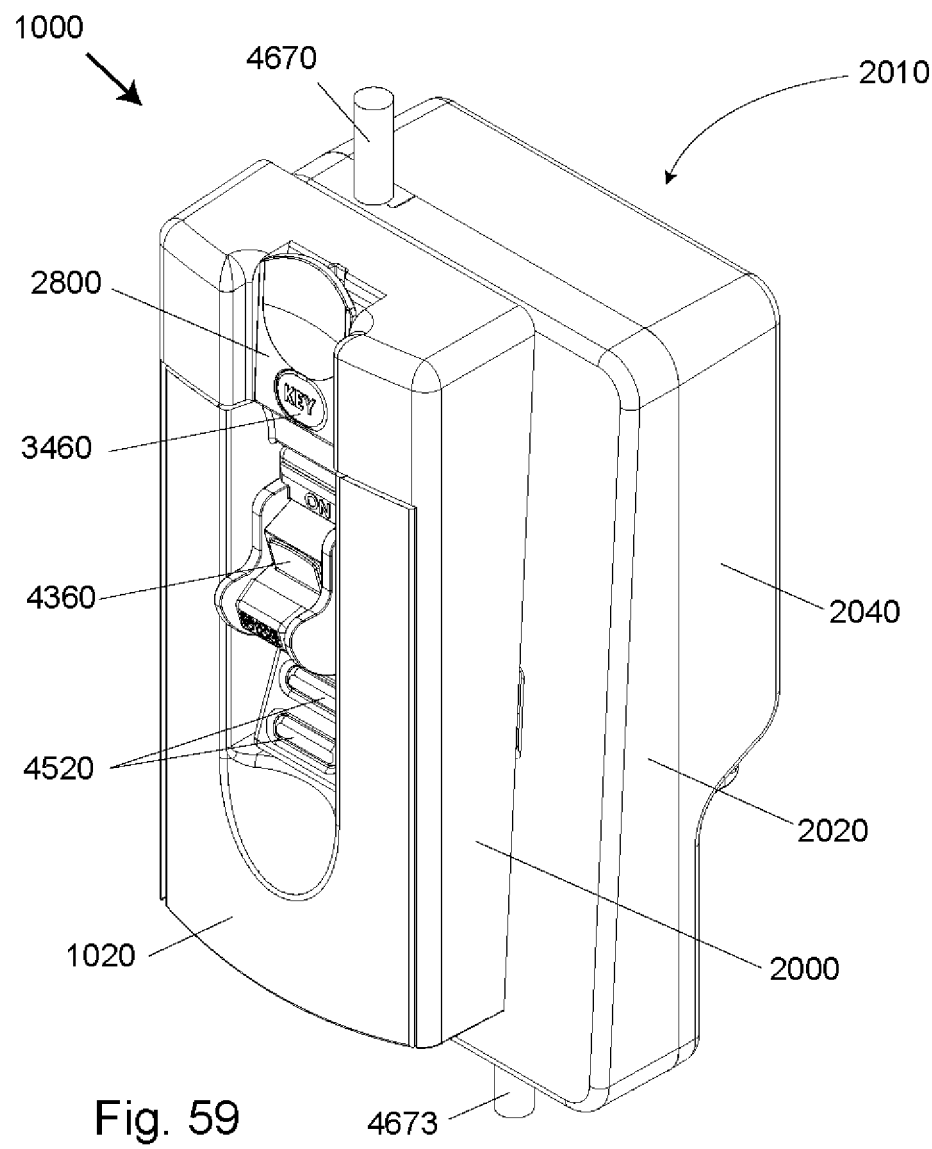
FIG. 59 shows a perspective view of a switchbox.

Front cover 2000 is connected to a case 2010, as shown in FIG. 59. Case 2010 houses a circuit board 2540, as shown in FIG. 69, and is made from a front shell 2020 and a rear shell 2040. Front shell 2020 is shown isolated in FIGS. 92 through 95, and rear shell 2040 is shown in FIGS. 96 through 99. The front and rear shells enclose and sandwich circuit board 2540, as shown in FIG. 69. Screws 2042 hold case 2010 together, and they hold circuit board 2540 in place in the case. Screws 2042 screw into bosses 2044 on the back of front cover 2000 to hold the front cover and paddle to case 2010. Additional screws 2046 can be used to further hold front shell 2020, rear shell 2040, and circuit board 2540 together.

Figure 101:
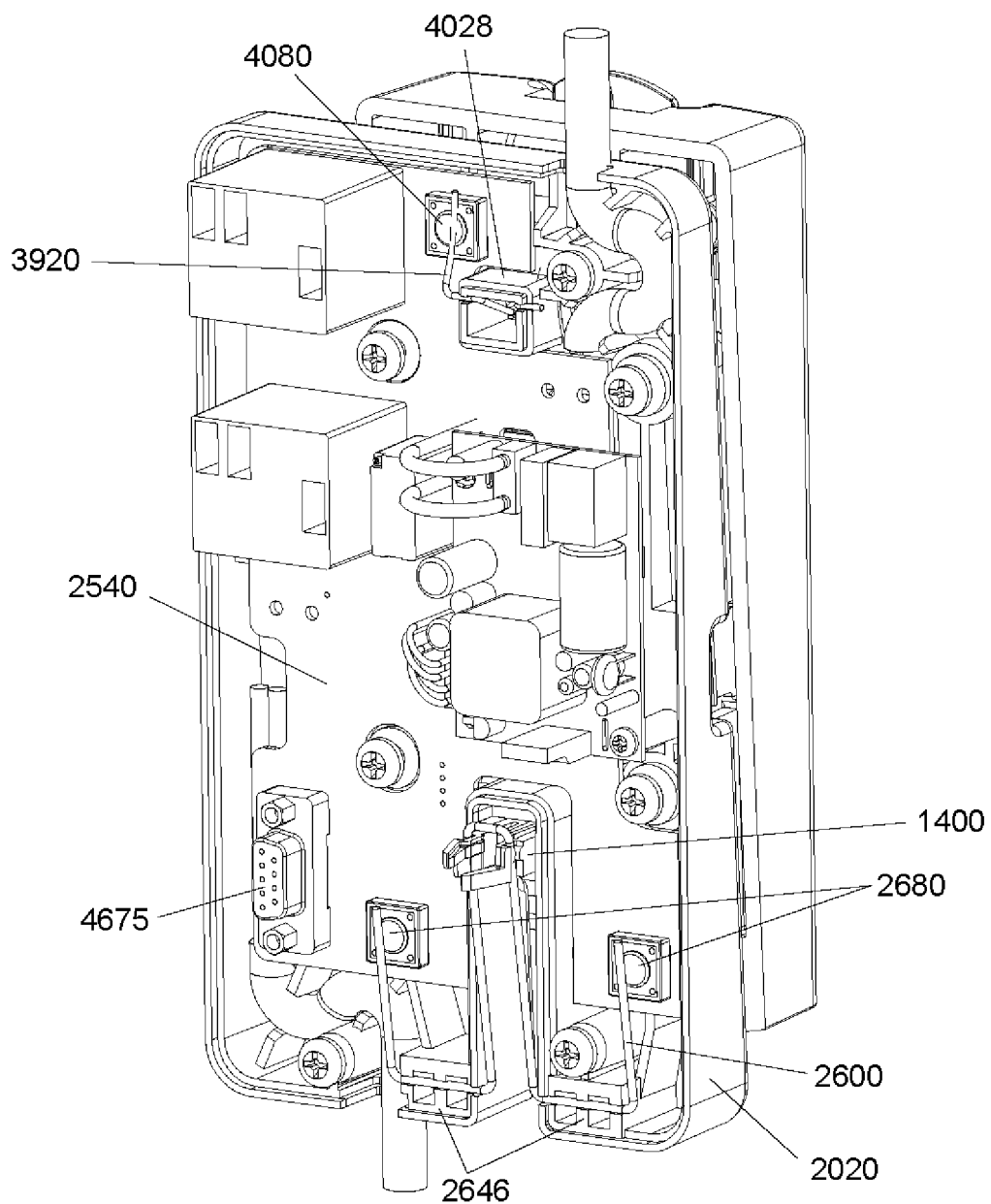
FIG. 101 shows the rear of a switchbox, with the rear cover removed.
Figure 102:
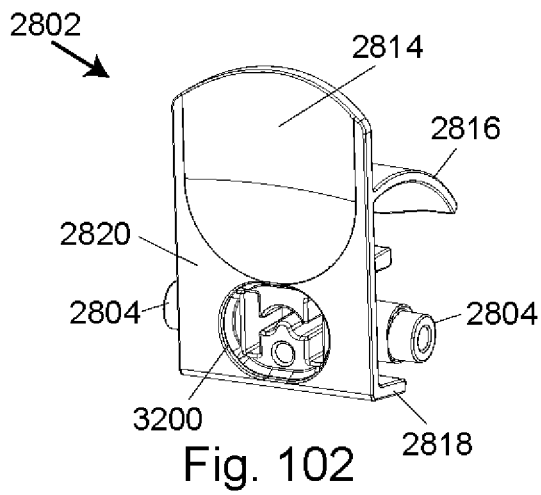
FIG. 102 shows a front perspective view of a finger actuator used in a bypass switch.
Figure 103:
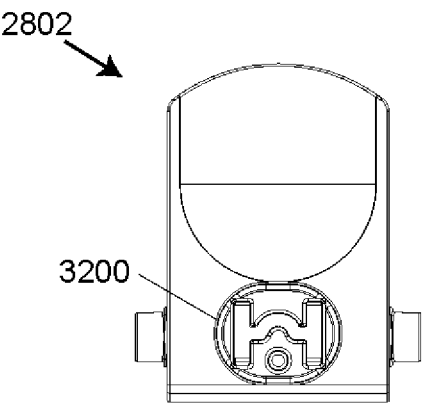
FIG. 103 shows a front elevation view of the finger actuator of FIG. 102.
Figure 104:
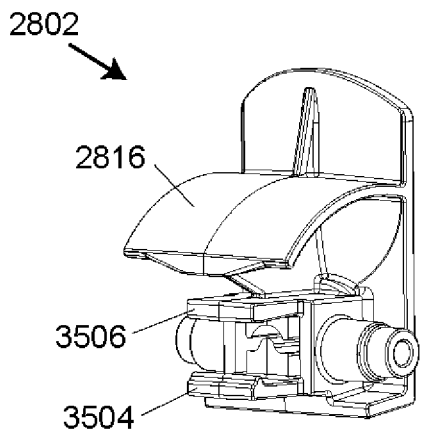
FIG. 104 shows a rear perspective view of the finger actuator of FIG. 102.
Figure 105:
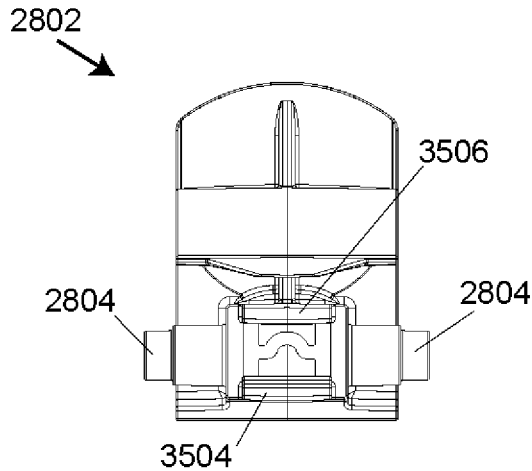
FIG. 105 shows a rear elevation view of the finger actuator of FIG. 102.
Figure 106:
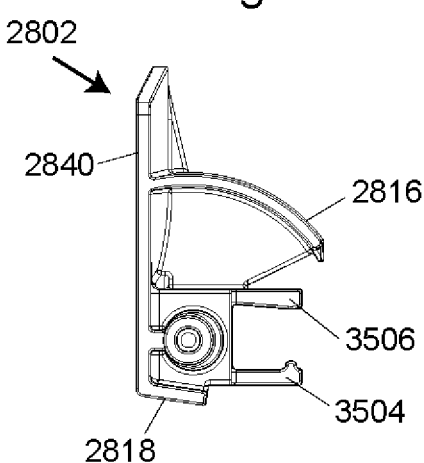
FIG. 106 shows a right-side view of the finger actuator of FIG. 102.

As stated previously, paddle activation link 1220 includes a link arm 1400 that connects to a wire form used to toggle switches on circuit board 2540. The wire form is shown isolated in FIG. 100 and identified by the number 2600. Wire form 2600 is shaped somewhat like a "W", with straight center segments 2620 that clip into sockets 1540 on link arm 1400. Link arm 1400 includes left and right branches which can flex together so that the link arm can be inserted between the center segments of wire form 2600, and the tips of the branches can be pointed and angled together to facilitate insertion of the link arm between the center segments during assembly. The top of segments 2620 clip into sockets 1540 in the link arm, as seen in FIG. 101. (FIG. 101 shows switchbox 1000 with rear shell 2040 removed and wire form 1400 visible.) In this manner, the top of wire form 2600 is held by link arm 1400 on paddle activation link 1220.

Wire form 2600 also includes two arms 2640, and two bottom segments 2642 that extend between and connect the arms and center segments 2620, as shown in FIG. 100. Bottom segments 2642 are held in grooves 2644 along the bottom of front shell 2020, and are held in the grooves by surfaces 2646 at the bottom of rear shell 2040 when case 2010 is assembled. With this configuration, wire form 2600 can pivot around an axis extending along the length of grooves 2644.

When a user pulls paddle 1020 out, paddle activation link 1220 pulls the top of wire form 2600, which causes the wire form to pivot in grooves 2644 and move arms 2640 forward. Arms 2640 are positioned so that they extend over tactile switches 2680 on circuit board 2540, as shown in FIG. 101. When arms 2640 pivot forward, they depress the tactile switches to start the saw. The depicted embodiment includes two tactile switches that must both be depressed to start the saw. Requiring both tactile switches to be depressed prevents the saw from starting if one switch is somehow depressed unintentionally or if a tactile switch malfunctions. When a user pushes paddle 1020 in, paddle activation link 1220 pivots wire form 2600 toward the rear, and arms 2640 move away from or out of engagement with tactile switches 2680 to turn the saw off.

The center segments of the wire form are sized to provide the desired moment arm to pivot arms 2640 forward when the paddle is pulled out. The wire is sufficiently stiff and rigid so that when arms 2640 move forward, they depress tactile switches 2680 to signal the saw to start. Arms 2640 are sized to depress the tactile switches with a desired force, and they are sized so that the paddle can move out a sufficient distance to provide an ergonomic feel and a clear indication that the paddle is turning the saw on. When pulled against the tactile switches, the arms also provide some spring force biasing the paddle toward its retracted position.

Front shell 2020 and rear shell 2040 are shaped to define an empty region 2460 in which wire form 2600 is free to move and into which link arm 1400 of paddle activation link 1220 extends. A stop 2462 is positioned adjacent the top of region 2460 to limit the rearward motion of wire form 2600 when link arm 1400 is inserted between center segments 2620 during assembly. The face of front shell 2020 is also shaped to include recesses 2464 to provide clearance for spring arms 1320 and link arm 1400 on paddle activation link 1220 when the switchbox is assembled.

Switchbox 1000 mounts to table saw 10 by extending through an opening in the front wall of housing 22 (such as opening 1222 in FIG. 129), and sandwiching the edge of the opening between front cover 2000 and case 2010. In this manner, front cover 2000 and paddle 1020 are on the outside of the table saw so that the paddle is accessible to a user, while case 2010 is inside the table saw. Front cover 2000 includes clips 4650 that extend from the back of the front cover. The clips are designed to snap over and behind an edge of the opening to help hold the front cover in position. The face of front shell 2020 includes recesses 4660 to provide clearance for clips 4650.

Front shell 2020 of case 2010 includes a pedestal section 4300 and a rectangular section 4320, both extending out from the front of the front shell. Rectangular section 4320 supports a main power switch and indicator lights, as described below, and therefore, needs to be accessible to a user at the front of the saw. Accordingly, front cover 2010 includes an opening 2100, and paddle 1020 includes opening 1040, through which rectangular section 4320 extends. Pedestal section 4300 extends out to abut a corresponding rib 2102 on the back of front cover 2000. Pedestal section 4300 and rectangular section 4320 are molded integrally with front shell 2020 to help prevent dust and moisture from entering case 2010.

As shown in FIG. 59, switchbox 1000 includes a rocker-type power switch 4360. The switch is mounted to circuit board 2540 and extends through opening 4340 in the front shell of case 2010 and through the corresponding openings in front cover 2000 and paddle 1020 so that it is accessible to a user at the front of the saw. Switch 4360 is mounted to circuit board 2540 and supported by rectangular section 4320 of front shell 2020. FIG. 59 shows switch 4360 in its "off" position. The switch is toggled up to turn the saw on. The switch may include a removable lock-out key to prevent the power switch from functioning when the key is not in place.

Switchbox 1000 also includes status lights 4520 to indicate the status of the saw. A green light may indicate that the saw is functioning normally, for example, and a red light may indicate a problem or that the saw is not yet ready to cut. One or more LEDs are mounted on circuit board 2540 to operate as status lights. Light tunnels may be used with the LEDs. Openings 4342 in the front shell of case 2010 provide visibility to the status lights.

Figure 60:
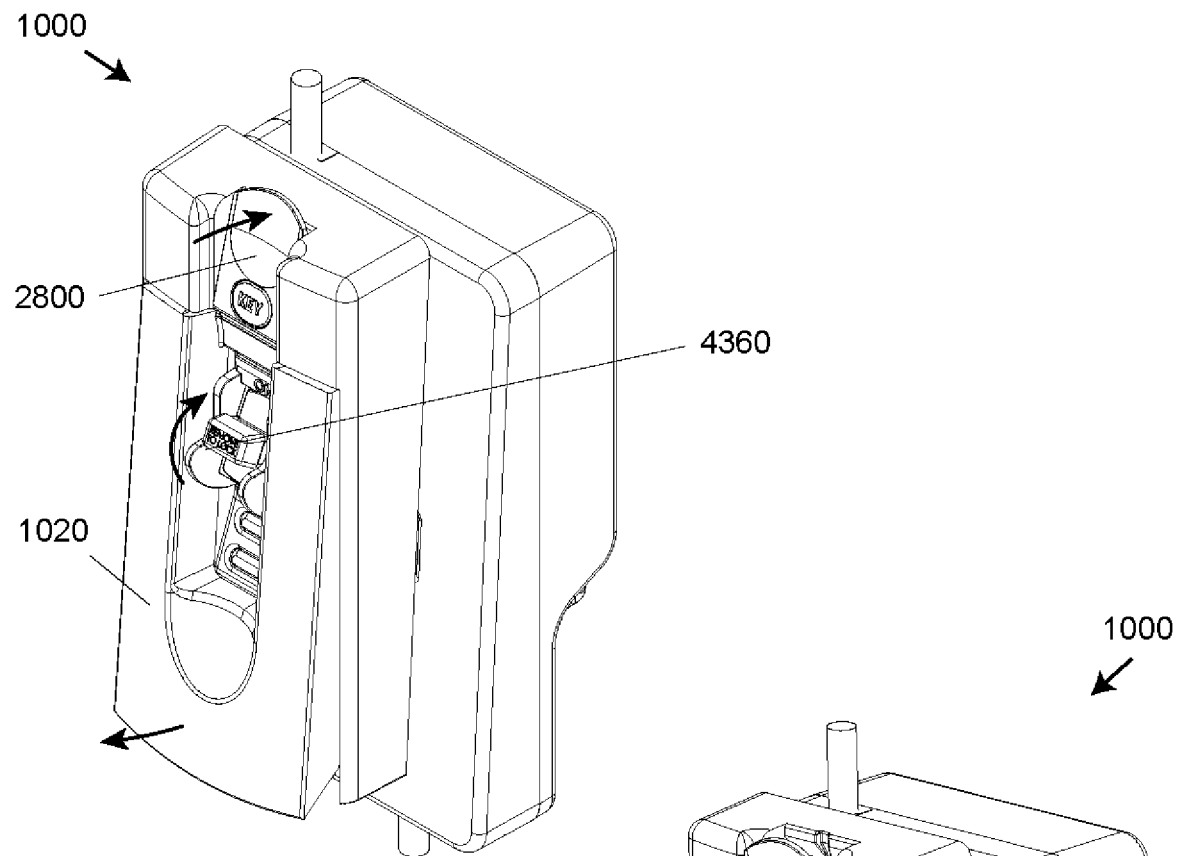

Switchbox 1000 also includes a bypass switch 2800. Some table saws include active injury mitigation technology to detect when a person accidentally contacts the spinning blade and to mitigate injury. Bypass switch 2800 is used to bypass such technology when cutting conductive material that the active injury mitigation technology would detect as a person. To be sure the bypass switch is not triggered unintentionally, the bypass switch is configured to be pushed in, as shown in FIG. 60, and then held in as power switch 4360 is flipped up.

Figure 61:
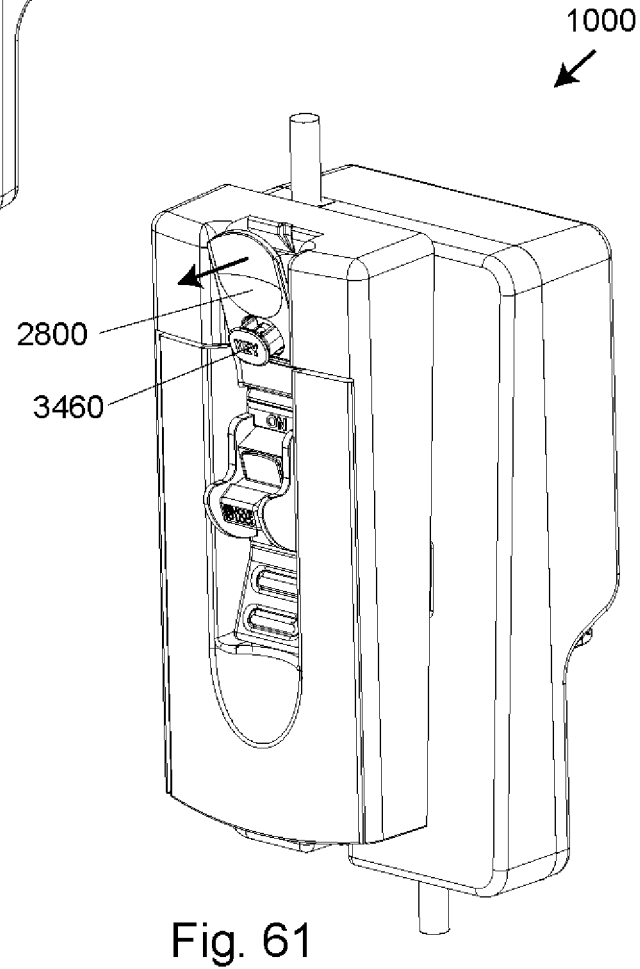
FIG. 61 shows a switchbox with a bypass switch and key.
Figure 62:
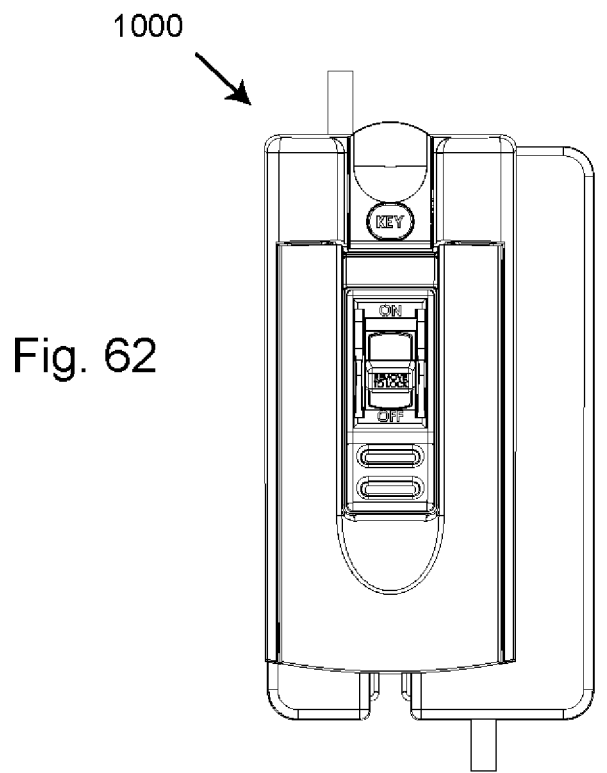
FIG. 62 shows a front elevation view of the switchbox of FIG. 59.
Figure 63:
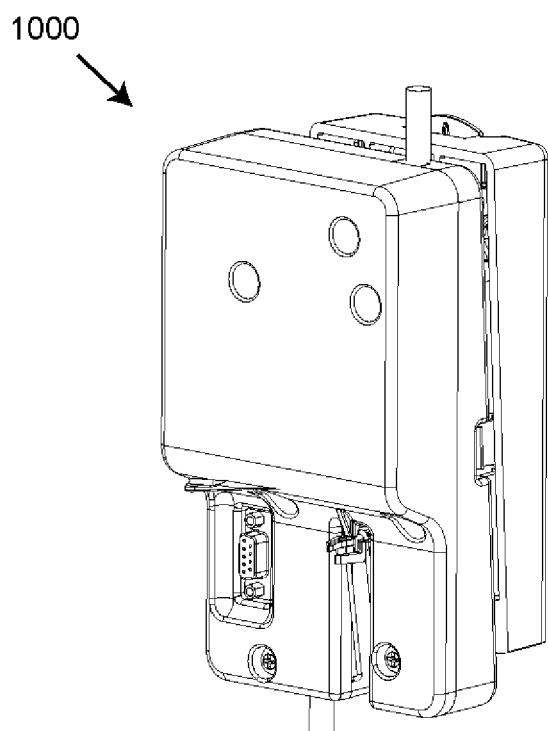
FIG. 63 shows a back perspective view of the switchbox of FIG. 59.
Figure 64:
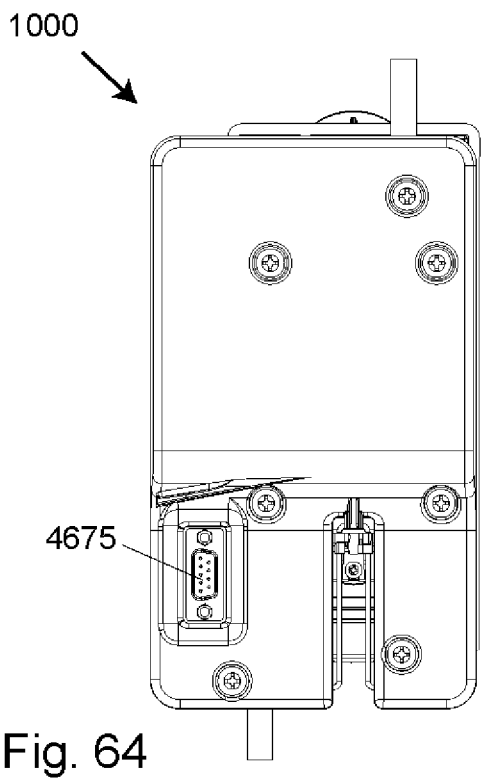
FIG. 64 shows a back elevation view of the switchbox of FIG. 59.
Figure 65:
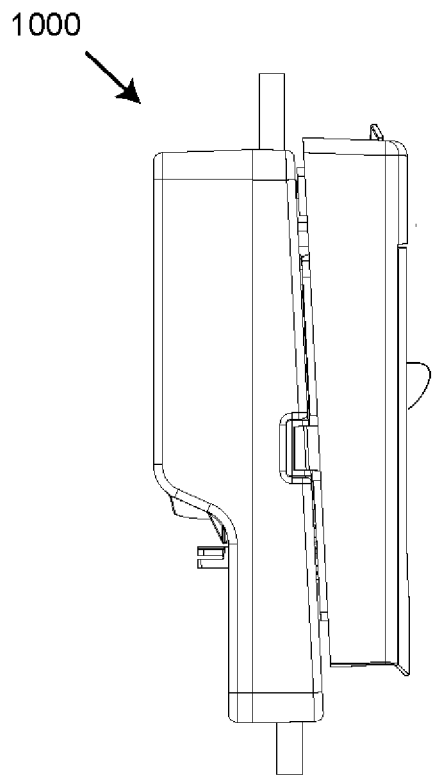
FIG. 65 shows a left-side view of the switchbox of FIG. 59.
Figure 66:
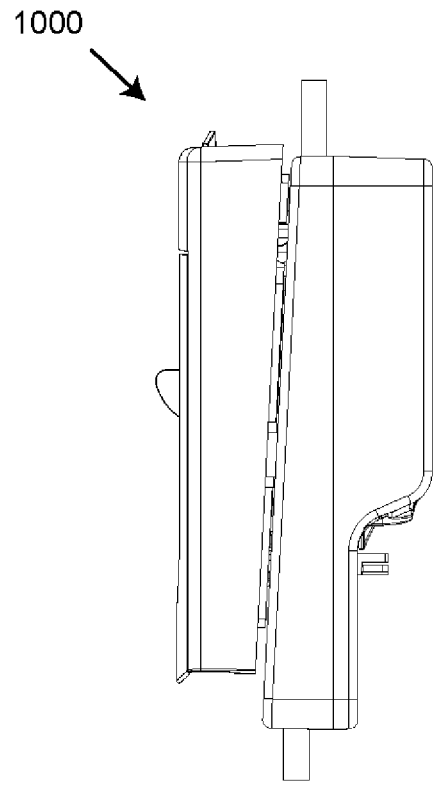
FIG. 66 shows a right-side view of the switchbox of FIG. 59.
Figure 67:
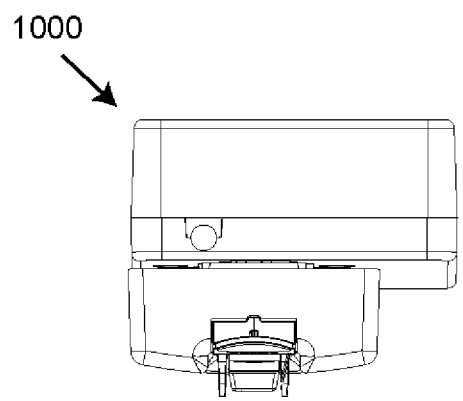
FIG. 67 shows a top view of the switchbox of FIG. 59.
Figure 68:
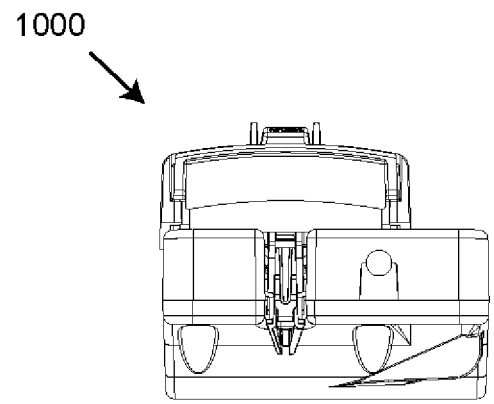
FIG. 68 shows a bottom view of the switchbox of FIG. 59.

Bypass switch 2800 includes a removable key 3460 to prevent the bypass switch from operating when the key is removed. In the depicted embodiment, key 3460 is removed by pulling bypass switch 2800 out, as shown in FIG. 61. Pulling bypass switch 2800 out ejects key 3460 sufficiently for a user to grasp the key and remove it from the saw.

Bypass switch 2800 includes an actuator 2802, shown isolated in FIGS. 102 through 106. Actuator 2802 extends through an opening 2780 in front cover 2000 so it can be accessed by a user of the saw. The actuator includes cylindrical pins 2804 that define an axis around which the actuator can pivot. The pins are positioned in grooves 2806 on the back of front cover 2000, and retaining structure 2280 holds the pins in the grooves. (Retaining structures 2280 also hold paddle 1020 in place, as explained previously.) As shown in FIGS. 82 through 84, retaining structure 2280 includes an arm 2810 that terminates with curved surfaces designed to hold cylindrical pins 2804 in grooves 2806. Retaining structure 2280, discussed above, is used to hold the actuator in grooves 2806—one retaining structure on each side of actuator 2802 to hold that side's pin in place. The retaining structure includes two curved surfaces 2812, one on each side of arm 2810, so that the same retaining structure can be used to hold the pin on either side of actuator 2802. Additionally, projections 2811 extend out from the face of front shell 2020 to prevent arms 2810 on retaining structures 2280 from flexing out.

Actuator 2802 includes a tab 2814 that a user can pull or push to cause the actuator to pivot around pins 2804. A top flange 2816 and a bottom flange 2818 extend out from the back of the actuator, and each is shaped to block access to the interior when the actuator pivots in or out.

Actuator 2802 also includes an opening 3200 to receive key 3460. Opening 3200 is configured with a unique shape, and key 3460 is configured to match the shape of the opening so that it can be inserted into the opening but other items cannot. In the depicted embodiment, opening 3200 is shaped somewhat like the letter "H". Bypass switch 2800 cannot be operated when key 3460 is removed, and customizing the shape of the opening and key prevents someone from sticking a pencil, screwdriver or other object into the opening to operate the bypass switch when the key has been removed.

Figure 107:
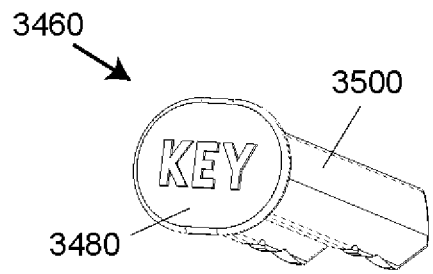
FIG. 107 shows a bypass key.
Figure 108:
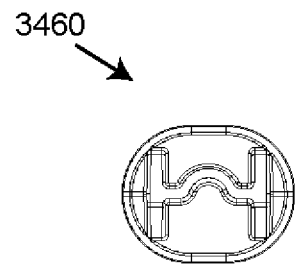
FIG. 108 shows an end view of the bypass key of FIG. 107.
Figure 109:
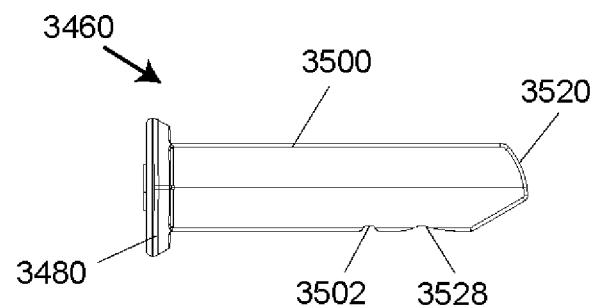
FIG. 109 shows a side view of the bypass key of FIG. 107.

Key 3460 is shown isolated in FIGS. 107 through 109. It includes a head portion 3480 and an elongate portion 3500 that fits into opening 3200. The bottom of the elongate portion includes a first notch 3502, and actuator 2802 includes a tab 3504 positioned to extend along the bottom of the key when the key is seated in opening 3200. Tab 3504 includes a ridge that fits into notch 3502 to help hold the key in the opening. Actuator 2802 also includes a tab 3506 positioned above key 3460 to prevent the key from tilting up.

The elongate portion of key 3460 terminates in a distal end with a sloping or curved surface 3520. When key 3460 is installed in the bypass switch, curved surface 3520 is adjacent the face of front shell 2020 of case 2010. Front shell 2020 includes projections 3522 with curved surfaces 3524 that are positioned adjacent the distal end of key 3460 when the key is fully seated in opening 3200. Accordingly, when a user pivots actuator 2802 out, the distal end of the key pivots up and contacts curved surfaces 3524 on projections 3522. Those surfaces then push the key out of opening 3200 sufficiently far a user to grasp the head of the key and remove the key from the bypass switch. In the depicted embodiment, the surfaces push the key out until the ridge on tab 3504 fits into a second notch 3528 on the bottom of the key, which holds the key until a user pulls it the rest of the way out. The edge of second notch 3528 nearest the distal end of the key is sloped less steeply than the edges of the first notch so a user can pull the key out easily after it has been ejected to the second notch, but still sloped enough so that the key stays in place until pulled out by the user. Additionally, a projection 3526 extends out from the face of front shell 2020 adjacent key 3460 to prevent the key from shifting to the side and to help ensure the key is ejected when a user pivots actuator 2802 out.

Figure 110:
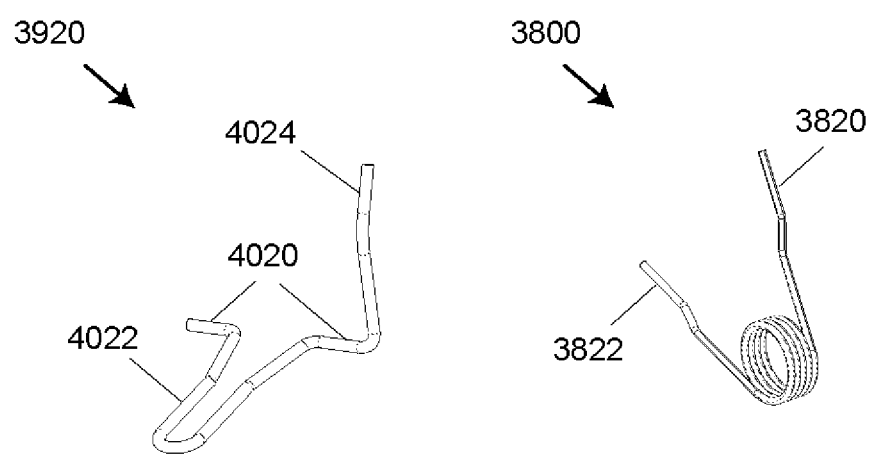
FIG. 110 shows a wire form used in a bypass switch.

Key 3460 works with a wire form 3920 to prevent the bypass switch from functioning when the key is removed. Wire form 3920 is shown isolated in FIG. 110, and shown installed in the switch box in FIG. 101. Wire form 3920 is bent to form an extension 4022, an arm 4024, and segments 4020 that define a pivot axis. Front shell 2020 of case 2010 includes an opening 4026, and wire form 3920 is positioned in the case so that extension 4022 extends through opening 4026. Walls extend out from the back of front shell 2020 to define opening 4026, such as wall 4028 shown in FIG. 94, and segments 4020 in the wire form rest in grooves 4030 in those walls, with extension 4022 extending through the opening defined by the walls. A projection 4032 extends out from rear shell 2040 to hold segments 4020 in grooves 4030 when the case is assembled. With this arrangement, the wire form is held in place so that it can pivot around an axis defined by segments 4020.

Extension 4022 is positioned and sized so that it is immediately under the elongate portion of key 3460 when the bypass switch is assembled. Accordingly, when a user pivots actuator 2802 inwardly, key 3460 pivots down and contacts extension 4022 of wire form 3920, causing the extension to pivot down. Arm 4024 of the wire form extends over a tactile switch 4080, as shown in FIG. 101, so that when extension 4022 pivots down, arm 4024 depresses the tactile switch to trigger bypass of an active injury mitigation system.

When key 3460 is removed, however, there is nothing to contact extension 4022 when actuator 2802 pivots inwardly, so nothing depresses tactile switch 4080. Similarly, the bottom of the tip of key 3460 is cut away so that the key clears extension 4022 when the key has been ejected far enough for tab 3504 to fit into second notch 3528 on the bottom of the key. Thus, key 3460 is configured to pivot wire form 3920 only when the key is fully seated.

Figure 111:
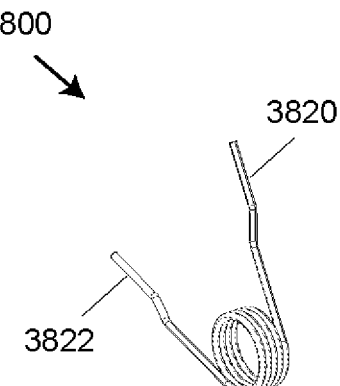
FIG. 111 shows a spring used in a bypass switch.
Figure 112:
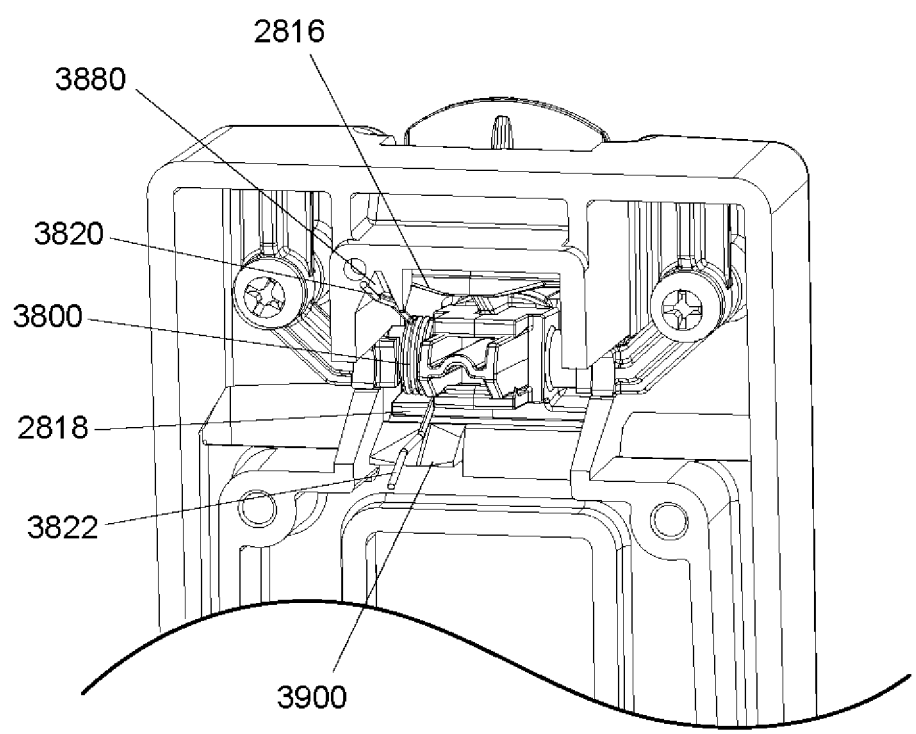
FIG. 112 shows the spring of FIG. 111 mounted in a switchbox.

Bypass switch 2800 also includes a spring 3800, shown isolated in FIG. 111, which biases actuator 2802 to a neutral position where the actuator is neither in nor out. Spring 3800 also returns the actuator to the neutral position after a user pulls the actuator out to eject key 3460, and after a user pushes the actuator in. Spring 3800 includes a coil that fits over and around one of pins 2804 on actuator 2802. The spring includes an upper arm 3820 and a lower arm 3822 that rest against notches 3880 and 3900, respectively, on the back surface of front cover 2000, as shown in FIG. 112. Spring 3800 is positioned so that lower arm 3822 is above the bottom flange 2818 of actuator 2802 and upper arm 3820 is below top flange 2816. With this configuration, bottom flange 2818 moves lower arm 3822 toward upper arm 3820 when a user pivots actuator 2802 out, compressing the spring, and similarly, top flange 2816 moves upper arm 3820 toward lower arm 3822 when a user pivots actuator 2802 in, also compressing the spring. The spring then pushes the actuator back to a neutral position when a user releases actuator 2802.

Case 2010 includes an opening 4669 for power cable 4670 to enter the switchbox and connect to circuit board 2540. The power cable may enter housing 22 through an aperture in the housing, such as aperture 4671 shown in FIGS. 21 and 50. Case 2010 also includes an opening 4672 for a motor cable 4673 to extend from the circuit board to a motor. Case 2010 also includes an opening 4674 through which a plug or connector, such as serial plug 4675 shown in FIG. 64, may extend to connect circuit board 2540 to components of an active injury mitigation system such as a contact detection system.

Rear shell 2040 of case 2010 includes an overhang surface or flange 4676 positioned just above opening 4674. Flange 4676 protects the plug or connector in opening 4674 from water by directing any water running down the back of the housing away from the opening.

Many of the components of a switchbox as described above, including the paddle, paddle activation link, front cover, case, bypass switch actuator, and bypass key may be made from plastic and may be injection molded.

A switchbox as described above is modular in that the circuitry is housed in a case separate from the front cover, paddle switch and bypass switch. The case enclosing the circuitry interfaces with and operatively attaches to those switches, yet can be easily removed and replaced if the circuitry fails. This design allows a user to replace the circuitry without having to replace the paddle switch and bypass switch.

A switchbox as described also protects circuitry from impacts, bumps, weather, spills, etc., by positioning the circuitry in a modular case inside the housing of the saw, while still positioning the on/off switch and bypass switch outside the saw housing for easy access by a user. Additionally, a switchbox as described provides a housing for circuitry that is substantially closed to weather, dust and spills.

Figure 113:
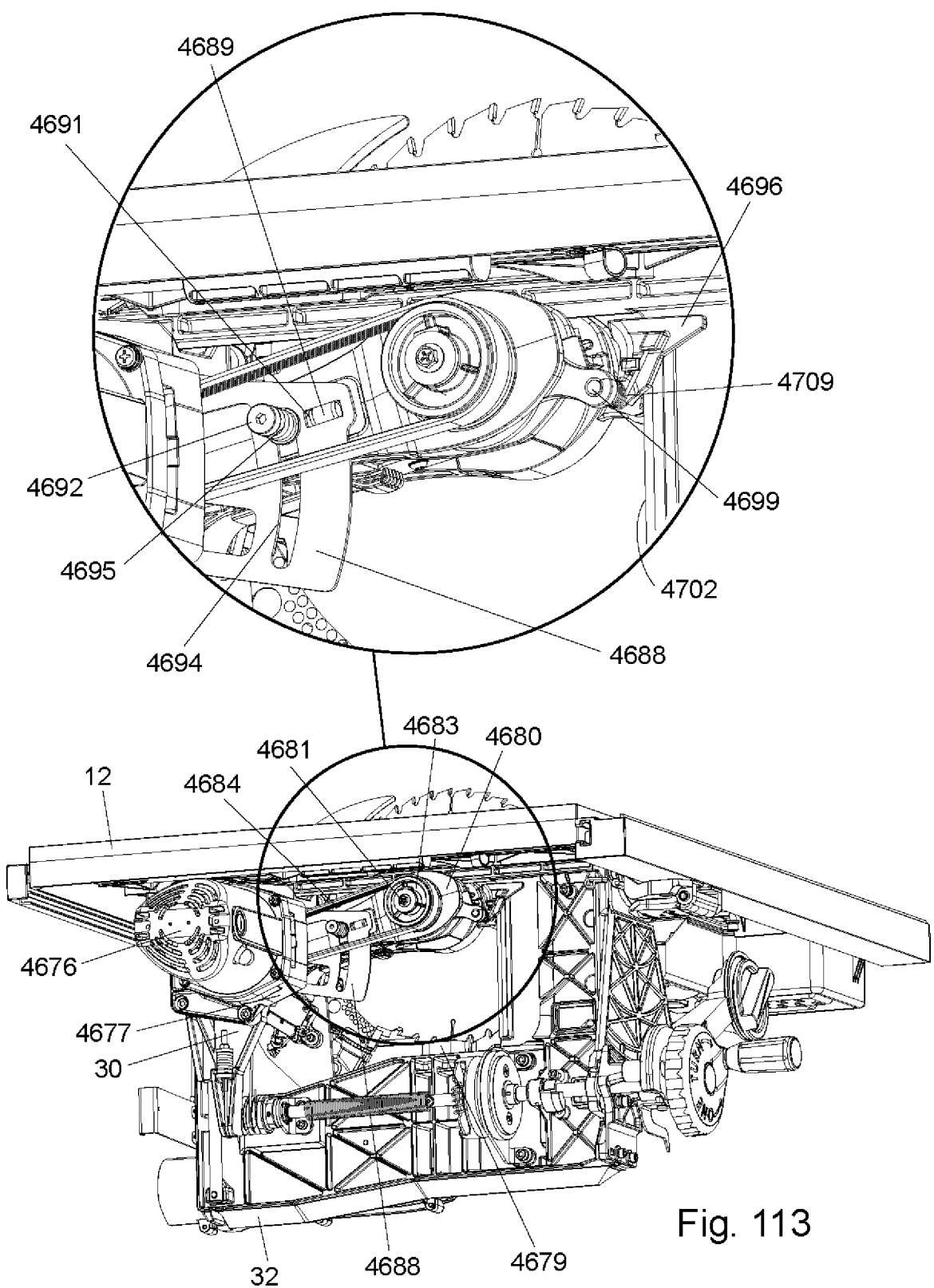
FIG. 113 shows an internal, left side view of a table saw with a section enlarged.
Figure 114:
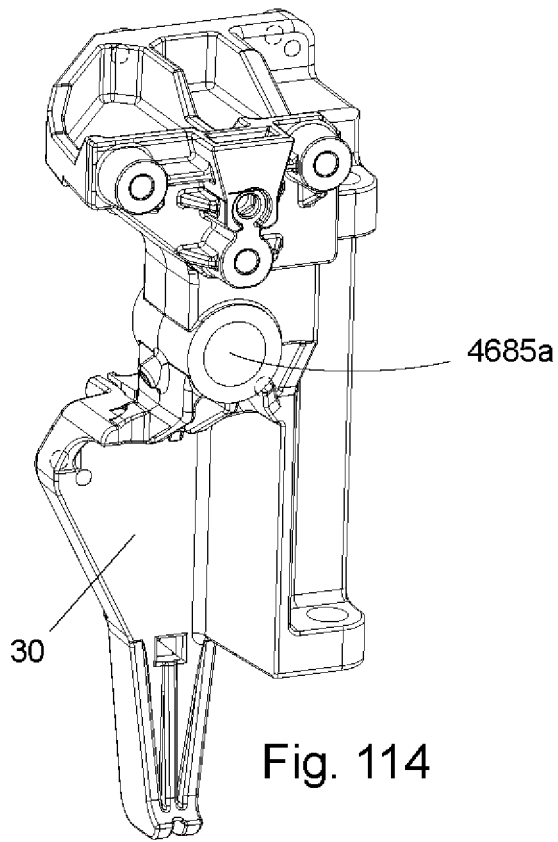
FIG. 114 shows an elevation plate.
Figure 115:
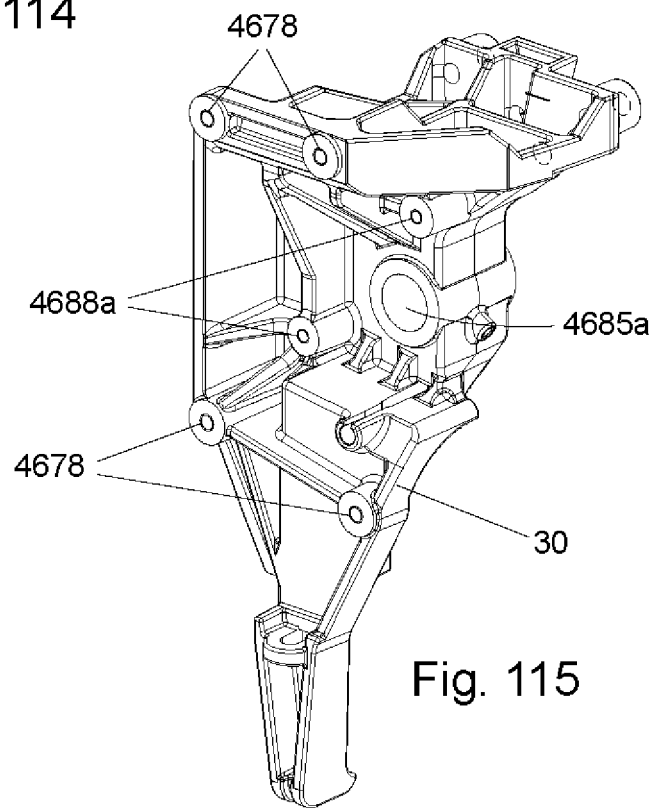
FIG. 115 shows another view of the elevation plate of FIG. 114.
Figure 116:
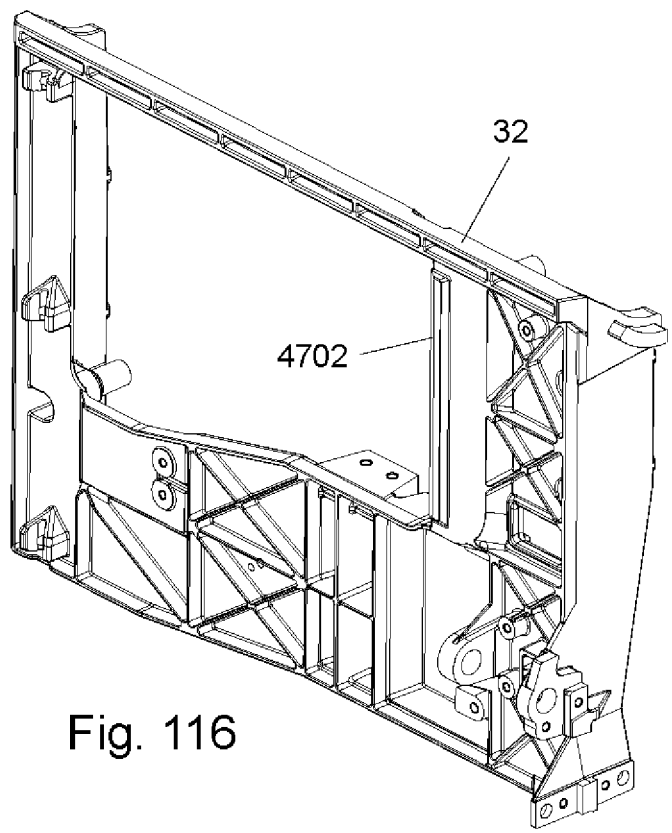
FIG. 116 shows a left side view of a trunnion.
Figure 117:
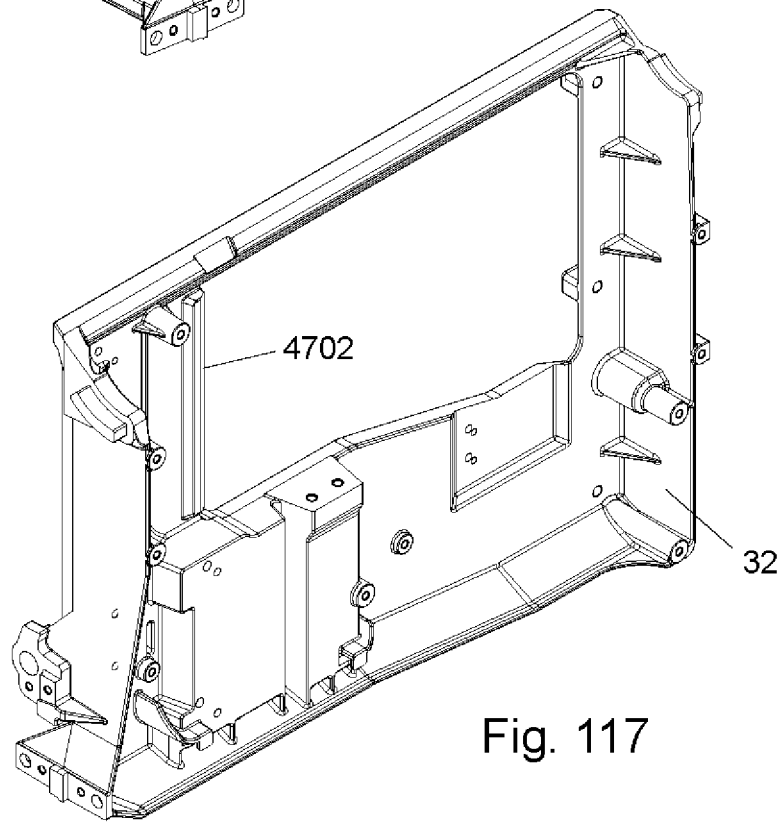
FIG. 117 shows a right-side view of a trunnion.

Switchbox 1000 switches power to a motor 4676 shown in FIG. 113. (FIG. 113 shows a left-side view of the internal mechanism of saw 10.) In the depicted embodiment, motor 4676 is a universal motor. A gear box 4677 is attached to the motor and the gear box bolts to elevation carriage 30. Elevation carriage 30 is an aluminum die cast part, shown isolated in FIGS. 114 and 115. Gear box 4678 bolts to elevation carriage by bolts threading into sockets 4678 shown in FIG. 115. The elevation carriage, in turn, is supported by trunnion 32 in such a way that the elevation plate can rise and lower relative to the trunnion, and trunnion 32 is supported by table 12 in such a manner that the trunnion can tilt relative to the table. In the depicted embodiment the trunnion tilts to the left when facing the front of the saw, but could be designed to tilt to the right. Trunnion 32 is an aluminum die cast part, and is shown isolated in FIGS. 116 and 117.

Figure 118:
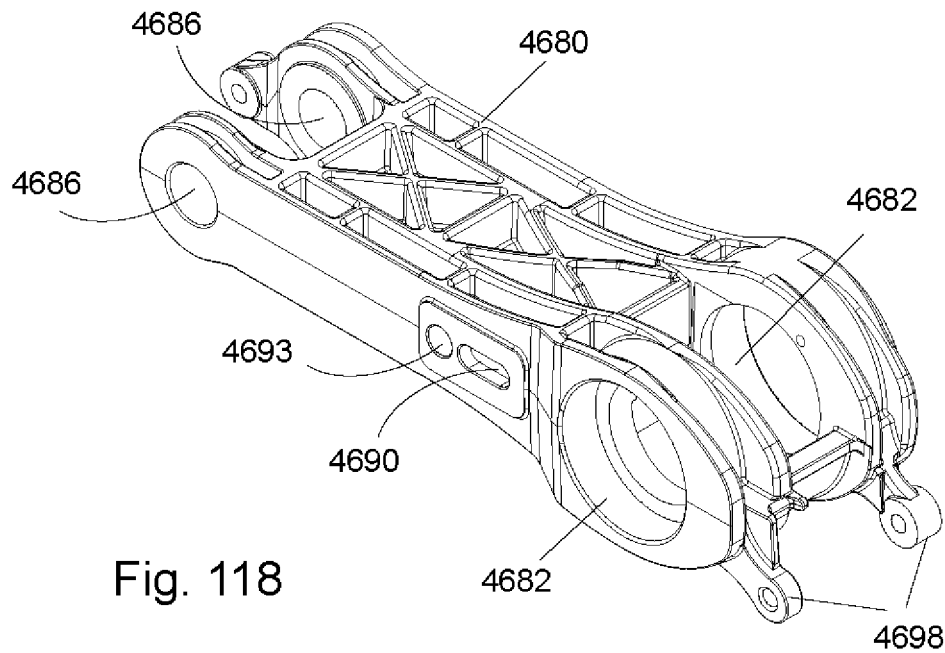
FIG. 118 shows an arbor block.
Figure 119:
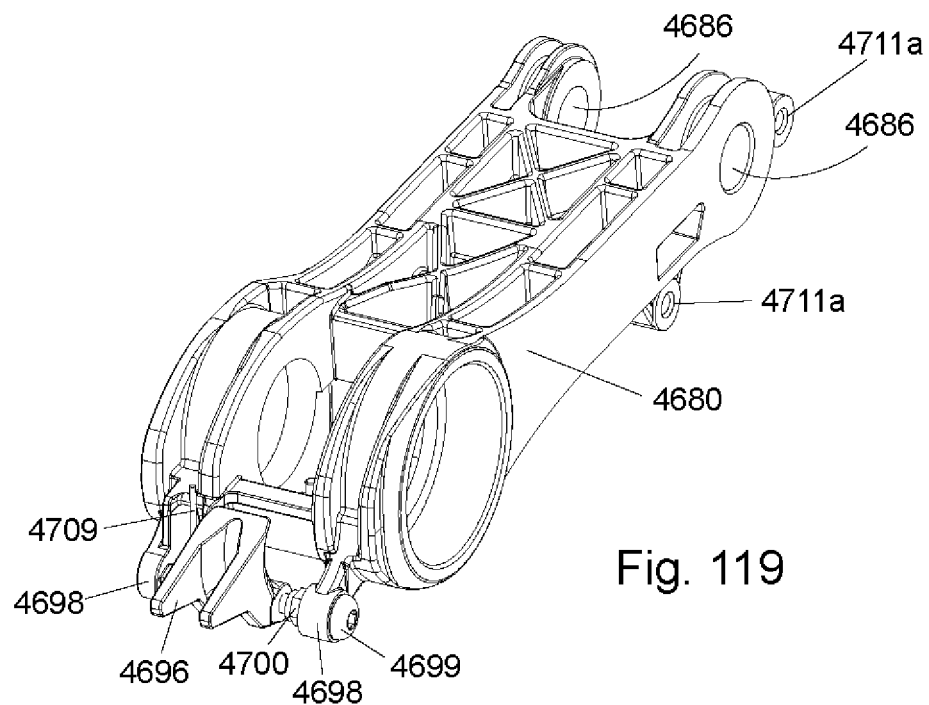
FIG. 119 shows another view of the arbor block of FIG. 118 with a V-bracket.

Elevation carriage 30 supports an arbor block 4680, shown isolated in FIGS. 118 and 119. The arbor block, in turn, supports an arbor 4681 on which the blade is placed. The arbor is supported in bearings so it can turn to spin the blade, and the bearings are seated in bearing seats 4682 in arbor block 4680. In the depicted embodiment, arbor block 4680 is die cast from aluminum.

An arbor pulley 4683 is mounted on the arbor, and a drive pulley is attached to an output shaft of gear box 4677. A belt 4684 extends around the drive pulley and arbor pulley 4683 so that the arbor pulley and arbor spin when the drive pulley spins.

Arbor block 4680 is mounted to elevation plate 30 on shaft 4685 so that the arbor block can pivot on the shaft. Shaft 4685 is labeled in FIG. 2 and it extends from one side of the elevation carriage to the other through a hole 4685*a* in the elevation carriage. The end of arbor block 4680 away from arbor 4681 includes holes 4686, and shaft 4685 extends through those holes to mount that end of the arbor block to the elevation plate so that the arbor block can pivot around shaft 4685.

The arbor block is designed to pivot down to retract the blade and thereby help mitigate injury in the event a user accidentally contacts the spinning blade. More specifically, table saw 10 includes an active injury mitigation system designed to stop and retract the blade in the event of an accident where a person contacts the spinning blade. The system includes a brake cartridge 4687 positioned adjacent the blade, as shown in FIG. 2. Upon detection of contact, brake cartridge 4687 will engage and stop the blade to minimize any injury, and in doing so, the blade drops or retracts until it contacts a rubber bumper or stop 4679 mounted on the trunnion.

In the depicted embodiment, the output shaft of gear box 4677 is positioned so that it is generally coaxial with shaft 4685. That positioning maintains tension on belt 4684 when arbor block 4680 retracts. Alternatively, the output shaft of gear box 4677 could be positioned such that the tension on belt 4684 is lessened when arbor block 4680 retracts.

In normal use arbor block 4680 is prevented from pivoting by a retraction plate 4688 bolted to elevation carriage 30 and extending along the side of the arbor block, as shown in FIG. 113. The retraction plate is bolted to holes 4688*a* shown in FIG. 115. A pin 4689 is fitted into a notch 4690 on the arbor block adjacent plate 4688, and a slot 4691 is cut in plate 4688 to fit around the pin. Plate 4688 is a steel plate, approximately 2 to 3 mm thick, and therefore is relatively rigid. It is also positioned against the side of the arbor block so that pin 4689 is held in slot 4691. In normal use plate 4688 and pin 4689 hold the arbor block in position, and therefore, hold the blade in position. However, when brake cartridge 4687 engages and stops the blade, the angular momentum of the blade creates a downward force which typically is sufficient to push pin 4689 out of slot 4691 and flex plate 4688. The arbor block then pivots down around an axis defined by shaft 4685 to retract the blade. In this system, plate 4688 acts somewhat like a spring, and flexes away from the arbor block when pin 4689 is forced out of slot 4691. The plate also presses against pin 4689 as the pin and arbor block pivot down, thereby absorbing some of the energy of the system.

Plate 4688 can be adjusted to vary the amount of force required to push pin 4689 out of slot 4691, and to vary the amount of pressure the plate applies against pin 4689 as the pin and arbor block pivot down. A bolt 4692 is threaded into a socket 4693 on the arbor block, through a slot 4694 in plate 4688, and a spring 4695 is interposed between the head of bolt 4692 and plate 4688. Spring 4695 can be selected to provide whatever force is desired, and tightening or loosening the bolt adjusts the amount of force the spring applies. Accordingly, the force plate 4688 applies against pin 4689 can be adjusted by tightening or loosening bolt 4692. In the depicted embodiment, spring 4695 has a spring force of roughly 70 pounds, although other springs could be used.

After retracting, arbor block 4680 can be reset to its normal, operational position by simply moving the arbor block up, either by hand or by the elevation control on the saw, until pin 4689 snaps back in slot 4691.

Figure 120:
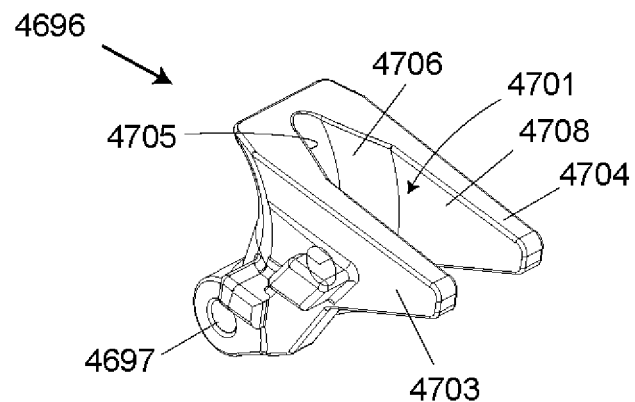
FIG. 120 shows a V-bracket.
Figure 121:
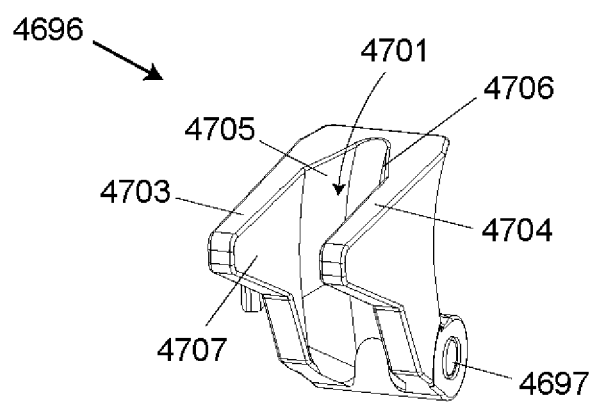
FIG. 121 shows another view of the V-bracket of FIG. 120.
Figure 122:
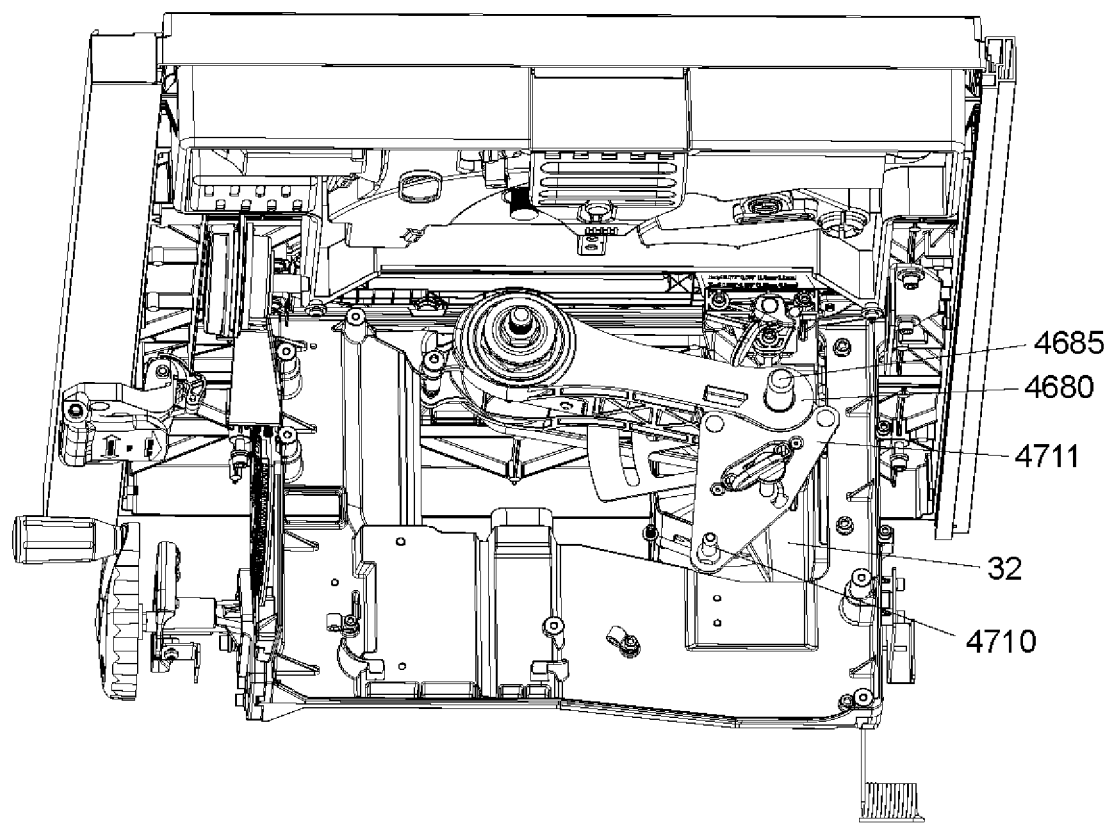
FIG. 122 shows an internal, right-side perspective view of a table saw with various components removed.

In the depicted embodiment, the end of arbor block 4680 adjacent arbor 4681 is supported by a V-bracket 4696, which is shown isolated in FIGS. 120 and 121. A threaded hole 4697 passes through the base of the V-bracket and is used to attach the V-bracket to arbor block 4680. The end of arbor block 4680 adjacent arbor 4681 includes two mounting arms 4698, each with a non-threaded through hole, and the base of the V-bracket fits between those arms so that the holes in the arms align with the hole in the base of the V-bracket. A bolt 4699 passes through the hole in one of the two arms, as shown in FIG. 119, and a self-locking nut 4700, such as a nylon insert lock nut, is then threaded onto the bolt to hold the bolt in the arm. The bolt then threads through hole 4697 in the V-bracket and extends into the hole in the other arm on the arbor block. With this configuration, turning bolt 4699 causes V-bracket 4696 to move along the bolt, and thereby adjust the lateral position of the arbor block and blade relative to the V-bracket.

V-bracket 4696 includes a generally v-shaped notch 4701 configured to fit over an edge 4702 on trunnion 32. Edge 4702 can have angled sides so that it meshes with the shape of notch 4701. Two projections 4703 and 4704 form notch 4701, and those projections extend over edge 4702 and over the sides of trunnion 32 to prevent the V-bracket from moving laterally with respect to the trunnion, and to guide the V-bracket as it moves up and down along edge 4702. The V-bracket moves up and down along edge 4702 when elevation carriage 30 moves up and down, and when the arbor block retracts.

Notch 4701 includes surfaces 4705 and 4706 that are angled with respect to a line or plane passing through the center of the notch and substantially parallel to projections 4703 and 4704. The angle is chosen to provide enough slope so that the V-bracket seats against edge 4702 to hold the arbor block against lateral movement, but not so much slope that the V-bracket locks against edge 4702 and prevents the arbor block and elevation carriage from moving up and down. In the depicted embodiment, surfaces 4705 and 4706 are angled 25 degrees from the center line. Surfaces 4705 and 4706 are part of projections 4703 and 4704 which define the notch. The projections also include surfaces 4707 and 4708 which are generally parallel to the center line, except for a small draft angle that facilitates molding of the V-bracket. Surfaces 4707 and 4708 help keep the V-bracket in position. Notches of other shapes, such as square and rectangular notches, would have to have sufficient tolerance so the bracket could slide up and down along edge 4702, but that tolerance would also allow the bracket and arbor block to move laterally. Sizing such a notch to fit close enough against edge 4702 to minimize lateral movement increases the likelihood of the notch binding on the edge.

In the depicted embodiment, arbor block 4680 retracts in an arc, and therefore, will move toward and away from edge 4702 when it retracts and when it is reset. Accordingly, V-bracket 4696 is designed to be compliant and to move in and out as the arbor block moves. Specifically, V-bracket 4696 can pivot forward or backward around bolt 4699. A spring 4709 is also mounted on bolt 4699, and the spring biases the V-bracket toward edge 4702. The spring includes one arm that pushes against a tab on the V-bracket, a coil through which bolt 4699 passes, and a second arm that presses against the arbor block. As the arbor block retracts, edge 4702 will push the V-bracket back and compress spring 4709, and the spring will keep the V-bracket engaged with the edge. When the arbor block is reset, spring 4709 will push the V-bracket forward and keep the V-bracket engaged with edge 4702. In the depicted embodiment, spring 4709 has a spring force of approximately 4.5 to 6 pounds.

The V-bracket is also compliant to accommodate tolerances in the machining of edge 4702 and in the manufacturing of the arbor block, V-bracket, and trunnion. Thus, spring 4709 functions to accommodate any tolerances or slop in these parts.

Retraction of the arbor block can also involve significant forces. V-bracket 4696 is made from 30 percent glass filled nylon to be strong enough to accommodate the retraction.

In the depicted embodiment, switchbox 1000 connects to brake cartridge 4687, which is part of an active injury mitigation system, as stated. Shaft 4685 and a pin 4710 extend out from elevation carriage 32, and the brake cartridge mounts on those two pins. A mounting plate 4711 is also attached to arbor block 4680 by bolting into holes 4711a on the arbor block, and the mounting plate supports a plug or socket that connects to the switchbox. The mounting plate and plug are positioned so that brake cartridge 4687 automatically engages the plug when the brake cartridge is seated on shaft 4685 and pin 4710.

In the depicted embodiment, shaft 4685, pin 4710, and mounting plate 4711, provide a single, fixed position for brake cartridge 4687. In some table saws, the system to mount a brake cartridge in the saw allows for the position of the brake to be adjusted so that the brake can be moved closer to or further from the edge of the blade. The depicted embodiment, in contrast, provides a stationary or fixed mount and the position of the brake cannot be adjusted. This simplifies the design of the saw and reduces the manufacturing cost of the saw. This also simplifies the operation of the saw because a user no longer needs to adjust the position of the brake cartridge relative to the blade. This also prevents a user from positioning the brake further from the blade than it should be, which might happen by mistake or inadvertence in a system where the position of the brake cartridge is adjustable.

Figure 123:
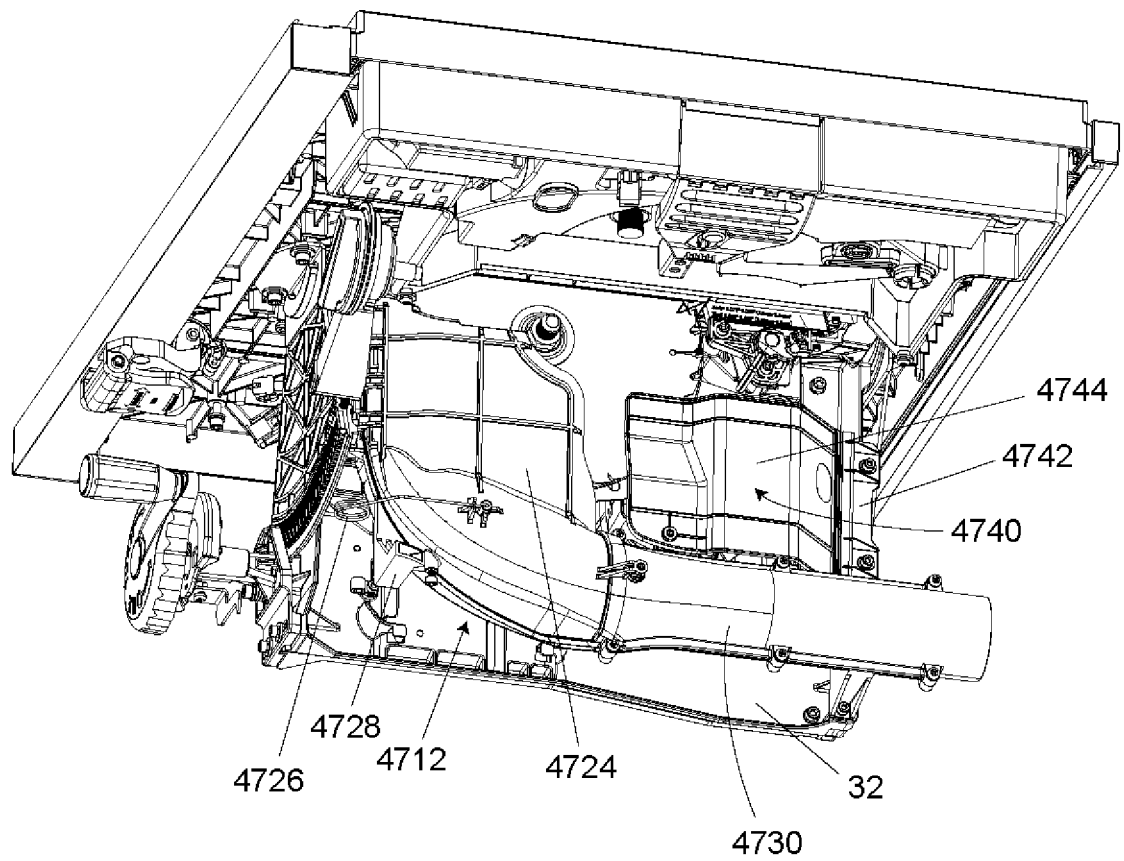
FIG. 123 shows an internal, right-side perspective view of a table saw with a dust shroud and dust chute.
Figure 124:
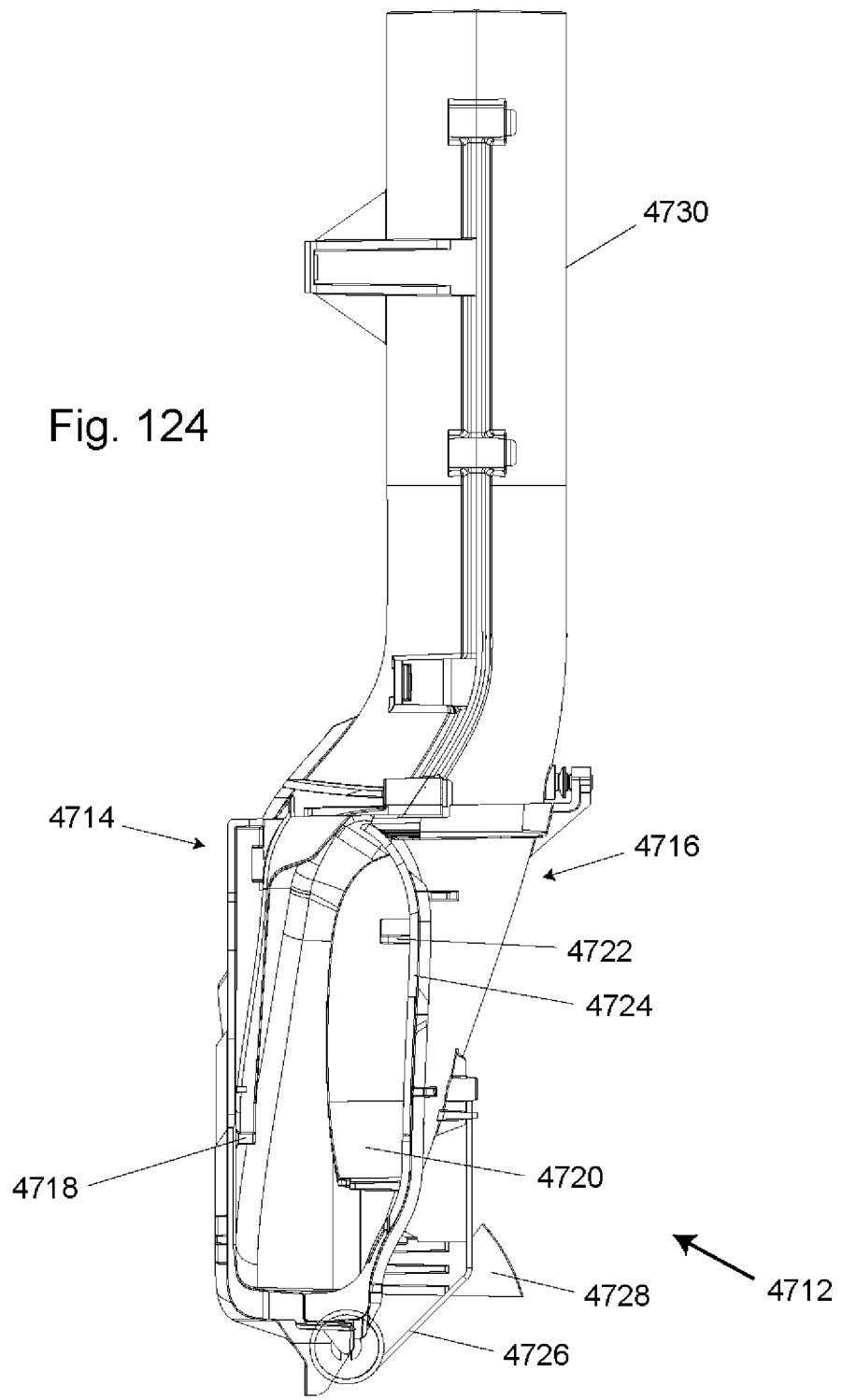
FIG. 124 shows a top view of a dust shroud and dust chute.

Table saw 10 also includes a dust shroud 4712 to catch saw dust and direct it through a chute out the rear of the saw. Dust shroud 4712 is shown in FIG. 123 mounted in table saw 10, and a top view of the dust shroud is shown isolated in FIG. 124. The shroud is mounted to trunnion 32 and with the blade raised, generally covers the lower front quadrant of the blade beneath the table, as shown. Of course, more of the front of the blade would be covered as the blade is lowered. The shroud extends up as far as possible in front of the blade to catch as much dust as possible.

Figure 125:
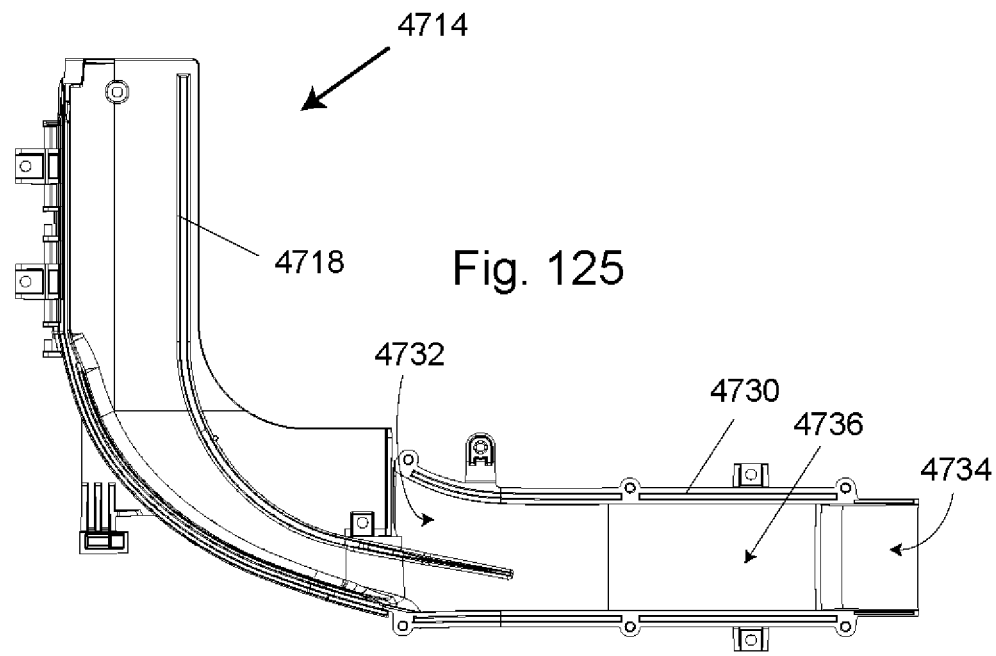
FIG. 125 shows a left half of a dust shroud and dust chute.
Figure 126:
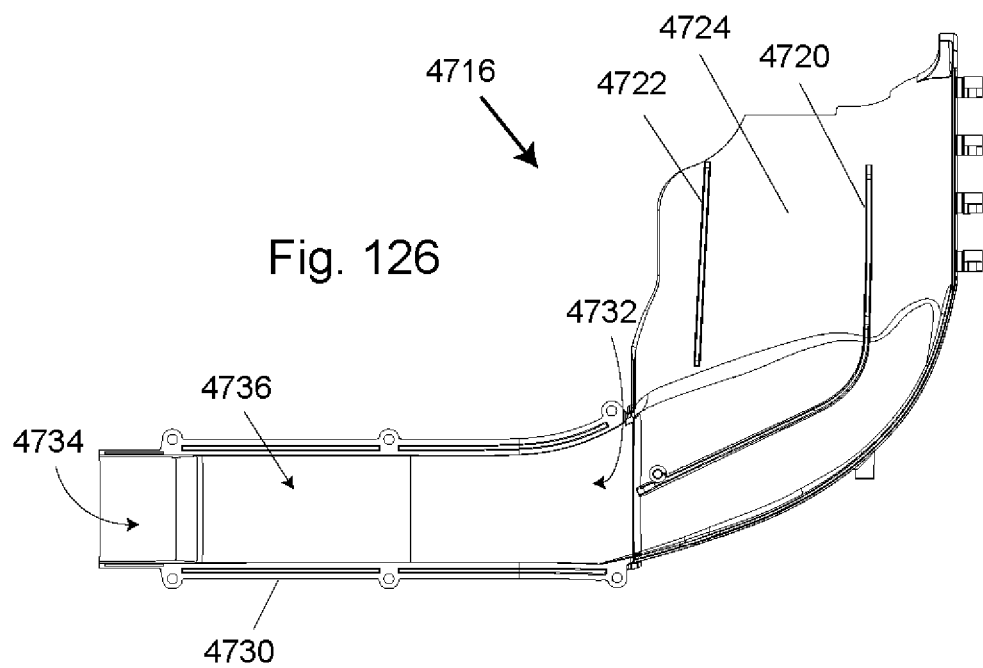
FIG. 126 shows a right half of a dust shroud and dust chute.

The shroud includes a left side 4714 and a right side 4716, shown in FIGS. 125 and 126, respectively. A fin 4718 extends generally perpendicularly out from the left side of the shroud to a position within a few millimeters of the blade. Fin 4718 extends substantially vertically until it reaches roughly the bottom of the blade, with the blade fully lowered, where it then curves toward the rear of the saw, as shown in FIG. 125. Another fin 4720 extends generally perpendicularly out from the right side of the shroud to a position as close as possible to the blade while still allowing clearance for a dado stack to be used in the saw. Fin 4720 also extends substantially vertically until it reaches roughly the bottom of the blade with the blade fully lowered, where it then curves toward the rear of the saw, as shown in FIG. 126. The right side of the shroud includes another fin 4722 which also projects out generally perpendicularly from the side. Fin 4722 is positioned rearward of fin 4720 and it extends generally vertically from near the top of the shroud down toward the bottom of the shroud, but does not curve rearward. Fin 4720 is positioned generally in the front-to-back middle of the blade adjacent the saw's arbor, and the fin extends as close as possible to the blade while still providing clearance for the saw's arbor. Fins 4718, 4720 and 4722 all help peel and direct dust away from blade 18.

The right side of the shroud is positioned as near to the blade as possible so the shroud can extend as high as possible when the blade tilts, while still providing clearance for the saw's arbor. However, space is required to change the blade and to change the brake cartridge in saws equipped with active injury mitigation systems that use brake cartridges. Accordingly, the right side of shroud 4712 is configured with a door 4724 that can pivot away from the blade. The door is hinged to the front of the shroud and a spring 4726 biases the door closed. Magnets or some other type of latch can hold the door closed. Shroud 4712 can also include a stop to limit how far the door can open, such as stop 4728. With this arrangement, a user can reach through opening 14 in table 12 and pivot door 4724 to the right to change the blade or to perform other service on the saw.

In saws that include an active injury mitigation system with a blade that retracts, such as the depicted embodiment, dust shroud 4712 is positioned sufficiently below the blade to allow the blade to retract.

Figure 127:
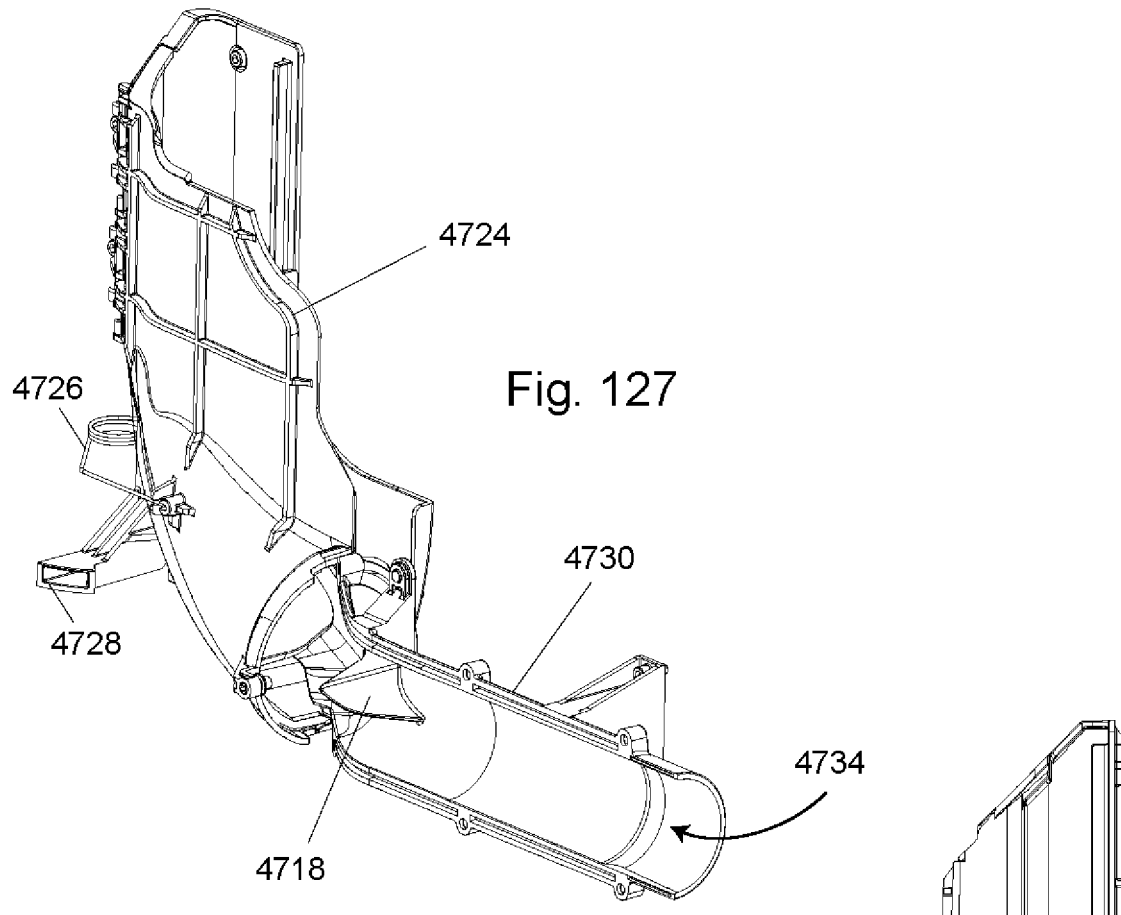
FIG. 127 shows a dust shroud and part of a dust chute.
Figure 128:
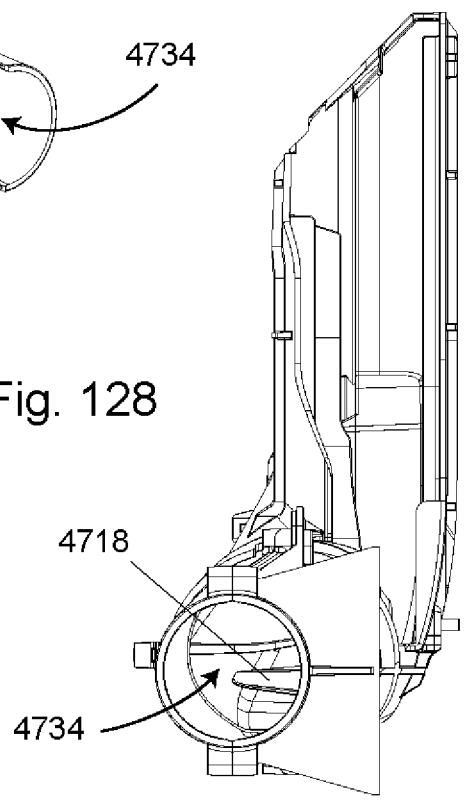
FIG. 128 shows a rear view of a dust chute.

Shroud 4712 also includes a chute 4730 through which the shroud directs sawdust toward the rear of the saw. Chute 4730 has a mouth 4732 positioned roughly below or slightly behind the center of the blade, an exit 4734, and an enclosed channel 4736 extending between the mouth and the exit. The bottom end of fin 4718 extends into mouth 4732, and then into channel 4736 approximately 90 mm beyond mouth 4732, although it could extend roughly 50 to 100 mm or more into channel 4736. The bottom end of fin 4718 is mounted on the left side of channel 4736 and roughly in the middle of the top-to-bottom dimension of the channel. The fin extends generally perpendicularly out from the left side of chute 4730 to approximately the middle of the side-to-side dimension of the chute. In some embodiments, the fin can slope downward slightly from the mouth toward the bottom of the chute. The bottom end of fin 4718 in channel 4736 functions to prevent air and dust from recirculating back toward blade 18. Experiments have shown that some dust moving along the bottom of dust shroud 4712 into chute 4730 can be deflected or can recirculate up and back toward the blade. The bottom end of fin 4718 substantially prevents that recirculation while still allowing dust and air to enter chute 4730 above the fin. The bottom end of fin 4718 is also shown in FIGS. 127 and 128, which show additional views of the rear of the dust shroud.

Chute 4730 extends through an opening 4738 (identified in FIG. 49) in the back wall of housing 22 far enough for a vacuum or other dust collection system to be attached to exit 4734. Exit 4734 can be shaped and sized to mate with standard vacuum systems and couplers. In the depicted embodiment, exit 4734 is circular with an approximately 65 mm outside diameter and an approximately 60 mm inside diameter.

Chute 4730 is mounted to trunnion 32, and therefore, moves with the trunnion when a user changes the angle of the blade relative to the table. That movement is arcuate and substantial, and therefore, opening 4738 has a large, arcuate shape. Making an opening big enough for the chute to move as the blade tilts, however, means the opening is big enough for a person to reach through and potentially contact the spinning blade. Accordingly, table saw 10 includes a door or shield 4740 positioned to block access to the rear portion of blade 18, as shown in FIG. 123. Shield 4740 is mounted to trunnion 32 above chute 4730. The shield is positioned near the blade so it can extend as high as possible while still allowing the blade to tilt to 45 degrees. However, as stated previously, space is required to change the blade and to change the brake cartridge in saws equipped with active injury mitigation systems that use brake cartridges. Accordingly, shield 4740 is configured to pivot out of the way when a user needs access to the blade or access to other components adjacent the blade. Shield 4740 includes a mounting edge 4742, and the shield is mounted to trunnion 32 along mounting edge 4742 by screws or bolts. A door section 4744 extends out from the mounting edge and is connected to the mounting edge by what is sometimes called a live or living hinge (i.e., a span of plastic connecting the door section and the mounting edge, and configured to flex when the door section pivots relative to the mounting edge). The live hinge is between the door section and the mounting edge so that the door section can pivot relative to the mounting edge. With this arrangement, a user can reach through opening 14 in table 12 and pivot door section 4744 out of the way to the right. The door section can be biased closed, either through the live hinge or some other spring, and a latch or magnet can be used to keep the door section closed. In the depicted embodiment, the door section is shaped to provide clearance for a brake cartridge, and therefore extends out from the mounting edge before it bends back toward the saw blade to form something like a hump.

Portable table saws can include handles to make it easier for persons to carry and/or move the saws. In the depicted embodiment, table saw 10 includes handles 4800 and 4802, labeled in FIG. 3. Handles 4800 and 4802 comprise openings in table 12 that extend all the way through the table. The bottom of the table adjacent the inside edge of each handle, i.e., adjacent the side of the handle closest to the blade, is formed to provide a comfortable surface for a user's fingers to curl around and grasp, as shown at 4804 and 4805 in FIG. 18.

Figure 129:
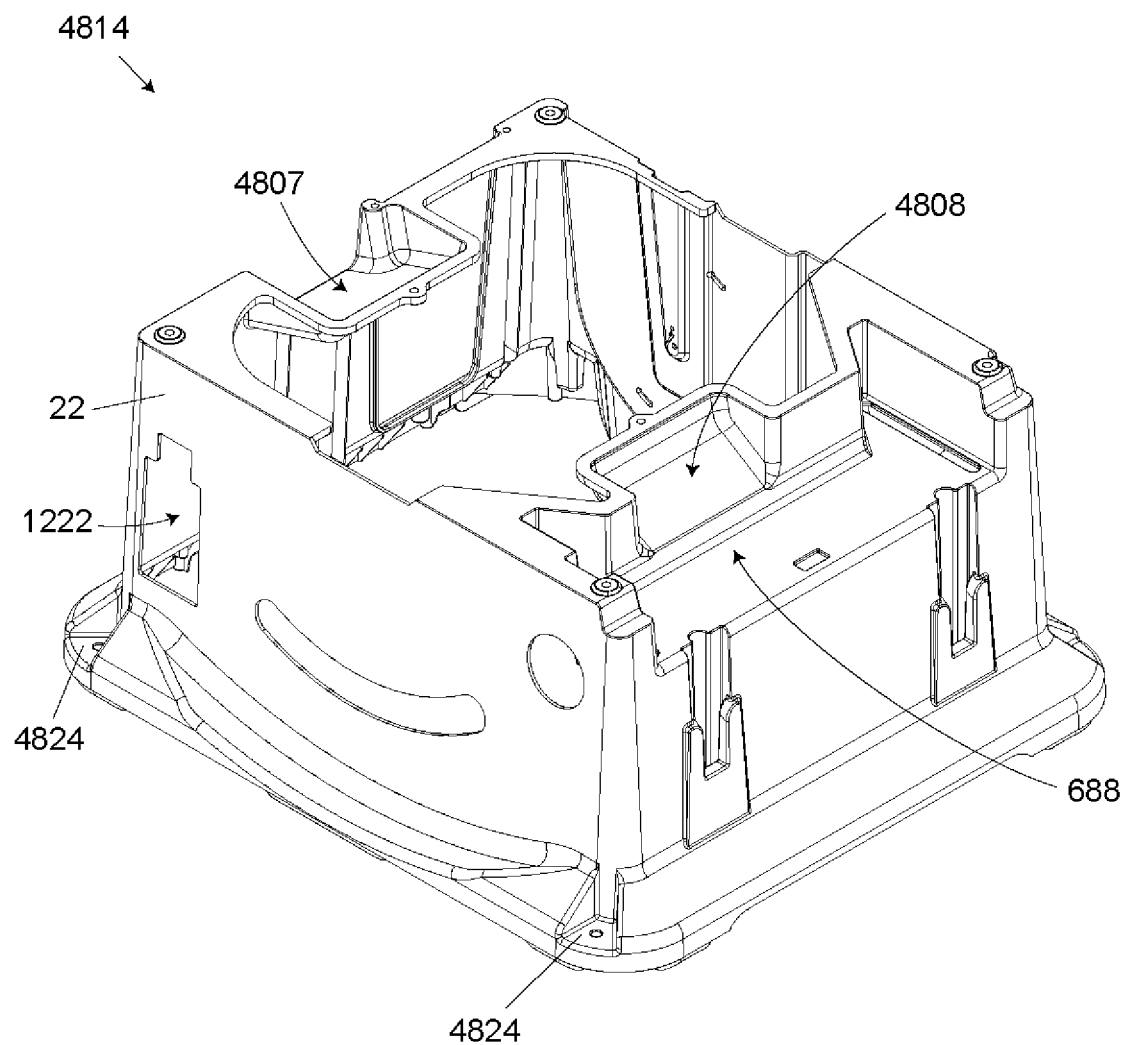
FIG. 129 shows a housing for a table saw.

Housing 22 is shaped so that portions of the housing extend under the handles to block a user from extending a hand through the handle and contacting the blade or other internal parts of the saw. Recess 4807 is formed in housing 22 so that it is under handle 4800, as shown in FIG. 129. Recess 688, discussed previously in connection with storage drawer 500, is formed in housing 22 and includes a region 4808 that extends under handle 4802. The portions of the housing defining these recesses shield the internal mechanism of the saw from a user reaching through the handles. The bottom surfaces of the recesses can slope down so that any dust or debris in the recesses will tend to fall out. The recesses can be shaped to include a curved surface where the housing extends up toward the table to deflect fingers that might be extended too far through the handle and to direct anything falling through the handle down. The recesses are sized so that there is a sufficient distance between the bottom of the handles and the housing for a user to grasp the handle.

Both handles 4800 and 4802 are positioned inside the outer perimeter of the table, rather than on the edge of the table, and as close as possible to the center of gravity of the saw, to make it easier to pick up the saw. The handles are also positioned a comfortable distance apart to make it easier to pick the saw up. Handle 4800 is positioned to the left of the blade and spaced sufficiently away from the blade so that the housing under the handle does not interfere with the motor, the elevation mechanism or other internal components of the saw. Handle 4802 is positioned to the right of the blade so that it does not interfere with the storage drawer and other components of the saw.

Table saw 10 also includes a handle 4810 formed in the bottom of the housing on the right side (handle 4810 is labeled in FIGS. 40 and 41), and a similar handle 4812 formed in the bottom of the housing on the left side (handle 4812 is labeled in FIG. 19). Two people can carry the saw with each person holding the saw by one of these handles. The handles extend along much of the length of the sides and are wide enough for a person to use both hands in one handle. These handles also provide a place for a user to grasp the saw and pull or slide the saw out of the bed of a pick-up truck or off of a work bench, for example.

Figure 130:
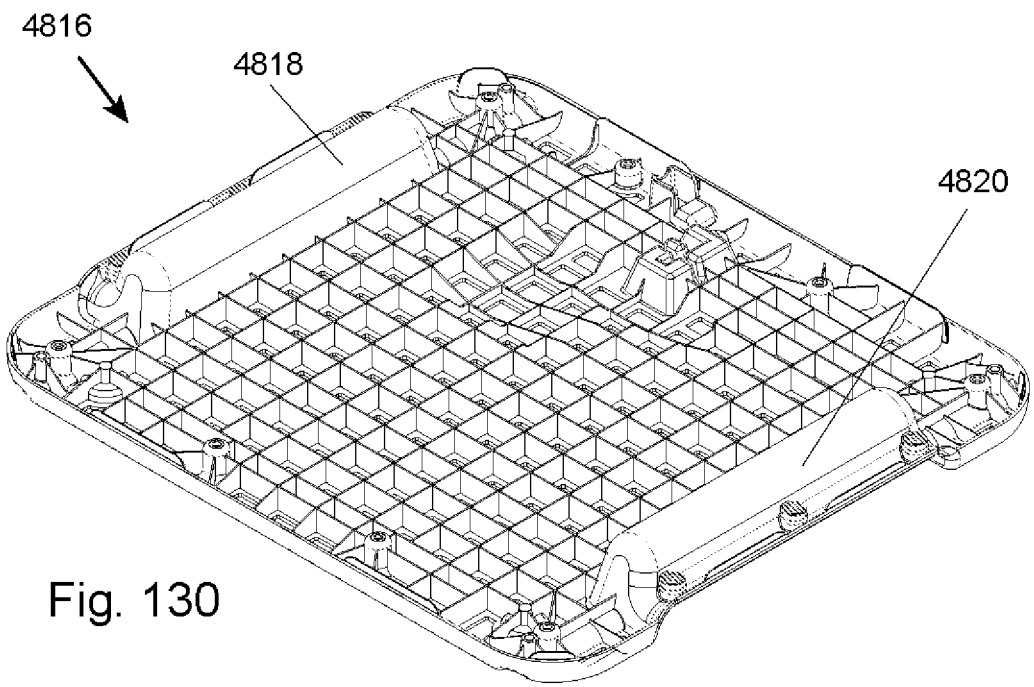
FIG. 130 shows a top view of a base for a housing.
Figure 131:
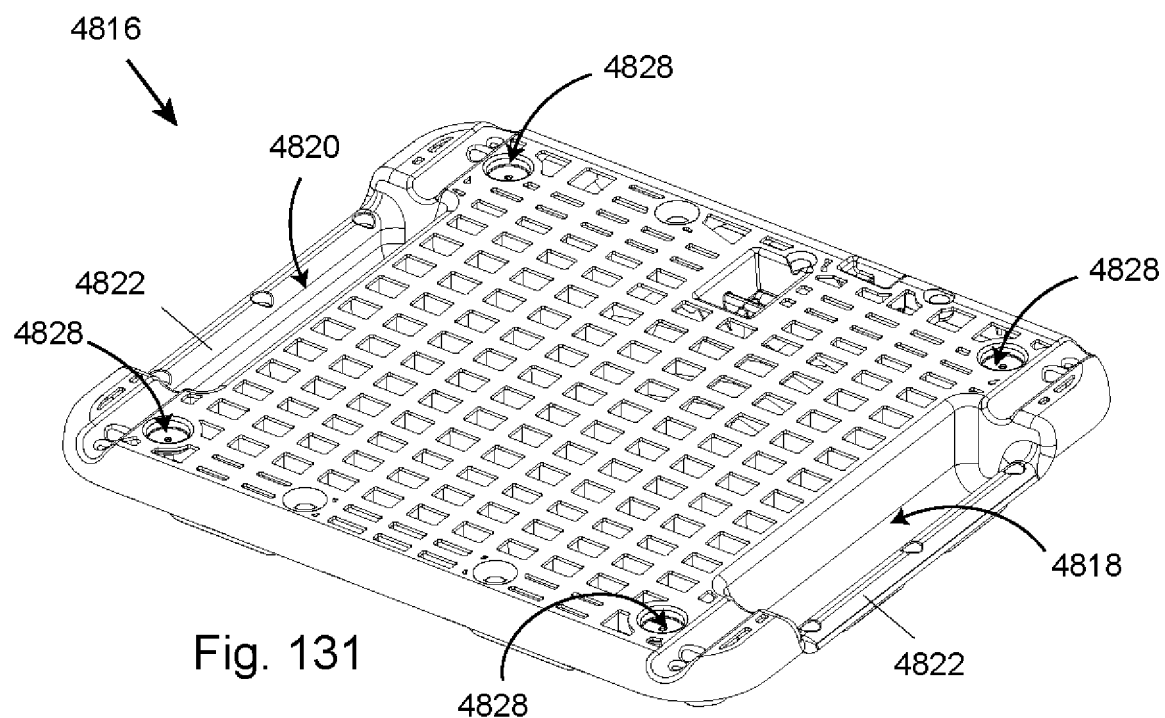
FIG. 131 shows a bottom view of a base for a housing.

Housing 22 includes a main body 4814 (labeled in FIG. 40 and shown isolated in FIG. 129), and a base 4816 attached to the main body (also labeled in FIG. 40 and shown isolated in FIGS. 130 and 131. Handles 4810 and 4812 are formed in base 4816. In the depicted embodiment, the base is injection molded out of plastic, and the base is shaped to include recesses 4818 and 4820 that extend up to provide an open region to accept a user's hand. The outer edge of each recess forms a lip 4822 that a user can grasp. The top of each recess and the edges of the recess are curved to make the handle have a nice, smooth, ergonomic feel. As seen in FIGS. 130 and 131, base 4816 is formed with ribs and openings in what may be thought of as a honeycomb pattern. The ribs are close enough to prevent a user from reaching into the inside of the saw, and the openings between the ribs allow sawdust to fall through. The height and size of different ribs can vary to provide clearance for internal components of the saw, as shown in FIG. 130.

Base 4816 can be joined to main body 4814 in various ways. In the depicted embodiment, the base is screwed to the main body, so the base and the main body include screw holes and bosses for the screws.

Main body 4814 can also include sockets that can be used to clamp or mount the saw to a cart or stand, such as sockets 4824 shown in FIG. 129.

Table saw 10 also includes rubber feet 4826 (labeled in FIG. 41) that screw into receptacles 4828 on base 4816. In some embodiments, the feet can be adjusted to level the saw.

INDUSTRIAL APPLICABILITY

The table saws described herein are applicable to woodworking, manufacturing, packaging, construction, carpentry, material processing, etc. The features described herein are applicable to power tool equipment.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, the recitation of "a" or "a first" element, or the equivalent thereof, should be understood to include incorporation of one or more such elements, neither requiring nor excluding two or more such elements.

It is believed that the following claims particularly point out certain combinations and sub-combinations that are directed to disclosed inventions. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
a main table having a work surface and a front;
a housing supporting the table, where the housing has a front, a back, a left side, a right side, and a recess in the right side;
a circular blade configured to cut a work piece on the main table;
a motor to spin the blade;
an elevation mechanism associated with the blade, where the elevation mechanism is configured to change the elevation of the blade relative to the work surface between a fully elevated position and a fully lowered position;
a tilt mechanism associated with the blade, where the tilt mechanism is configured to change the tilt of the blade relative to the work surface, and where the tilt mechanism can position the blade perpendicular to the work surface; and
a drawer below the work surface and to the right of the blade when facing the front of the table, where the drawer has a top, a bottom and an interior, where the drawer is adapted to slide to the right relative to the blade when facing the front of the table and when the blade is perpendicular to the work surface from a retracted position where the interior of the drawer is not accessible by a user to an extended position where the interior of the drawer is accessible by a user, and where the drawer is configured to fit at least partially in the recess in the right side of the housing when the drawer is in the retracted position;
where the top of the drawer is below the work surface and the bottom of the drawer is not below the lowest point of the blade with the blade at the fully lowered position; and
where the housing has a footprint and the recess extends inside the footprint toward the blade.

2. The table saw of claim 1 where the housing is molded.

3. The table saw of claim 1, where the interior of the drawer is not accessible by a user in the retracted position because the drawer is under the main table.

4. The table saw of claim 1, where the drawer includes a lid.

5. The table saw of claim 4, where sliding the drawer to the extended position provides clearance to open the lid.

* * * * *